US006654516B2

(12) United States Patent
So

(10) Patent No.: US 6,654,516 B2
(45) Date of Patent: Nov. 25, 2003

(54) OPTICAL SYSTEM AND METHOD

(75) Inventor: John Ling Wing So, Plano, TX (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 10/224,202

(22) Filed: Aug. 20, 2002

(65) Prior Publication Data

US 2003/0081893 A1 May 1, 2003

Related U.S. Application Data

(60) Provisional application No. 60/313,559, filed on Aug. 20, 2001.

(51) Int. Cl.[7] ............................... G02B 6/26; G02B 6/00
(52) U.S. Cl. ................... 385/27; 385/3; 385/11
(58) Field of Search ........................... 385/1, 4, 11, 12, 385/13; 356/477, 73.1; 359/337.5; 372/22

(56) References Cited

U.S. PATENT DOCUMENTS

| | | | | |
|---|---|---|---|---|
| 4,639,129 A | * | 1/1987 | Hullein et al. | 356/5.15 |
| 5,398,681 A | * | 3/1995 | Kupershmidt | 600/316 |
| 5,448,992 A | * | 9/1995 | Kupershmidt | 600/347 |
| 5,596,657 A | * | 1/1997 | Choi | 382/227 |
| 5,671,301 A | * | 9/1997 | Kupershmidt | 385/1 |
| 5,956,131 A | * | 9/1999 | Mamyshev et al. | 356/73.1 |
| 5,999,548 A | * | 12/1999 | Mori et al. | 372/22 |
| 6,323,950 B1 | * | 11/2001 | Kim et al. | 356/477 |
| 6,462,863 B1 | * | 10/2002 | Atieh et al. | 359/337.5 |

* cited by examiner

Primary Examiner—Akm Enayet Ullah
(74) Attorney, Agent, or Firm—Carlton H. Hoel; W. James Brady; Frederick J. Telecky, Jr.

(57) ABSTRACT

Optical network dispersion compensation with adaptive dynamic optical filters which relate magnitude and phase of multichannel optical signals.

14 Claims, 28 Drawing Sheets

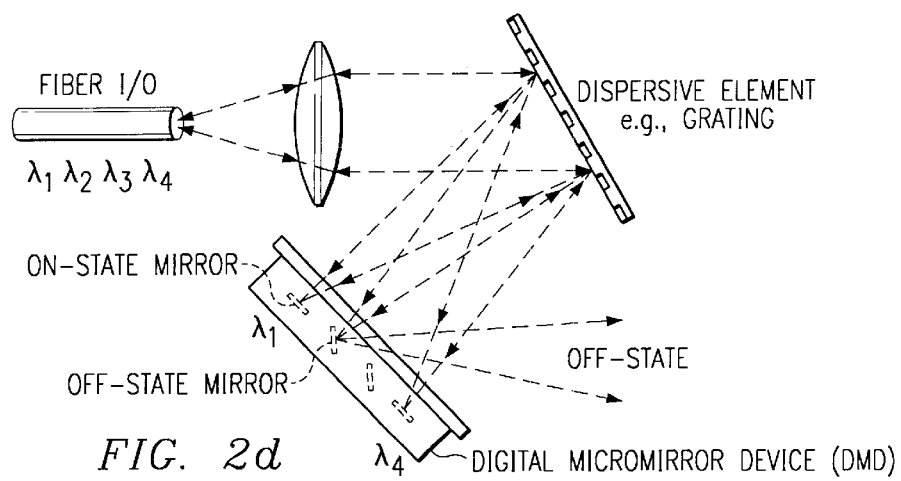
FIG. 2d
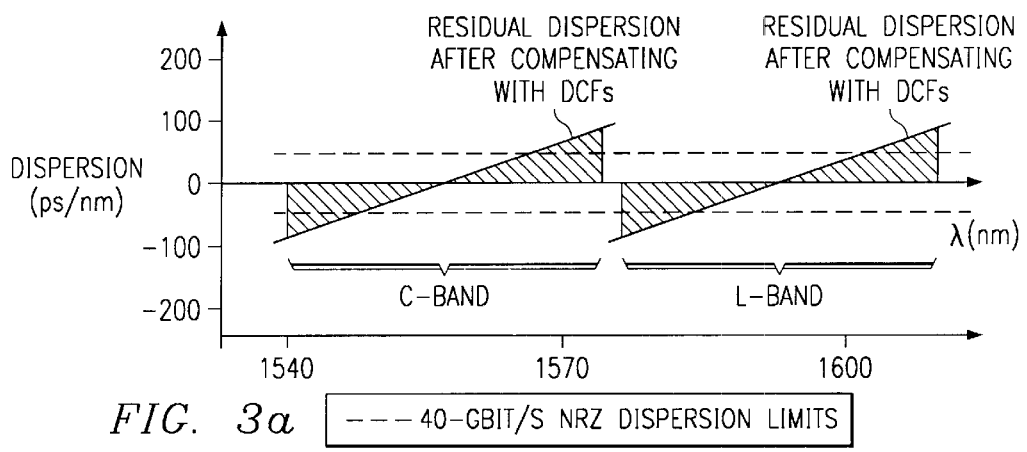
FIG. 3a   --- 40-GBIT/S NRZ DISPERSION LIMITS
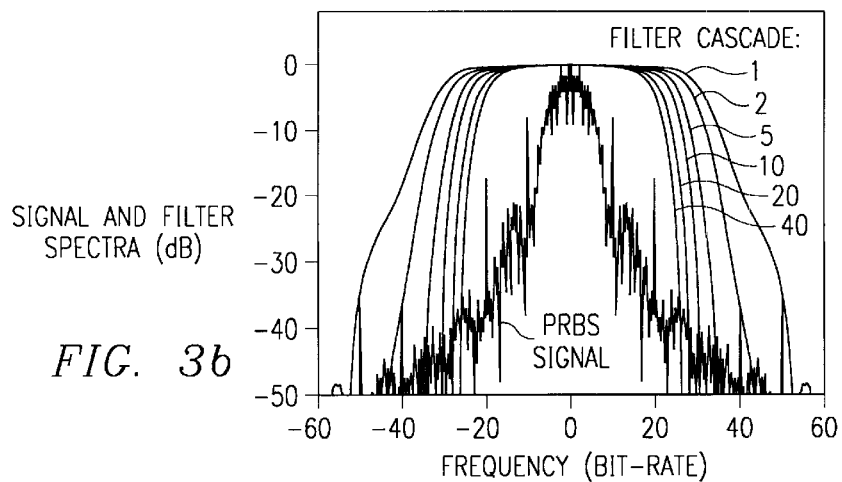
FIG. 3b

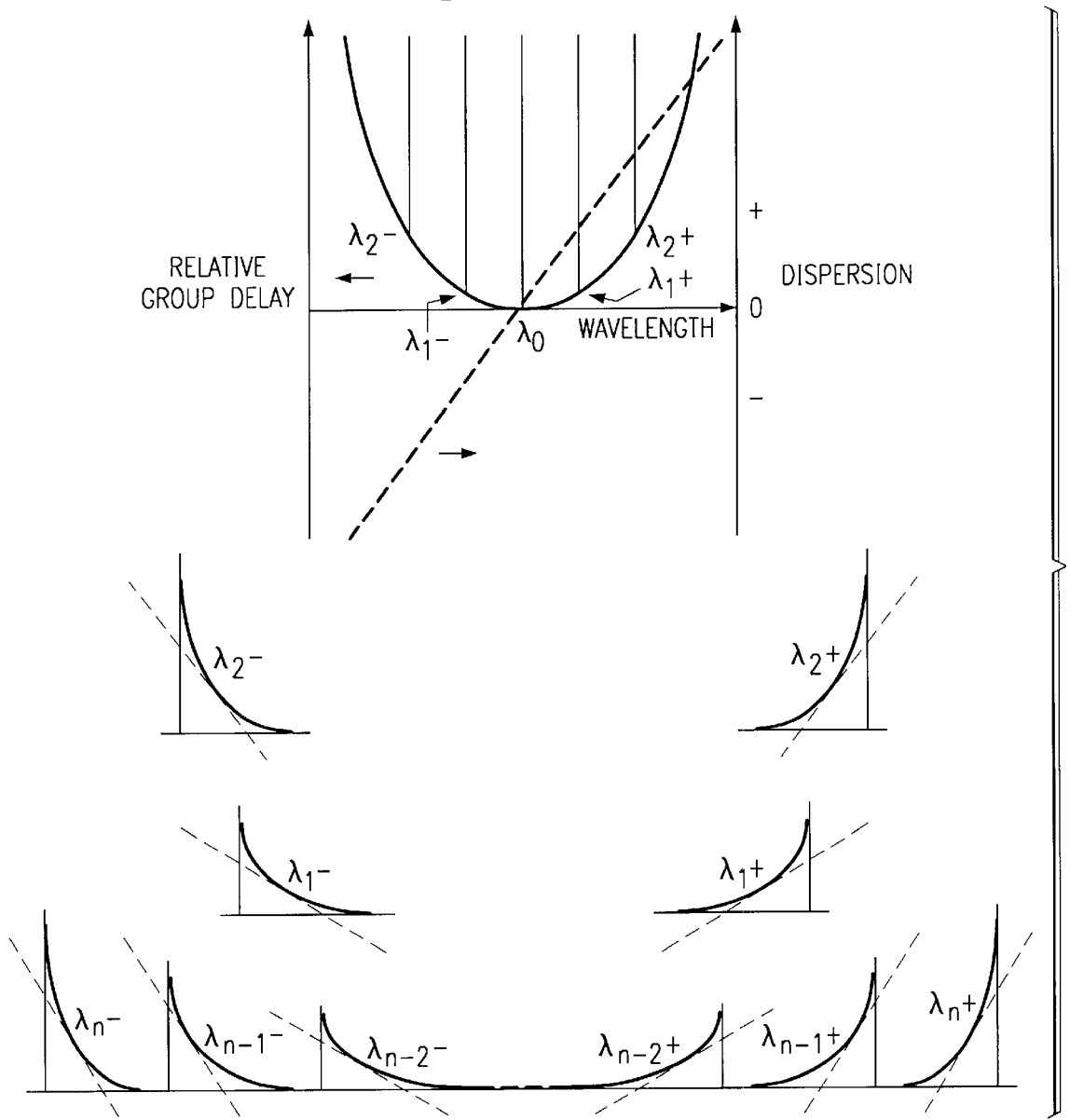

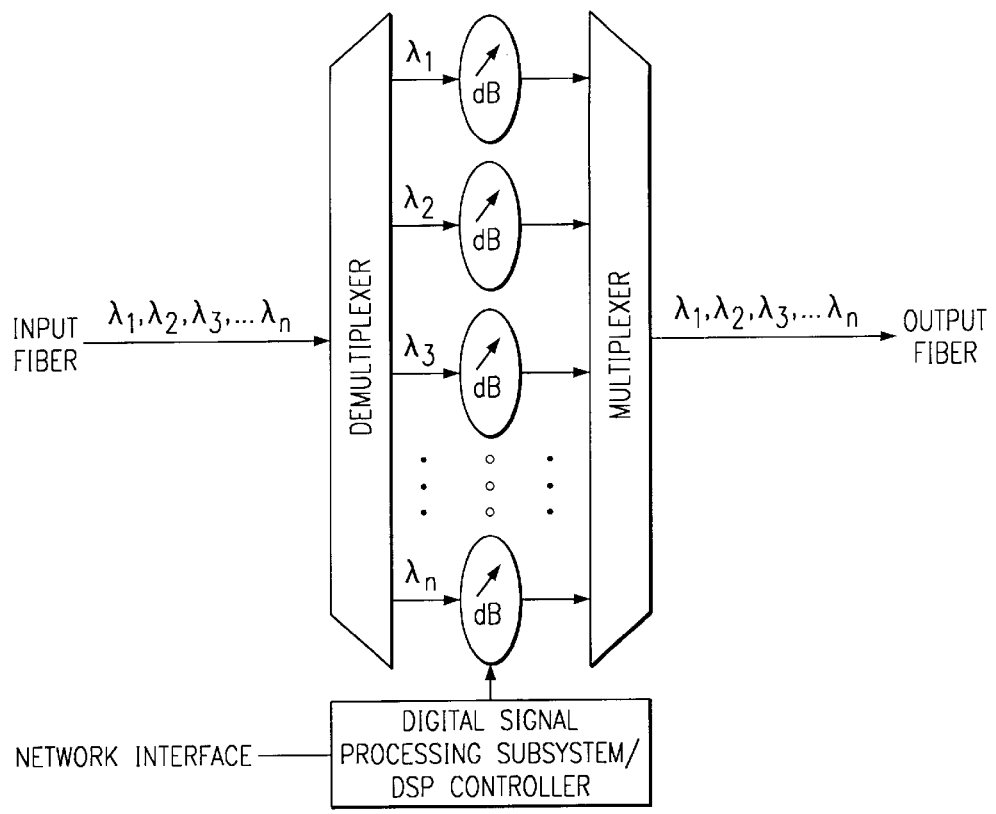
FIG. 5
FIG. 6a  $Log|H(e^{j\omega})|=\hat{H}_{Re}(e^{j\omega})$
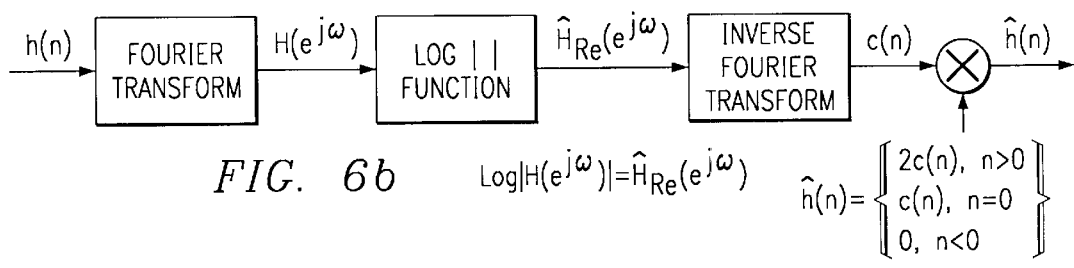
FIG. 6b  $Log|H(e^{j\omega})|=\hat{H}_{Re}(e^{j\omega})$    $\hat{h}(n)=\begin{cases} 2c(n), & n>0 \\ c(n), & n=0 \\ 0, & n<0 \end{cases}$ $Log|H(k)| = \hat{H}_{Re}(k)$ $$\hat{h}_{cp}(n) = \begin{Bmatrix} 2c_p(n), & 1 \le n < N/2 \\ c_p(n), & n = 0, N/2 \\ 0, & N/2 < n \le V-1 \end{Bmatrix}$$

$Log|H(k)| = \hat{H}_{Re}(k)$ $$\hat{h}_{cp}(n) = \begin{Bmatrix} 2c_p(n), & 1 \le n < N \\ c_p(n), & n = 0, N \\ 0, & N < n \le 2N-1 \end{Bmatrix}$$

FIG. 24a
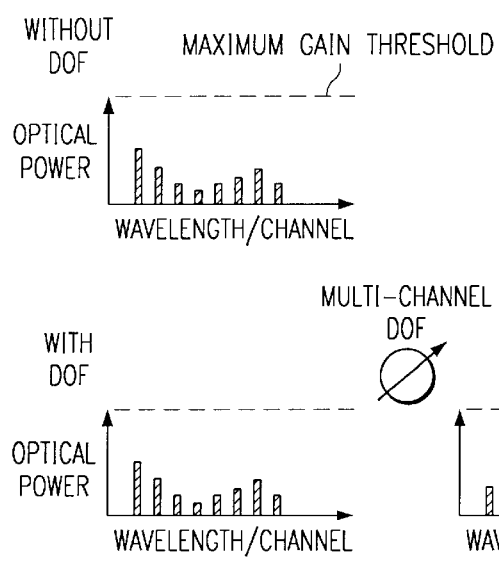
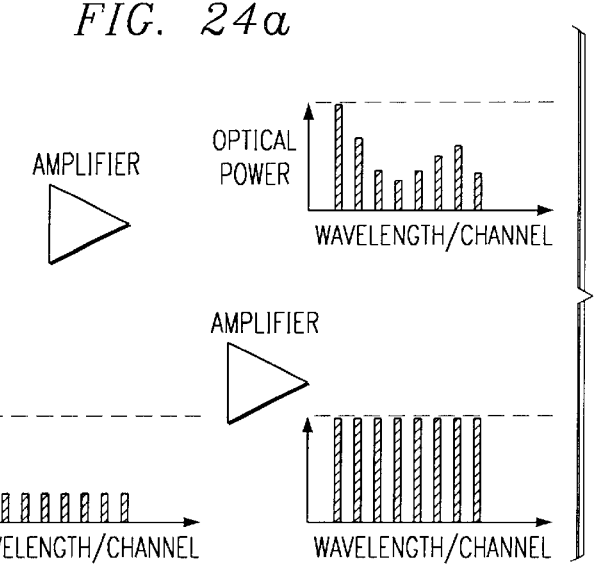
FIG. 24b
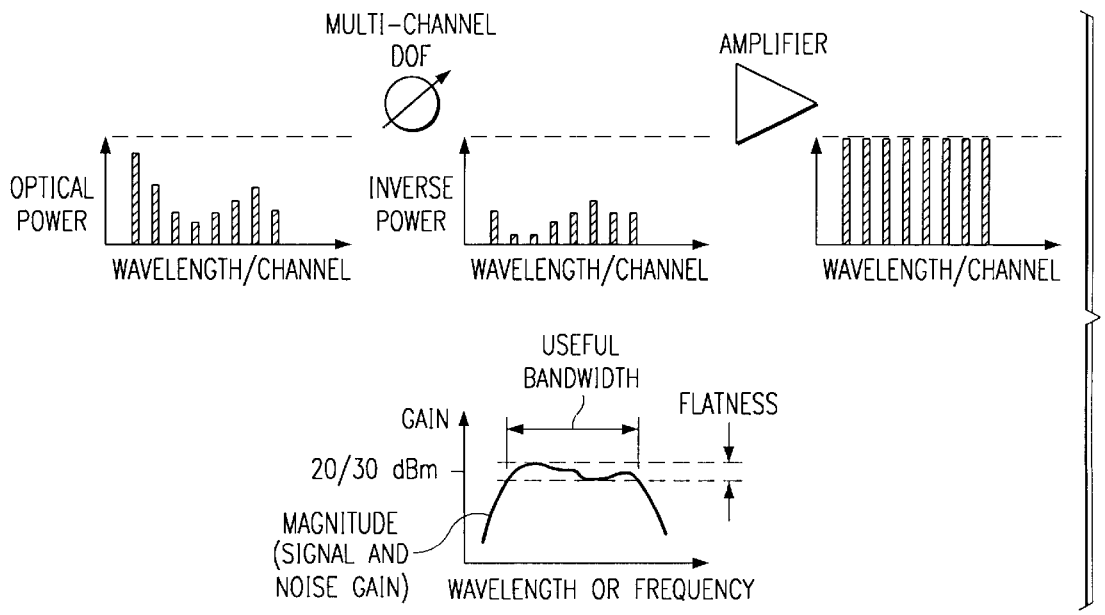

OPTICAL SYSTEM AND METHOD

CROSS-REFERENCE TO RELATED APPLICATIONS

This application claims priority from provisional application: Serial No. 60/313,559, filed Aug. 20, 2001. Cofiled application Ser. No. 10/224,146 have a common assignee.

BACKGROUND OF THE INVENTION

The invention relates to electronic devices, and more particularly to dispersive optical systems, compensation methods, optical transfer function designs, and corresponding devices.

The performance of long-haul and high-speed dense wavelength division multiplexed (DWDM) optical communication networks depends upon monitoring and adapting to changing circumstances such as load variations, signal degradation, dispersion, and so forth. Indeed, within a single-mode optical fiber the range of (free space) wavelengths from roughly 1540 nm to 1570 nm (the "C-band") may be partitioned into channels with each channel including a width 0.2 nm of used wavelengths and adjacent 0.2 nm of unused wavelengths (e.g., 50 GHz periodicity); and links of such optical fiber may have lengths of several thousand km. Similarly for the L-band (roughly 1580 nm to 1610 nm). Data pulses formed from frequencies confined to the wavelengths of a single channel initially do not interfere with pulses formed from frequencies of another channel assigned to a different wavelength, and thus multiple data pulses from different sources may simultaneously propagate down the fiber. Clearly, narrow channel spacing provides greater overall data rates, but requires greater limits on non-linearities of the optical fibers and attendant devices. Indeed, optical networks have various problems such as the following.

(1) Non-uniform gain across wavelengths by the typical erbium doped fiber amplifier (EDFA) leads to signal power non-linearities and cross-talk between channels, and static gain flattening cannot adapt to changing circumstances.

(2) Large power transients arising from adding/dropping of channels and optical switching with cascaded EDFAs.

(3) Optical filters typically have static characteristics and cannot track dynamic changes to EDFAs and add/drop channels.

(4) Multi-band dispersion and chromatic dispersion create channel interference over long-hauls and limit transmission length to roughly $1/BD\Delta\lambda$ where B is the bit rate (pulse repetition rate), D is the dispersion in ps/nm/km, and $\Delta\lambda$ is the channel bandwidth. Various approaches to compensation for this dispersion include chirped fiber Bragg gratings together with optical circulators which cause differing wavelengths to travel differing distances to compensate for the dispersion. Also, U.S. Pat. No. 6,310,993 discloses chromatic dispersion compensation by use of a virtually imaged phased array.

Digital micromirror devices (DMD) provide a planar array of micromirrors (also known as pixels) with each micromirror individually switchable between an ON-state and an OFF-state in which input light reflected from a micromirror in the ON-state is directed in one direction and the light reflected from an OFF-state micromirror is directed in another direction. DMD arrays may have sizes on the order of 1000×1000 micromirrors with each micromirror on the order of 10 um×10 um. See U.S. Pat. No. 6,323,982 for a recent DMD description.

SUMMARY OF THE INVENTION

The present invention provides optical filtering according to both amplitude and phase by a transfer function approach. Such optical filtering provides dispersion compensation in an optical network or optical system. Preferred embodiment optical filters include DMD devices with wavelengths dispersed over the array of micromirrors for individual attenuation.

This has advantages including increased capacity for digital optical wavelength division systems.

BRIEF DESCRIPTION OF THE DRAWINGS

The drawings are heuristic for clarity.

FIGS. 2a–2d show preferred embodiment optical filters.

FIGS. 3a–3d and 4 illustrate group delay and dispersion.

FIG. 5 is an optical filter.

FIGS. 6a–6d show Hilbert transform analysis.

FIGS. 24a–24b show power effects.

DETAILED DESCRIPTION OF THE PREFERRED EMBODIMENTS

1. Overview

Figure 1:
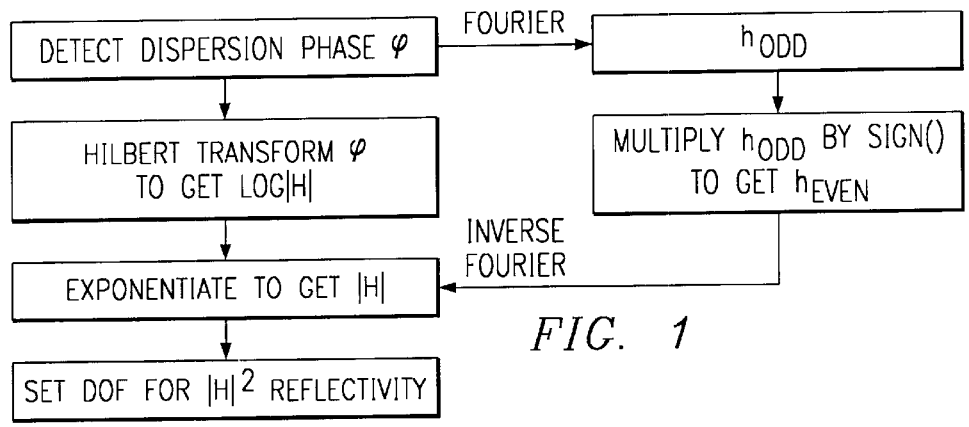
FIG. 1 is a flow diagram for an optical filter method.

Preferred embodiment adaptive chromatic dispersion and dispersion slope compensation methods achieve phase modulation among channels in a wave division multiplexed (WDM) system by applying amplitude modulation among the channels with an optical filter (minimum-phase and/or non-minimum-phase optical transfer functions). Further preferred embodiments provide design methodologies treating optical links as transfer functions which corresponding compensation filters complement. FIG. 1 illustrates minimum-phase filter amplitude determination methods. Preferred embodiment dynamic optical filters (DOFs) are implemented with digital micromirror devices with the fraction of micromirrors active for radiation within a wavelength band determining the attenuation for that band.

Preferred embodiment adaptive DOFs combine preferred embodiment DOFs with feedback control.

Preferred embodiment adaptive optical amplifiers combine optical amplifiers with preferred embodiment adaptive DOFs for amplifier gain control by attenuation (input or output).

Preferred embodiment optical network power transient control methods invoke a simple model of transient prediction and apply preferred embodiment adaptive DOFs to apply the compensation.

Preferred embodiment optical networks and optical systems use preferred embodiment devices and/or methods.

In particular, FIGS. 2a–2d illustrate in functional block form preferred embodiment DOFs using DMD micromirror devices; the controller may be a digital signal processor (DSP) or general purpose programmable processor or application specific circuitry or a system on a chip (SoC) such as a combination of a DSP and a RISC processor on the same chip with the RISC processor as controller. Control routines would be stored in memory as part of a dynamic optical filter, and a stored program in an onboard or external ROM, flash EEPROM, or ferroelectric RAM for a DSP or programmable processor could perform the signal processing.

The preferred embodiments have the following applications:

In general: fixed and/or adaptive optical transfer function (magnitude plus phase) designs as opposed to the known methodology of optical devices which control the intensity (magnitude function only) of a light signal.

In networking: dynamic provisioning/reconfiguration; dynamic optical amplifier transient suppression; adaptive/dynamic optical signal equalization; adaptive/dynamic optical amplifier gain equalization; adaptive/dynamic gain/tilt slope equalization; adaptive/dynamic ASE and gain peaking suppression; adaptive/dynamic polarization dispersion loss/polarization dependent gain penalty equalization; adaptive chromatic dispersion compensation; and phase compensated adaptive/dynamic inverse filtering.

In devices: dynamic optical filter with an optical amplifier; bandpass and bandstop optical filters; optical add/drop multiplexer (OADM); multichannel variable optical attenuator; multichannel optical performance monitor; and optical cross-connect (OXC).

In control: multichannel automatic level control for EDFA; multichannel automatic level control for OADM; and multichannel automatic level control for OXC.

In routing: multiband add/drop; multiband routing; and multiband filtering.

In monitoring/management: OSNR/BER enhancement; channel drop BER measurement; live optical performance monitoring; live optical channel/power monitoring; adaptive/dynamic network management; and adaptive/dynamic dispersion slope management.

2. Dispersion Generally

First preferred embodiment dispersion compensation methods employ a dynamic optical filter (DOF) which can be implemented with a digital micromirror device (DMD) as generically illustrated in cross sectional view by FIG. 2d. Such a DMD-DOF can be operated as a minimum-phase filter, and this permits phase compensation to be determined by the programmable amplitude modulation (channel attenuation). DMD reflective amplitude modulation consists of controlling reflectivity of the various subarrays of micromirror array of the DMD by ON-OFF settings of the micromirrors. However, each micromirror when operated with coherent light, acts as a phasor with magnitude and phase characteristics.

In order to explain the operation of the preferred embodiment, first consider chromatic dispersion and dispersion slope generally and then in a wavelength division multiplexed network. In particular, let t denote time, z denote distance along an optical link (optical fiber), $\omega$ denote angular frequency of optical signals in the optical link, and $\beta(\omega)$ denote the optical link propagation constant at frequency $\omega$. That is, an ideal (infinite duration) wave of a single frequency $\omega$ propagates through the fiber as $\exp[j(\omega t - \beta(\omega)z)]$. In practice, information is sent as a sequence of pulses propagating through the optical fiber with each pulse formed from a narrow range of frequencies (i.e., the frequencies of a single DWDM channel). Such a pulse propagates with a group velocity which differs from the phase velocity, and the pulse typically spreads in time. Explicitly, at z=0 a pulse x(t) made of a superposition of frequencies about a center frequency $\omega_c$ may be represented (ignoring electric and magnetic field vectors and real part operation) by its Fourier decomposition:

$$x(t) = \int X(\omega) \exp[j\omega t] d\omega$$

where the spectrum, $X(\omega)$, is concentrated near $\omega_c$; that is, $X(\omega - \omega_c)$ is essentially nonzero only near 0. For example, a pulse with a gaussian-envelope would be $$x(t) = \int \exp[-\sigma^2(\omega - \omega_c)^2 / 2] \exp[j\omega t] d\omega$$
$$= \exp[j\omega_c t] \exp[-t^2 / 2\sigma^2] / \sqrt{(2\pi)}\sigma$$

where $\sigma$ is the standard deviation and is a measure of pulse width (duration in time).

In a WDM system the pulses in the various wavelength (frequency) channels all simultaneously propagate through the same optical fiber and by superposition essentially form one composite pulse. A pulse propagates by propagation of each of its frequency components:

$$x(t,z) = \int X(\omega) \exp[j(\omega t - \beta(\omega)z)] d\omega$$

Thus for a link of length L, the received pulse corresponding to a transmitted pulse x(t) is $$x(t,L) = \int X(\omega) \exp[j(\omega t - \beta(\omega)L)] d\omega$$

Simplify x(t,L) by expressing $\omega$ as a difference from the center frequency, $\omega_c$, and expanding $\beta(\omega)$ in a Taylor series about $\omega_c$. That is, change variables from $\omega$ to $\Delta\omega = \omega - \omega_c$ and approximate $\beta(\omega) = \beta_c + \beta_1(\Delta\omega) + \beta_2(\Delta\omega)^2/2$ where $\beta_1 = d\beta/d\omega$ and $\beta_2 = d^2\beta/d\omega^2$. Inserting this into the integral yields:

$$x(t, L) = \int S(\Delta\omega) \exp[j((\Delta\omega + \omega_c)t - \beta_c L - \beta_1 L(\Delta\omega)^2 - \beta_2 L(\Delta\omega)^2 / 2)] d\Delta\omega$$
$$= \exp[j(\omega_c t - \beta_c L)] \int S(\Delta\omega) \exp[-j\beta_2 L(\Delta\omega)^2 / 2] \exp[j(t - \beta_1 L)\Delta\omega] d\Delta\omega$$

where for notational convenience, writing $x(t) = s(t)\exp[j\omega_c t]$ will make s(t) the baseband signal (envelope of x(t)), and thus $S(\omega)$, the Fourier transform of s(t), equals $X(\omega - \omega_c)$. The exponential preceding the integral is just a carrier wave of frequency $\omega_c$ and is delayed by the time required for this carrier wave to propagate a distance L, namely, $\beta_c L/\omega_c$. That is, the phase velocity is $\omega_c/\beta_c$.

The $\exp[j(t-\beta_1 L)\Delta\omega]$ inside the integral is just the inverse Fourier transform factor and expresses the group velocity of $1/\beta_1$ for the pulse; that is, the inverse Fourier transform of (phase-modified) envelope transform S( ) is evaluated at time $t-\beta_1 L$. Hence, the pulse peak is delayed $\beta_1 L$ by propagating the distance L, and this translates to a group velocity of $1/\beta_1$. The variation of group velocity with frequency leads to the chromatic dispersion, so when $\beta_2$ is not 0, the group velocity varies and dispersion arises.

The $\exp[-j\beta_2 L(\Delta\omega)^2/2]$ inside the integral does not depend upon t, but may be considered as part of the envelope spectrum $S(\Delta\omega)$ and just modifies the pulse shape.

Indeed, for the gaussian envelope pulse example, $$S(\Delta\omega)=\exp[-(\Delta\omega)^2\sigma^2/2]$$

and so the pulse at z=L is $$x(t, L) = \exp[j(\omega_c t - \beta_c L)] \int \exp[-(\Delta\omega)^2\sigma^2/2]\exp[-j\beta_2 L(\Delta\omega)^2/2]\exp[j(t-\beta_1 L)\Delta\omega]d\omega$$

$$= \exp[j(\omega_c t - \beta_c L)]\exp[-(t-\beta_1 L)^2(A+jB)/2]\sqrt{((A+jB)/2\pi)}$$

where $A=\sigma^2/(\sigma^4+(\beta_2 L)^2)$ and $B=\beta_2 L/(\sigma^4+(\beta_2 L)^2)$. So the pulse magnitude is:

$$|x(t,L)|=\exp[-(t-\beta_1 L)^2/2\sigma^2(1+(\beta_2 L)^2/\sigma^4)]\sqrt{(|A+jB|/2\pi)}$$

Thus the pulse peak propagates to z=L in time $\beta_1 L$, and consequently the pulse (group) velocity, $v_g$, equals $1/\beta_1$. Also, the pulse has spread from a standard deviation of $\sigma$ a standard deviation of $\sigma\sqrt{(1+(\beta_2 L)^2/\sigma^4)}$. Thus successive pulses will have large overlap when $|\beta_2 L|$ becomes comparable to $\sigma^2$; and this limits the propagation distance L. Again, non-zero $\beta_2$ implies a group velocity dependence upon frequency and attendant dispersion.

3. Dispersion Among Channels

Now consider dispersion in the case of multiple channels. A dense wavelength division multiplexed (DWDM) network simultaneously transmits a superposition of multiple pulses, one pulse for each center wavelength (frequency) in each channel. Thus the Fourier transform for the superposition will be the corresponding superposition of the Fourier transforms of the individual pulses. However, pulses in differing channels will have arrival times corresponding to the various group velocities of the channels; that is, the dependence of group velocity on wavelength disperses the arrival times of the pulses in time. In particular, define chromatic dispersion, D, as:

$$D=d(1/v_g)/d\lambda=d^2\beta/d\lambda d\omega$$

The time a pulse propagating at group velocity $v_g$ takes to travel distance L equals $T=L/v_g$. Thus the difference in arrival times of two pulses with center frequencies (wavelengths) differing by $\Delta\omega(\Delta\lambda)$ can be approximated as $$\Delta T = dT/d\omega\Delta\omega$$
$$= d(L/v_g)/d\omega\Delta\omega$$
$$= Ld^2\beta/d\omega^2\Delta\omega$$
$$= L\beta_2\Delta\omega$$
$$= DL\Delta\lambda$$

where the free space wavelength $\lambda$ relates to the angular frequency by $\omega=2\pi c/\lambda$. Thus $\Delta\omega=-2\pi c/\lambda^2\Delta\lambda$. The second derivative $\beta_2$ is called the GVD (group velocity dispersion) and thus $D=-2\pi c/\lambda^2\beta_2$. And the dependence of arrival time on frequency means pulses in the various channels of a WDM lose synchronization propagating over optical fiber links, and phase compensation can restore synchrony.

With the deployment of ultra long-haul (e.g., 6000 km) and high-speed (up to 40 Gbits/s) dense wavelength division multiplexed (DWDM) networks, multi-band dispersion-slope compensation becomes necessary in addition to chromatic dispersion compensation for a fiber network. And the preferred embodiments can improve current dispersion-slope compensation methods. First of all, conventional chromatic dispersion compensation is done with a DCF (dispersion compensating fiber) or an optical filter for of the C-band and the L-band.

When a DCF (dispersion compensating fiber) is used for dispersion compensation, the residual dispersion is still large enough to exceed the dispersion limit at the edges of the C-band and the L-band as shown in FIG. 3a. However, with dispersion slope compensation techniques, the residual dispersion after chromatic dispersion compensation with a dispersion compensating fiber becomes even smaller to within the dispersion limit. This residual dispersion can then be compensated with a wide-band adaptive chromatic dispersion compensator such as in preferred embodiments.

Figure 3C:
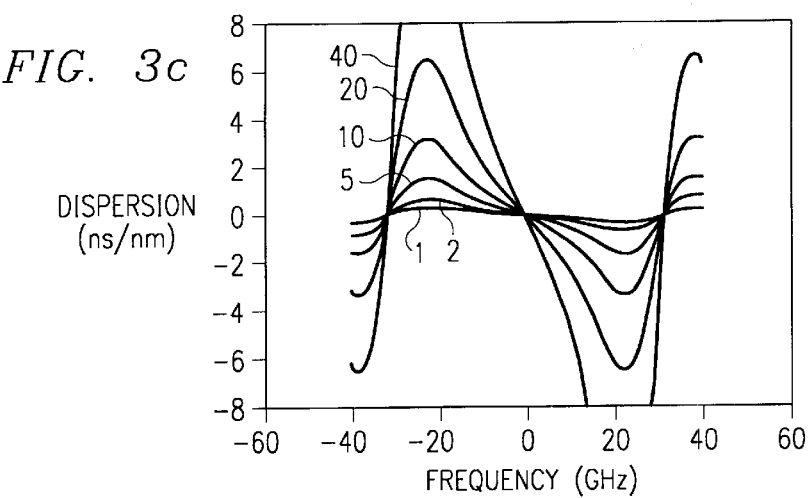
Figure 3D:
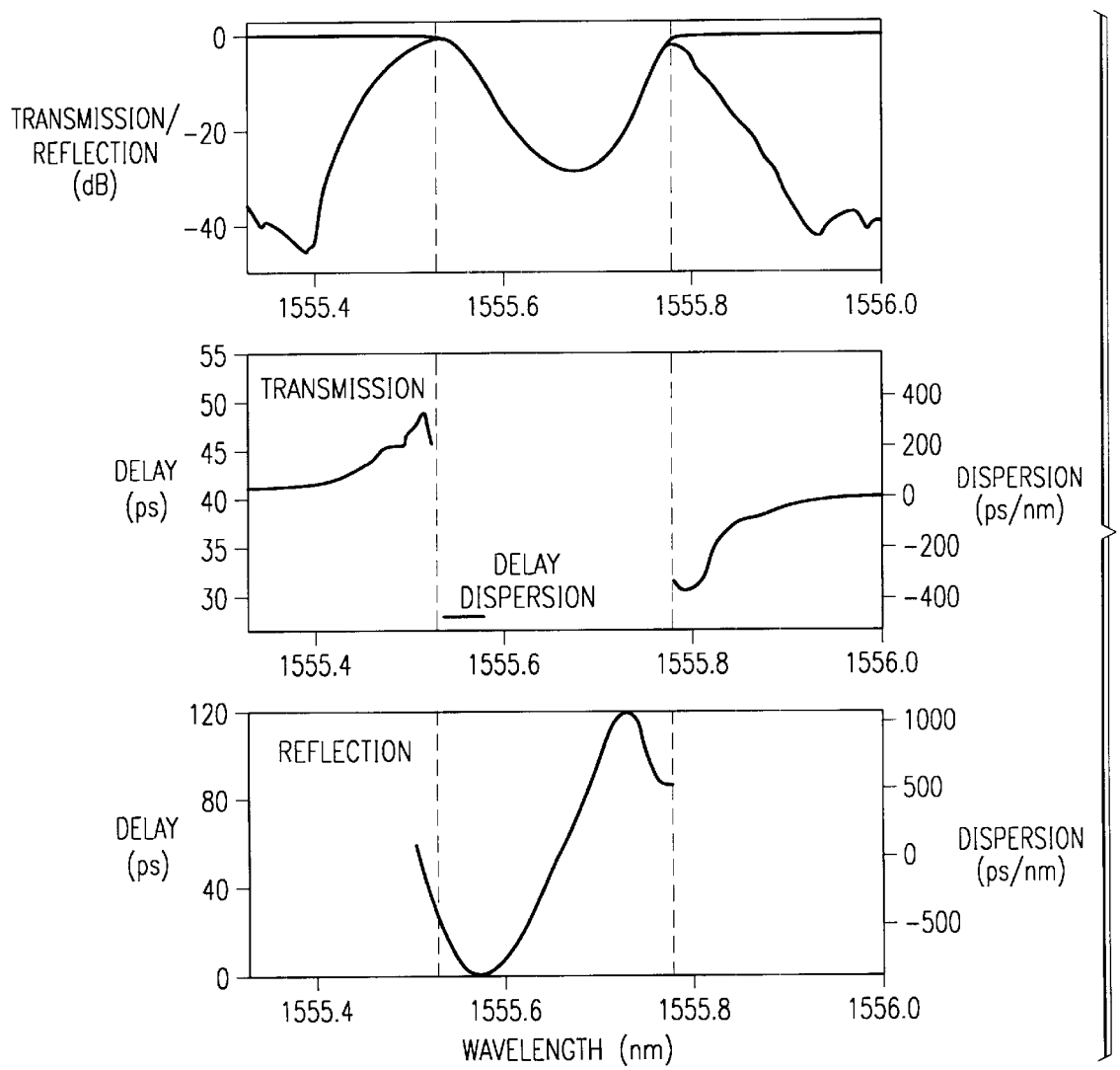

When chromatic dispersion compensation is done with an optical filter for the C-band and the L-band, these optical filters often have poor dispersion characteristics at their band edges thereby limiting their overall useful bandwidth and the number of these filters that can be cascaded in a fiber network. Moreover, a large number of these optical filters will have to be used in a multi-band dispersion compensation application and the performance of adjacent channels can be greatly affected by the dispersion distortion at the band edges of these static filters. FIGS. 3c–3d show the calculated magnitude and dispersion characteristics of the popular Fiber Bragg grating filter and the results of a cascade (up to 40) of such static optical filters. For these cascaded flat top optical filters, the effective passband bandwidth narrows relatively slightly on cascading as many as 40 filters.

In contrast, the individual static optical filter dispersions add up dramatically, with dispersion becoming the dominant signal distortion mechanism of the cascade that requires compensation.

FIG. 3e shows the more popular quoted parameter group delay characteristic for the Fiber Bragg Grating optical filter along with its magnitude response and dispersion characteristic. The top part of the figure shows the magnitude response of the transmission characteristic (bold line) along side with the reflection characteristic (dotted line) of a fiber Bragg Grating optical filter. The middle part shows the transmission group delay (dotted line) and the dispersion associated (bold line). The bottom part shows the reflection group delay (dotted line) and the dispersion associated (bold line). The associated dispersion being the derivative of the group delay.

Clearly, the group delay distortion and dispersion effects are highest at the band edges. This results in power penalty for the optical transmission link and/or transmission errors unless compensated. Preferred embodiments provide methodology, procedures, and systems used for dispersion or dispersion slope compensation for fiber network including compensation for static optical filters (e.g. used in conjunction with an Erbium-doped fiber amplifier).

4. Multi-Band Chromatic Dispersion/Dispersion Slope Compensation

As mentioned previously, multi-band dispersion-slope compensation is needed with the deployment of ultra long-haul (e.g., 6000 km) and high-speed (up to 40 Gbits/s) dense wavelength division multiplexed (DWDM) networks. This is in addition to chromatic dispersion compensation for a fiber network.

FIG. 4 shows the group delay characteristic of a typical single mode fiber (SMF) with a somewhat parabolic group delay curve and its slope (chromatic dispersion). The individual diagrams show the magnified views of the group delays and slopes (dispersion) at four different wavelengths (lambdas) on the group delay curve.

It is obvious that the group delays and slopes are different towards the band edges than at the center of the wavelength band (e.g. C-band) where the group delay and dispersion are at a minimum. This gives rise to the need for a multi-band chromatic dispersion/dispersion-slope compensator to individually tailor the compensation to individual segments (bands) of the fiber where each band contains at least one lambda or DWDM channel.

Implicit in the above description, the C-band or L-band of a DWDM fiber bandwidth is sub-divided into multiple segments, forming a multi-band scenario where each band contains at least one lambda or DWDM channel. Therefore each band covers an unequal number of channels depending on the group delay and slope values in that band. Clearly, bands at the C-band or L-band edges have higher values of group delay and dispersion slope than those at the center of the C-band or L-band. Therefore more channels can be grouped into bands closer to the center than at the edges of the C-band or L-band of a DWDM fiber.

In general, optical filters can be static and dynamic. Furthermore, they can be broadly classified as:
(a) Minimum Phase (MP) filters vs Non-minimum Phase (Non-MP) filters.
(b) Finite Impulse Response (FIR) filters vs Infinite impulse Response (IIR) filters.

These characteristics of optical filters are essential to the understanding of their phase response which ultimately lead to their dispersion characteristics. Furthermore, the phase and magnitude responses of these filters are well described by the science of Digital Signal Processing (DSP). While the methods and systems described here are generally applicable to all these optical filters (both static and dynamic), a preferred embodiment Dynamic Optical Filter (DOF) implemented using digital light processing (DLP™) technology of Texas Instruments is particularly suited to a multi-band, multi-channel implementation. In such a Dynamic Optical Filter, each wavelength band can be spatially sampled with a number of micromirrors in a digital micromirror device (DMD) device that is the heart of the DLP™ technology. Since the DMD is fundamentally digital and fully programmable, it can easily host any adaptive algorithm, making it an Adaptive Dynamic Optical Filter (ADOF).

5. Dispersion and Phase

Preferred embodiments compensate for chromatic dispersion and dispersion slope in a DWDM network by using a dynamic optical filter (DOF) to modulate the phase among the various channels. In effect, the preferred embodiments treat the transmission through a DWDM link as a linear filtering of the input signal and compensate for the dispersion in the link by applying a compensating linear filter with compensating phase modulation. Realizing the compensating linear filter as a minimum-phase filter permits setting phase modulation by specification of amplitude modulation. Thus the preferred embodiments measure dispersion compensation needed, translate this into amplitude attenuation needed, and apply such attenuation with a preferred embodiment DOF. In particular, FIG. 5 illustrates functional blocks of a dynamic optical filter for a fiber with n channels at center frequencies $\lambda_1, \lambda_2, \ldots, \lambda_n$. The dynamic optical filter simply attenuates the amplitude in each channel.

Initially, assume that the power level in an optical fiber is below that required for the onset of nonlinear effects; then a linear filter can represent the transmission characteristics of the fiber as follows. First, express optical fiber dispersion by use of the Taylor series of the propagation constant $\beta(\omega)$ about the center frequency $\omega_c$:

$$\beta(\omega)=\beta(\omega_c)+\beta_1(\omega_c)(\omega-\omega_c)+\beta_2(\omega_c)(\omega-\omega_c)^2/2$$

And the phase at time t=T and distance z=L along the fiber is (presuming 0 phase at t=0 and z=0):

$$\begin{aligned}\varphi(\omega) &= \omega T - \beta(\omega)L \\ &= (\omega_c + (\omega - \omega_c))T - [\beta(\omega_c)L + \beta_1(\omega_c)L(\omega - \omega_c) + \\ &\quad \beta_2(\omega_c)L(\omega - \omega_c)^2/2] \\ &= \varphi(\omega_c) + \Delta\omega T - [\beta_1(\omega_c)L\Delta\omega + \beta_2(\omega_c)L(\Delta\omega)^2/2] \\ &= \varphi(\omega_c) + \Delta\omega(T - \beta_1(\omega_c)L) - \beta_2(\omega_c)L(\Delta\omega)^2/2\end{aligned}$$

where $\Delta\omega=\omega-\omega_c$. And setting T equal to the time the group velocity at the center frequency takes to propagate distance L, the middle term on the right hand side of the equation vanishes. Thus the phase difference $\Phi(\omega)-\Phi(\omega_c)$ equals $-\beta_2(\omega_c)L(\Delta\omega)^2/2$. And the deviation in time of arrival of different frequencies can now be expressed with relative phase as $$\Delta t = d\Phi d\omega = -\beta_2(\omega_c)L\Delta\omega/2$$

where $\Delta t = t - t_c$ and $t_c$ is the arrival time of the center frequency. This is the phase of a signal pulse traveling through a dispersed medium such as a standard optical fiber without dispersion compensation.

6. Linear Filter Model

The preferred embodiment methods recast the foregoing dispersion and phase analysis of an optical link as a linear filter transfer function. In general, a linear filter with transfer function $H(\omega)$ applied to an input signal x(t) with spectrum $X(\omega)$ yields an output signal y(t) with spectrum $Y(\omega)$ as $$Y(\omega)=H(\omega)X(\omega)$$

This corresponds to a convolution of x(t) with h(t) to yield y(t) where h(t) is the filter impulse response and has spectrum $H(\omega)$. $H(\omega)$ is typically a complex-valued function which can be written in polar form as:

$$H(\omega)=|H(\omega)|e^{j\Phi(\omega)}$$

Thus for the preceding DWDM case of an input at z=0 and an output at z=L, $H(\omega)$ will be the transfer function of the optical fiber of length L with phase approximated as above: $\Phi(\omega)=\Phi(\omega_c)+\Delta\omega[T-\beta_1(\omega_c)L]-\beta_2(\omega_c)L(\Delta\omega)^2/2$. In this case the preferred embodiment compensation uses a dynamic optical filter as in FIG. 5 having a transfer function with phase $\beta_2(\omega_c)L(\Delta\omega)^2/2$; this makes the overall phase change (optical fiber plus dynamic optical filter) independent of frequency. That is, the dynamic optical filter provides group delay equalization and compensates for the dispersion of the optical link.

More generally, the frequency-dependent group delay may be written as the derivative of the phase $\Phi(\omega)$ of the transfer function $H(\omega)$:

$$\tau(\omega)=-d\Phi(\omega)/d\omega$$

And in an optical fiber (or other transparent optical system) of length L, $$\Phi(\omega)=L\omega n(\omega)/c$$

where $n(\omega)$ is the refractive index and c the speed of light in vacuum. Thus $c/n(\omega)$ is the phase velocity, so $Ln(\omega)/c$ is the time to propagate a distance L, and hence $\omega Ln(\omega)/c$ is the phase. Further the group delay can be rewritten as:

$$\tau(\omega)=Ln_g(\omega)/c$$

where $n_g(\omega)$ is defined as the group refractive index:

$$n_g(\omega)=n(\omega)+\omega dn(\omega)/d\omega$$

and chromatic dispersion for a distance L can be written as $$D(\lambda)=d\tau(\omega)/d\lambda$$

where $\omega=2\pi c/\lambda$ and so $\Delta\omega=(-2\pi c/\lambda^2)\Delta\lambda$. Therefore $$D(\lambda) = Ld(n_g(\omega)/c)/d\lambda$$
$$= Ld(1/v_g(\omega))/d\lambda$$
$$= Ld(d\beta(\omega)/d\omega)/d\lambda$$

where $\beta(\omega)=\omega n(\omega)/c$ and $\Phi(\omega)=\beta(\omega)L$.

Alternatively, if only the group delay $\tau(\omega)$ is given, the phase spectrum $\Phi(\omega)$ can be obtained by integration of the group delay:

$$\varphi(\omega) = \int_0^\omega \tau(\xi)d\xi$$

Either the phase spectrum or the group delay spectrum can be used as the input specification for chromatic dispersion compensation by the dynamic optical filter of FIG. 5 because chromatic dispersion is the derivative of group delay with respect to $\lambda$ (wavelength) and the group delay can be derived from chromatic dispersion as:

$$\tau(\omega) = \int_0^\omega D(\lambda)d\lambda$$
$$= \int_0^{2\pi c/\lambda} D(\lambda)d\lambda$$

7. Dispersion Compensation Method with Optical Filter

Although the methodology discussed here is applicable to all optical filters implemented with various materials and technologies, special consideration is given to dispersion compensation by a dynamic optical filter (DOF) implemented with Texas Instruments DLP™ technology. Also, the DOF is digital, programmable (re-configurable) and capable of supporting adaptive compensation methods. The DOF can be implemented as a minimum phase filter or non-minimum phase filter depending on the compensation required. At the heart of the DOF is a Digital Micromirror Device (DMD) that serves as a DWDM lightwave modulator. With the DLP™ technology, a DWDM signal from an input fiber is first dispersed by a dispersive element, such as a grating, into its respective wavelengths (lambdas) and reflected off of the DMD device.

The DOF performs dispersion compensation by adjusting its phase characteristics thereby changing its group delay and ultimately chromatic dispersion characteristics. Since the DMD device fundamentally reflects light waves, its reflectance characteristic is what gives the DOF optical feedback, i.e. recursiveness, in a recursive filter structure known as an IIR (Infinite Impulse Response) filter. An IIR filter such as a Fiber Bragg Grating has poles in the passband and zeros in the stopband(s). A pole is responsible for a bandpass characteristic in the transfer function with $+\tau(\omega)$. A zero is a notch function with $-\tau(\omega)$. Contrary to recursive-due-to-reflectance is non-recursive, i.e., FIR (Finite Impulse Response) transmission filters such as WGR (Waveguide Grating Router) and MZI (Mach-Zehnder Interferometer). An FIR transfer function has only transmission zeros throughout for both passband and stopband(s).

The DOF changes its magnitude function via attenuation. As its attenuation at a specified wavelength changes so does its phase function. Therefore a DOF can change its phase spectrum via attenuation particularly at sharp transition edges. Since the DOF primarily attenuates and changes its phase as a result, it is necessary to have a way to specify its phase spectrum by way of its magnitude function only. The resultant intensity of the light waves reflected off of the DMD device is equal to the square of the filter's magnitude function (i.e. power=magnitude squared).

From classical system theory, any physical passive device can be totally characterized by its impulse response h(t) or its transfer function $H(\omega)$ which is generally complex-valued:

$$H(\omega)=H_{Re}(\omega)+jH_{Im}(\omega)=|H(\omega)|\exp[j\Phi(\omega)]$$

where $H_{Re}(\omega)$ and $H_{Im}(\omega)$ are the real and imaginary parts of $H(\omega)$. $H(\omega)$ is related to h(t) via the Fourier Transform. Since passive devices are stable and causal, their impulse responses must be real, causal, and stable too. From these observations, we can decompose h(t) further into its even and odd parts via standard signal processing.

$$h(t) = h_e(t) + h_o(t)$$

where $$h_e(t) = \frac{1}{2}[h(t) + h(-t)]$$

$$h_o(t) = \frac{1}{2}[h(t) - h(-t)]$$

Thus $h_e(t)$ and $h_o(t)$ are related by means of the following relationships:

$$h_e(t)=h_o(t)\text{sign}(t)$$

$$h_o(t)=h_e(t)\text{sign}(t)$$

where the sign function sign(t) is equal to 1 and −1 for positive and negative time respectively. Since convolution in the time domain implies multiplication in the frequency domain and multiplication in the time domain implies convolution in the frequency domain, the corresponding relations for the transfer function are:

$$H_{Re}(\omega) = \frac{1}{2\pi}\left[jH_{Im}(\omega) * \frac{2}{jw}\right]$$

-continued $$jH_{Im}(\omega) = \frac{1}{2\pi}\left[H_{Re}(\omega) * \frac{2}{jw}\right]$$

where * is the convolution integral and the Fourier Transform of sign(t) equals 2/jω. Clearly the real part is uniquely determined by the imaginary part and vice versa. This relationship is the well-known Hilbert Transform (also known as the Kramers-Kronig Transform in the literature).

Another observation is that a causal h(t) can be recovered from either its odd or even part as follows:

$$h(t) = \begin{cases} 2h_e(t), & t > 0 \\ h_e(t), & t = 0 \\ 0, & t < 0 \end{cases}$$

$$h(t) = \begin{cases} 2h_o(t), & t > 0 \\ h(0), & t = 0 \\ 0, & t < 0 \end{cases}$$

An important consequence is the implication that the Fourier Transform H(ω) of a real, causal and stable h(t) is completely known if we know either the real part $H_{Re}(\omega)$ or the imaginary part $H_{Im}(\omega)$ and h(0). This is because $H_{Re}(\omega)$ is the Fourier Transform of $h_e(t)$ and $jH_{Im}(\omega)$ is the Fourier Transform of $h_o(t)$. Using the above relationships, one can then compute $h_e(t)$ from $H_{Re}(\omega)$ and then compute h(t) from $h_e(t)$. Once h(t) is known, one can then compute H(ω).

Since the DOF can only manipulate attenuation levels of the input light waves, the next logical step in a minimum phase compensation methodology is to look for a relationship between the magnitude (the square-root of intensity) and phase response of the DOF.

Reconstruction or retrieval of the phase spectrum from magnitude or amplitude-only data is not a new problem and can be solved by the application of the Hilbert transform and the use of the Complex Cepstrum analysis. Consider the complex logarithm of H(ω) as follows:

$$\log H(\omega) = \log\{|H(\omega)|\exp[j\phi(\omega)]\}$$
$$= \log|H(\omega)| + j\left[\varphi_{\min}(\omega) + 2m\pi\right]$$

with $\Phi_{min}(\omega)$ ranging in values between $-\pi$ to $\pi$ and m is any integer and reflects the multivalued nature of the logarithm function. Since H(ω) is the Fourier Transform of h(t) and h(t) is real, causal and stable, log|H(ω)| and j[$\Phi_{min}(\omega)$+2mπ] are also related by means of the Hilbert Transform. However, for a unique phase relationship with the magnitude response, the transfer function of the DOF has to be of the minimum-phase configuration. This means that all its zeros and poles are within the unit circle of the z-plane (Z-Transform domain) or on the left side of the s-plane (Laplace Transform domain). This also means that the minimum-phase system is causal and stable with a causal and stable inverse. The minimum-phase response can therefore be reconstructed from amplitude-only data by using the Complex Cepstrum Analysis.

In this manner, the above minimum-phase transfer function is given by:

$$\log H_{min}(\omega) = \log|H(\omega)| + j[\Phi_{min}(\omega)]$$

for which the minimum-phase spectrum is then uniquely given by the Hilbert Transform of the log of the magnitude of the amplitude data. In other words, the minimum-phase as a function of ω is given by:

$$\phi_{\min}(\omega) = \frac{1}{\pi}P.V.\int_{-\alpha}^{\alpha}\frac{\ln|H(\lambda)|}{\lambda - \omega}d\lambda$$

where P.V. denotes a Cauchy principal-value integral and λ is an integration variable. The function $\Phi_{min}(\omega)$ implies that the phase angle at a given frequency ω depends on the magnitude at all frequencies.

Since the numerical evaluation of the above integral is quite complicated, the Wiener-Lee Transform is usually applied to the integral variable to simplify its evaluation. Alternatively, the Complex Cepstrum Analysis implemented in the digital (discrete-time) domain can be used to solve for the phase spectrum given the magnitude function as depicted in FIG. 6a in which the input h(n) to the Cepstrum Analyzer is a digital sequence and is the discrete-time version of the continuous-time h(t). The output of the Cepstrum Analyzer is c(n), the Cepstrum. Since the Complex Cepstrum Analysis is used, the above diagram is modified to give the Complex Cepstrum output ĥ(n) as shown in the FIG. 6b. In general, one has to use complex Logarithm and complex Fourier Transform but when h(n) is real, its Complex Cepstrum ĥ(n) is also real and only real Logarithm is used.

For a minimum phase h(n), its Complex Cepstrum ĥ(n) is causal. This means that one only has to compute the real part $\hat{H}_{Re}(\omega)$ of Ĥ(ω) to get ĥ(n). Recall from the previous discussion that the inverse Fourier Transform of $\hat{H}_{Re}(\omega)$ in FIG. 6b is equal to the even part of the signal ĥ(n), which is given as the Cepstrum signal c(n):

$$c(n) = \frac{1}{2}\left[\hat{h}(n) + \hat{h}(-n)\right] \text{ and } \hat{h}(n) = \begin{cases} 2c(n), & n > 0 \\ c(n), & n = 0 \\ 0, & n < 0 \end{cases}$$

Taking the Fourier Transform of ĥ(n) yields Ĥ(ω) which is the natural logarithm of H(ω). Therefore the magnitude function can be recovered from the real part $\hat{H}_{Re}(\omega)$ as:

$$|H(\omega)| = \exp\hat{H}_{Re}(\omega)$$

and the phase can be uniquely obtained from the imaginary part of Ĥ(ω).

A preferred embodiment Dynamic Optical Filter for dispersion compensation uses a Digital Signal Processor for signal processing. It is therefore convenient to compute the forward Discrete Fourier Transform (DFT) and the inverse Discrete Fourier Transform (IDFT) on such a processor.

Also, in the case of a minimum-phase implementation with the DFT, the mathematical representation can be simplified since the DFT can be computed with the Fast Fourier Transform (FFT). The preferred embodiments use the Fast Fourier Transform for the computation of the DFT and its inverse IDFT. Some background introduction to the DFT is included here for completeness.

The DFT of h(n), a discrete signal of length N, for n=0, ..., N−1, is given by:

$$H(k) = \sum_{n=0}^{N-1}h(n)e^{-j\frac{2\pi k n}{N}} \text{ for } k = 0, \ldots, N-1$$

H(k) represents the $k^{th}$ spectral component of the discrete signal h(n) having a period of N.

The IDFT recovers h(n) from H(k) and is given by:

$$h(n) = \frac{1}{N}\sum_{k=0}^{N-1} H(k)e^{j\frac{2\pi kn}{N}} \text{ for } n = 0, \ldots, N-1$$

8. Implementation with the Complex Cepstrum Analysis

Figure 6C:
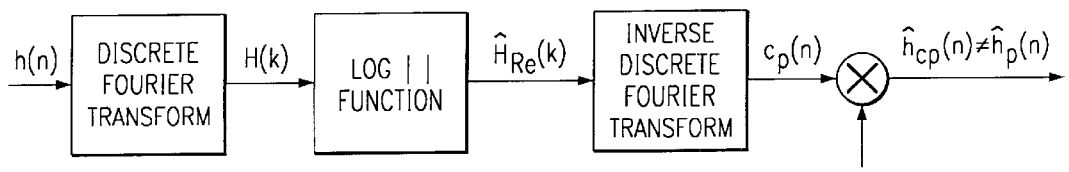

FIG. 6c illustrates an implementation of the Complex Cepstrum using the periodic Discrete Fourier Transform. Periodicity implies the spectrum H(k) is periodic in N as well. Now the following equations apply:

$$\hat{H}(k) = \log H_{min}(k) = \log|H(k)| + j[\Phi_{min}(k)]$$

$$\hat{H}_{Re}(k) = \log|H(k)|$$

So $\hat{H}(k)$ can be thought of as a causal minimum-phase spectrum with real part equal to $\hat{H}_{Re}(k)$ and with imaginary part as the minimum-phase spectrum to be recovered. The Cepstrum signal is given by:

$$c_p(n) = \frac{1}{N}\sum_{n=0}^{N-1} \hat{H}_{Re}(k)e^{j\frac{2\pi kn}{N}}$$

Here the subscript p stands for periodic and c(n) is periodic with a DFT implementation. Also, FIG. 6b is changed to reflect the DFT implementation as shown in FIG. 6c. Clearly, from the above equations, the periodic Cepstrum $c_p(n)$ is aliased, that is, $$c_p(n) = \sum_{n=-\alpha}^{\alpha} c(n + iN)$$

To compute the periodic Complex Cepstrum $\hat{h}_{cp}(n)$ from $c_p(n)$ in accordance with FIG. 6c, write:

$$\hat{h}_{cp}(n) = \begin{bmatrix} 2c_p(n), & 1 \leq n < \frac{N}{2} \\ c_p(n), & n = 0, \frac{N}{2} \\ 0, & \frac{N}{2} < n \leq N-1 \end{bmatrix}$$

For a perfect reconstruction, the goal is to compute $\hat{h}_p(n)$ given by:

$$\hat{h}_p(n) = \frac{1}{N}\sum_{n=0}^{N-1} \hat{H}(k)e^{j\frac{2\pi kn}{N}}$$

where $\hat{h}_p(n)$ is the periodic version of $\hat{h}(n)$ and, since $\hat{h}(n)$ in general has infinite duration, $\hat{h}_p(n)$ will be a time-aliased version of $\hat{h}(n)$.

Clearly $\hat{h}_{cp}(n) \neq \hat{h}_p(n)$ because it is the even part of $\hat{h}(n)$ that is aliased rather than $\hat{h}(n)$ itself. However, the digital sequence c(n) decays at least as fast as 1/n so for large N, $c_p(n)$ is much less aliased. Therefore, for large N, $\hat{h}_{cp}(n)$ can be expected to differ only slightly from $\hat{h}_p(n)$ and $\hat{h}_p(n)$ is approximately equal to $\hat{h}(n)$ itself.

In order to avoid aliasing of the Cepstrum and the Complex Cepstrum parameters, more resolution or a larger N is needed in the implementation. Alternatively zero-padding can be used to increase resolution (or a larger N) and/or some kind of a Cepstrum windowing function is needed to suppress noise and/or circular convolution (wrap around effect of a digitally sampled sequence).

9. Procedure for Specifying Phase from Amplitude Only

Figure 6D:
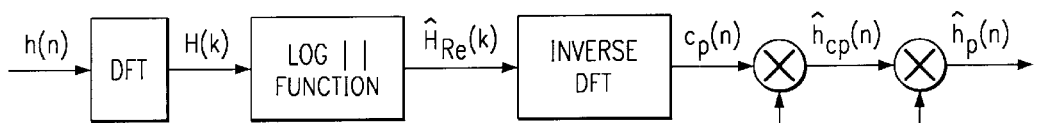

It has been shown that the phase response of a minimum-phase optical filter can be uniquely defined from its magnitude (square-root of reflectance or transmittance) because the logarithm of the filter's magnitude spectrum is related to its minimum-phase response by the Hilbert Transform. Since the Cepstrum windowing function in FIG. 6d is commutative, conceptually it can be done on the Cepstrum signal $c_p(n)$ or the Complex Cepstrum signal $\hat{h}_{cp}(n)$ (only the amplitude of the windowing function will be changed).

The procedure starts with a measurement data set |A(k)| for k=0 to N corresponding to the field amplitude at equi-spaced discrete positive frequencies ω(k) in the wavelength dispersion direction. These measurement data set is from the spectral reflectance $R(\omega_k)$ such that $|A(k)| = \sqrt{R(\omega_k)}$ or from the spectral transmittance such that $|A(k)| = \sqrt{R(\omega_k)}$.

In accordance with discrete-time digital signal processing, one can form a two-sided real and symmetrical magnitude spectrum |H(k)| from the above N-point data set into a 2N-point magnitude spectrum as follows:

$$|H(k)| = \begin{bmatrix} |A(k)| & k \leq N \\ |A(2N-k)| & k > N \end{bmatrix}$$

Next the logarithm of the two-sided magnitude spectrum is taken to yield log|H(k)|. In accordance to the methodology already discussed, now compute the inverse Discrete Fourier Transform (IDFT) of the logarithm of the field magnitude log|H(k)| via the inverse Fast Fourier Transform (IFFT). Any digital signal processing algorithm that computes the FFT or IFFT can be used.

At this point the Cepstrum $c_p(n)$ is computed where the subscript p stands for a periodic c(n) since a DFT is used in this implementation. Therefore: $c_p(n) = FFT^{-1}[\log|H(k)|]$ and the minimum phase Complex Cepstrum is computed as:

$$\hat{h}_{cp}(n) = \begin{bmatrix} 2c_p(n), & 1 \leq n < N \\ c_p(n), & n = 0, N \\ 0, & N < n \leq 2N-1 \end{bmatrix}$$

The Complex Cepstrum $\hat{h}_{cp}(n)$ or the Cepstrum $c_p(n)$ signal can now be windowed as shown in FIG. 6d to improve on noise performance. The windowing function acts as a noise filter, for example, a cosine window w(n) can be used:

$$w(n) = \cos^\alpha(\pi n/2N)$$

where $\alpha \geq 1$ can help with suppressing reconstruction phase errors near discontinuities due to finite precision processing with the FFT. When α is increased up to a value of 6, phase reconstruction noise suppression is still successful without degrading the overall accuracy by windowing. Alternatively, one can increase the size of the measurement data set N to improve on accuracy. As N is increased, the Complex Cepstrum is less aliased which will greatly improve on the overall accuracy.

Finally, reconstruct $\hat{H}(k)$ as follows:

$$\hat{H}(k) = \{FFT[\hat{h}_{cp}(n).w(n)]\}$$

Since $\hat{H}_{Re}(k) = \log|H(k)|$, reconstruct the magnitude of H(k) as follows:

$$|H(k)| = \exp Re\{FFT[\hat{h}_{cp}(n).w(n)]\}$$

The phase spectrum is reconstructed as:

$$\phi_{\min}(k) = \tan^{-1}\left[\frac{H_{Im}(k)}{H_{Re}(k)}\right]$$

Furthermore, the group delay is reconstructed as:

$$\tau(\omega) = -\frac{d\varphi_{\min}(\omega)}{d\omega}$$

or discretely as:

$$\tau(k) = -\frac{d\varphi_{\min}(k)}{dk}$$

For ease of implementation, a numerical differentiation (or differencing) can be used instead:

$$\tau(k+1) = \frac{\varphi_{\min}(k+1) - \phi_{\min}(k)}{\Delta\omega}$$

which is just the slope of the phase spectrum. Now, given the group delay values, the Chromatic Dispersion values can be found by:

$$D(\lambda) = \frac{d\tau(\omega)}{d\lambda}$$

or discretely as:

$$D(k+1) = \frac{\tau(k+1) - \tau(k)}{\Delta\lambda}$$

10. Zero-Padding Procedure for Specifying Phase from Amplitude Only

Further preferred embodiments use zero-extended Discrete Fourier Transform (DFT) and the methodology described previously. This addresses the incremental resolution increase required as discussed in the previous implementation by effectively doubling the resolution (i.e. length) of the $c_p(n)$ sequence in the above procedure. This is achieved by doubling the resolution (i.e. size) of the log|H (k)| or $\hat{H}_{Re}(k)$ spectrum as explained below.

Again, the procedure starts with a measurement data set |A(k)| for k=0 to N−1, corresponding to the field amplitude (magnitude) at equi-spaced discrete positive frequencies ω(k) in the wavelength dispersion direction. This measurement data set is from the spectral reflectance $R(\omega_k)$ such that $|A(k)|=\sqrt{R(\omega_k)}$ or from the spectral transmittance such that $|A(k)|=\sqrt{T(\omega_k)}$.

In accordance with discrete-time digital signal processing, one can form a two-sided real and symmetrical magnitude spectrum |H(k)| from the above N-point data set into a 2N-point magnitude spectrum as follows:

$$|H(k)| = \begin{cases} |A(k)| & k \leq N \\ |A(2N-k)| & k > N \end{cases}$$

Figure 7:
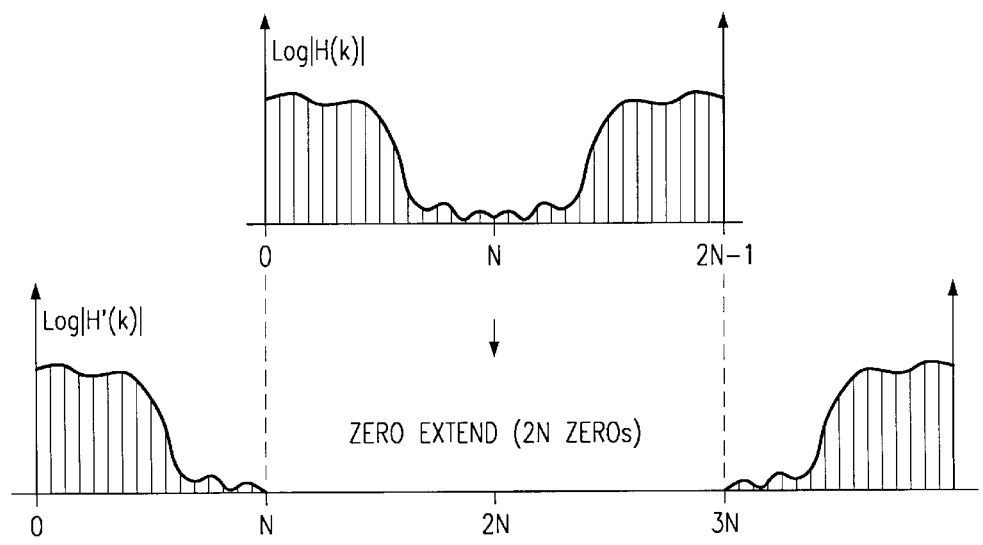
FIG. 7 shows a spectrum.

Next the logarithm of the two-sided magnitude spectrum is taken to yield log|H(k)|. At this time, log|H(k)| will be a 2N-point digital log spectrum. Now applying zero-extended DFT to this spectrum by inserting 2N zero's between the two symmetrical halves of log|H(k)| as shown in FIG. 7. This is now an extended 4N-point spectrum log|H'(k)| with doubled the sampling resolution.

In accordance to the methodology already discussed, compute the inverse Discrete Fourier Transform (IDFT) of the logarithm of the zero-padded or zero-extended field magnitude log|H(k)| via the inverse Fast Fourier Transform (IFFT). Any digital signal processing algorithm that computes the FFT or IFFT can be used.

At this point the zero-extended Cepstrum $c'_p(n)$ is computed where the subscript p stands for a periodic zero-extended c'(n) since a DFT is periodic. Therefore: $c'_p(n) = FFT^{-1}[\log|H'(k)|]$ and the minimum phase zero-extended Complex Cepstrum is computed as:

$$\tilde{h}'_{cp}(n) = \begin{cases} 2c'_p(n), & 1 \leq n < 2N \\ c'_p(n), & n = 0, 2N \\ 0, & 2N < n \leq 4N - 1 \end{cases}$$

The zero-extended Complex Cepstrum $\hat{h}_{cp}'(n)$ or the Cepstrum $c_p'(n)$ signal can now be windowed as before to improve on noise performance. The windowing function acts as a noise filter, for example, a cosine window w(n) can be used:

$$w(n) = \cos^\alpha\left(\frac{\pi n}{4N}\right)$$

where $\alpha \geq 1$ can help suppress reconstruction phase errors near discontinuities due to finite precision processing with the FFT. When α is increased up to a value of 6, phase reconstruction noise suppression is still successful without degrading the overall accuracy by windowing. Alternatively, one can increase the size of the measurement data set N to improve on accuracy. As N is increased, the Complex Cepstrum is less aliased which will greatly improve on the overall accuracy. With the zero-padded spectrum, N is effectively doubled, therefore, the resultant accuracy should be twice as good as before.

Finally, reconstruct $\hat{H}(k)$ as follows:

$$\hat{H}(k) = \{FFT[\hat{h}'_{cp}(n) \cdot w(n)]\}$$

Since $\hat{H}_{Re}(k) = \log|H'(k)|$, we can reconstruct the magnitude of H'(k) as $$|H'(k)| = \exp Re\{FFT[\hat{h}'_{cp}(n) \cdot w(n)]\}$$

The phase spectrum is reconstructed as:

$$\phi_{\min}(k) = \tan^{-1}\left[\frac{H'_{Im}(k)}{H'_{Re}(k)}\right]$$

Figure 8:
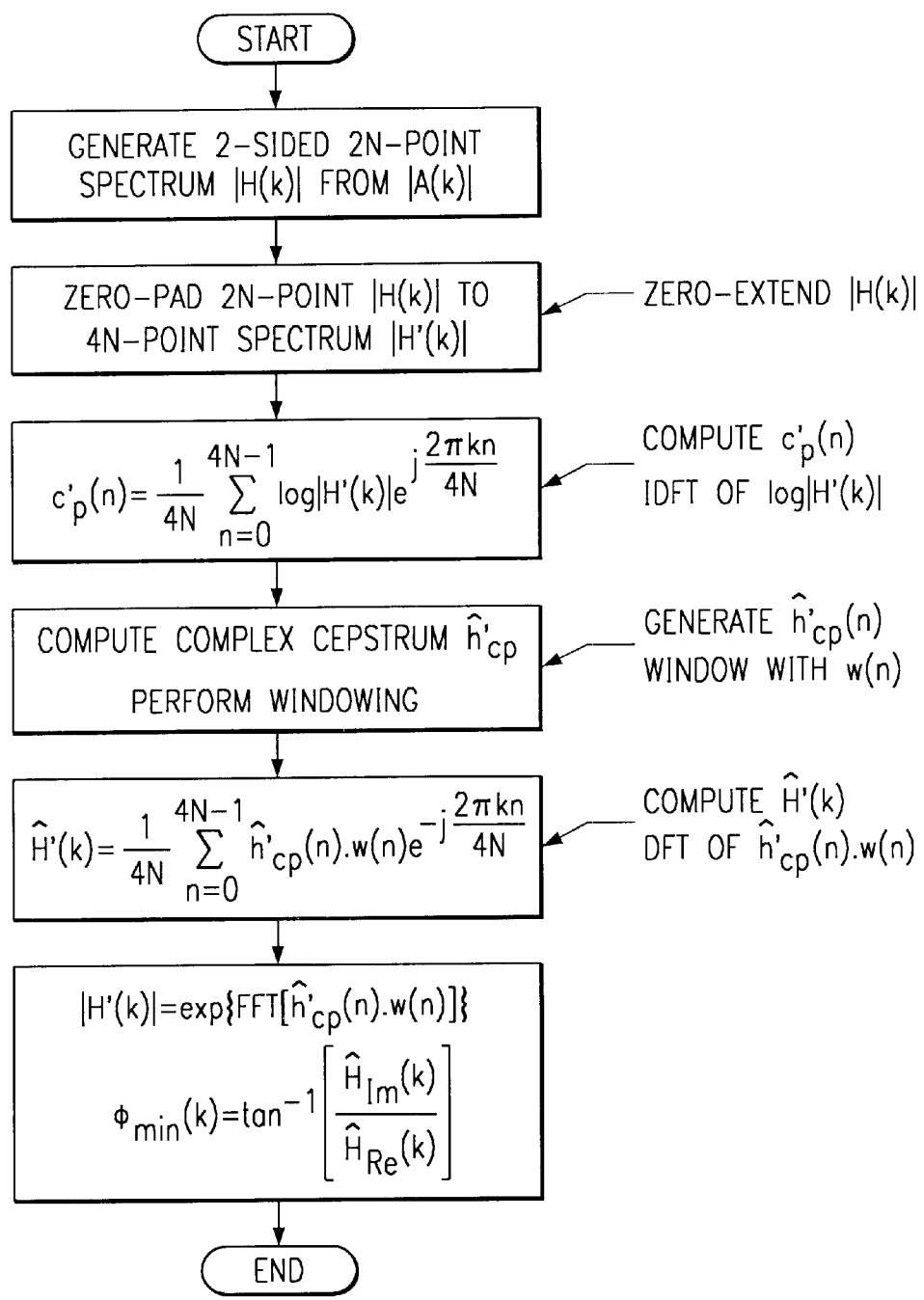
FIG. 8 is a flow diagram.

FIG. 8 is a flow diagram for the zero-padding method.

11. Implementation with the Discrete Hilbert Transform

Figure 9:
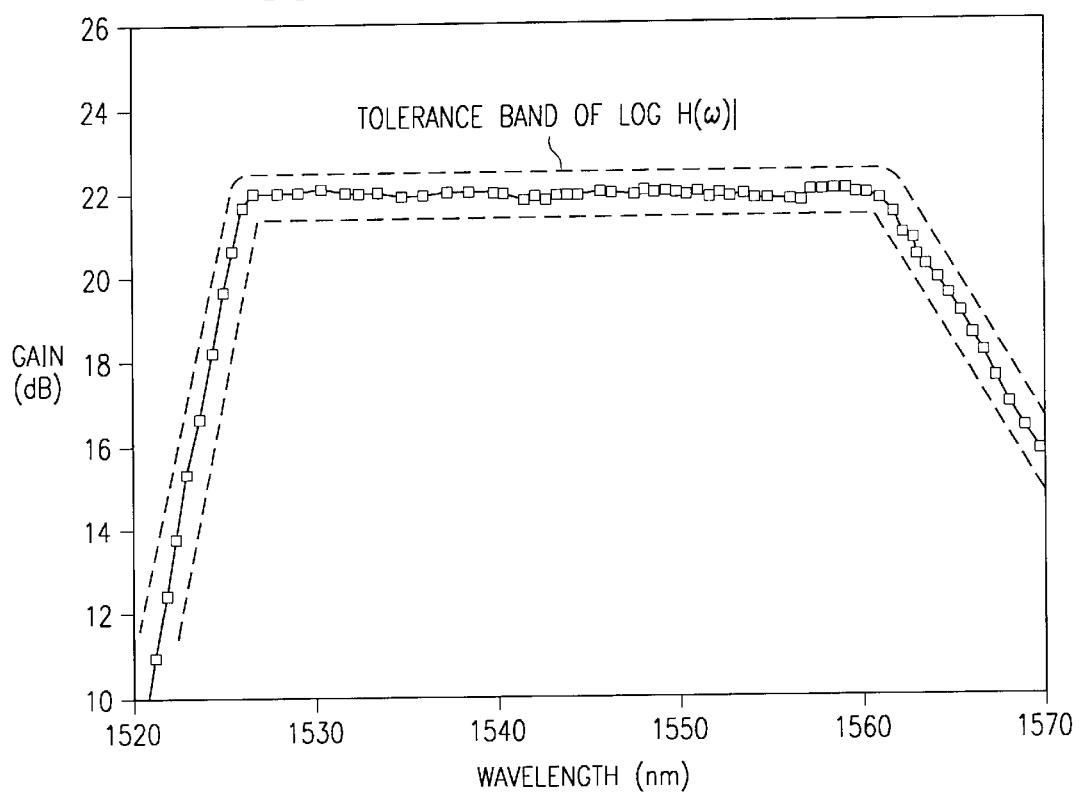
FIG. 9 shows a desired spectrum.

In most cases, such as dispersion compensation for the band edges of static optical filters, the dispersion or dispersion slope characteristic to be compensated is known. From this characteristic, the group delay and ultimately the phase spectrum can be obtained as discussed previously. Given the non-ideal phase spectrum as input, one can set about finding the appropriate magnitude function that would satisfy the dispersion compensation requirements via the Hilbert Transform relationship between the log magnitude and phase of a minimum phase transfer function. In addition, given a chromatic dispersion or dispersion slope compensation requirement, an error optimization loop or procedure can be used to iteratively or adaptively implement the group delay equalization that represents the required chromatic dispersion or dispersion slope compensation. Such a loop can be set up in conjunction with a given tolerance band of a desired magnitude spectrum as illustrated in FIG. 9. The error function is then given by:

$$e(\omega) = |H(\omega)| - |\hat{H}(\omega)|$$

In using the Hilbert Transform with a digital signal processor, one would use the discrete versions of the continuous-time transform relationships as shown below:

$$\log|H(e^{j\omega})| = \hat{h}(0) - \frac{1}{2\pi} P \cdot V \cdot \int_{-\pi}^{\pi} \phi(e^{j\omega}) \cot\left(\frac{\theta-\omega}{2}\right) d\theta$$

$$\phi(e^{j\omega}) = \hat{h}(0) - \frac{1}{2\pi} P \cdot V \cdot \int_{-\pi}^{\pi} \log|H(e^{j\omega})| \cot\left(\frac{\theta-\omega}{2}\right) d\theta$$

12. Procedure for Specifying Amplitude from Phase Only

The discrete version of the above Hilbert Transform relationships is as follows:

Magnitude: $\log|H(k)| = \hat{h}_p(0) + DFT[\text{sgn}(n).IDFT(j\phi(k))]$

Phase Spectrum: $\phi(k) = -jDFT[\text{sgn}(n).IDFT(\log|H(k)|)]$ where $\log|H(k)|$ and $\phi(k)$ are the discrete versions of $\log|H(\omega)|$ and $\phi(\omega)$, i.e., the Fourier Transform log-magnitude and unwrapped phase of a minimum phase signal $h(n)$. $\hat{h}_p(0)$ is the Complex Cepstral coefficient which corresponds to the scale factor of the signal $h(n)$. The scale factor can be made equal to unity by taking $\hat{h}_p(0)$ as zero. The discrete sign function is defined as:

$$\text{sgn}(n) = \begin{cases} 0, & n = 0, \frac{N}{2} \\ 1, & 0 < n < \frac{N}{2} \\ -1, & \frac{N}{2} < n < N \end{cases}$$

In general, it is the group delay $\tau(k)$ that is given rather than the phase spectrum directly. As $\tau(k)$ is the negative derivative of the phase spectrum $\phi(k)$, the unwrapped phase for the given $\tau(k)$ can be computed through the procedure described below.

For a transfer function to be minimum-phase, it should not have any linear phase component. Linear phase reflects as the averaged value in the group delay $\tau(k)$. As the average value of a minimum phase $\tau(k)$ is zero, the phase spectrum $\phi(k)$ computed from $\tau(k)$ will not have any linear phase component.

Also, there exists a relationship among the group delay $\tau(k)$, the Cepstral coefficients of the Complex Cepstrum analysis and the magnitude spectrum. Since the Cepstrum of a minimum phase sequence is a causal sequence, the logarithm of the frequency response can be expressed as:

$$\log H(k) = \frac{\hat{h}_p(0)}{2} + \sum_{k=1}^{\alpha} \hat{h}_p(k) e^{-jk\omega}$$

where $\hat{h}_p(k)$ represents the sequence of Cepstral coefficients.

Since $H(k) = \{|H(k)|\exp[j\phi(k)]\}$ therefore, $\log H(k) = \log\{|H(k)|\exp[j\phi(k)]\}$ $= \log|H(k)| + j[\varphi(k) + 2m\pi]$ where m is an integer.

Equating real and imaginary parts in the above equation for $\log H(\omega)$ yields:

$$\log|H(k)| = \frac{\hat{h}_p(0)}{2} + \sum_{k=1}^{\alpha} \hat{h}_p(k)\cos k\omega$$

$$\phi(k) + 2m\pi = -\sum_{k=1}^{\alpha} \hat{h}_p(k)\sin k\omega$$

Taking the negative derivative of the phase spectrum $\phi(k)$ yields $\tau(k)$ as:

$$\tau(k) = \sum_{k=1}^{\alpha} k \cdot \hat{h}_p(k)\cos k\omega$$

Therefore $$\frac{1}{k}\tau(k) = \log|H(k)| - \frac{\hat{h}_p(0)}{2}$$

where $\hat{h}_p(0)$ is the Cepstral coefficient which corresponds to the scale factor of the signal $h(n)$. As discussed previously, this scale factor can be made equal to unity by taking $\hat{h}_p(0)$ as zero.

Now define $\tau_d(k)$ as the desired group delay and the goal is to optimize $\tau(k)$ to become $\tau_d(k)$. Let $$\tau(k) = \frac{\tau_d(k) - \overline{\tau}_d(k)}{2}$$

where the average of $\tau_d(k)$ is $\overline{\tau}_d(k)$ given as:

$$\overline{\tau}_d(k) = \frac{1}{N}\sum_{k=0}^{N} \tau_d(k)$$

The following steps are used to determine both $\log|H(k)|$ and $\phi(k)$ given $\tau(k)$:

(1) Compute $\tau(k)$ given the desired group delay $\tau_d(k)$.
(2) Compute pseudo-Cepstral coefficients $p(n)$ via an N-point IDFT of $\tau(k)$.
(3) Compute $\hat{h}_p(n)$ from $p(n)$ as follows:

$$\hat{h}_p(n) = \begin{cases} \frac{p(n)}{n}, & 1 \leq n < \frac{N}{2} \\ 0, & n = 0, \frac{N}{2} \\ -\hat{h}_p(N-n), & \frac{N}{2} < n \leq N-1 \end{cases}$$

(4) Compute $\hat{H}(k)$ via DFT of $\hat{h}_p(n)$. The imaginary part of $\hat{H}(k)$ is the unwrapped phase spectrum $\phi(k)$ of the recovered transfer function.
(5) Compute $\log|H(k)|$ by forming a sequence $g(n) = \text{sgn}(n) \cdot \hat{h}(n)$ for $0 \leq n < N$ and taking the DFT of $g(n)$.
(6) Compute the recovered magnitude function $|H(k)|$ by taking $\exp[\log|H(k)|]$ where log is the natural logarithm function.
(7) The recovered transfer function of the optical filter is:

$$H(k) = \{|H(k)|\exp[j\phi(k)]\}$$

(8) An error optimization loop or procedure can be used to iteratively or adaptively implement the group delay equalization that represents the required chromatic dispersion or dispersion slope compensation. Such a loop can be set up in conjunction with a given tolerance band of a desired magnitude spectrum.

13. Non-minimum-phase Filter Dispersion Compensation Methods

Dispersion compensation with a minimum-phase system is relatively simple compared to compensation with a non-minimum phase system where the DOF transfer function has zeros outside of the unit circle in the z-plane or in the right side of the Laplace transform s-plane. The reason is that the phase response of a minimum phase system and the logarithm of its magnitude are uniquely related by the Hilbert transform. There is a one-to-one mapping of the phase and magnitude. Therefore, given a specific phase requirement, the resultant magnitude response can be determined uniquely. However, this may pose undesirable constraints on the resultant magnitude response in order to meet the phase requirement. Therefore, to meet phase and magnitude tolerance requirements, a non-minimum phase scenario may be required.

In general, there is no one-to-one mapping or unique relationship between the magnitude and phase of a non-minimum system because the unique phase and logarithmic magnitude relationship does not apply. However, there is a more general result of the Hilbert transform that also applies to a non-minimum phase system if the condition of causality is guaranteed. The principle of causality implies that the function $h(t)=0$ for $t<0$ and is non-zero otherwise. Any physical device can be characterized by its impulse response $h(t)$ or its transfer function, $H(\omega)$ where $H(\omega)=H_{Re}(\omega)+jH_{Im}(\omega)=|H(\omega)|e^{j\Phi(\omega)}$, and the real and imaginary parts are $H_{Re}(\omega)$ and $H_{Im}(\omega)$, respectively, and $H(\omega)$ and $h(t)$ are related by Fourier transform. Because such devices are stable and causal, their impulse responses must be real, causal, and stable too. For a causal system $H(\omega)$ its impulse response $h(t)$ can also be written as:

$$h(t) = (2/\pi)\int_0^\infty H_{Re}(\omega)\cos(t\omega)d\omega$$

$$h(t) = (-2/\pi)\int_0^\infty H_{Im}(\omega)\sin(t\omega)d\omega$$

Furthermore, $$\int_0^\infty |h(t)|^2 dt = (1/\pi)\int_{-\infty}^\infty |H_{Re}(\omega)|^2 d\omega = (1/\pi)\int_{-\infty}^\infty |H_{Im}(\omega)|^2 d\omega$$

And if $h(t)$ is bounded at $t=0$, we have the more general Hilbert transform relationship in terms of Cauchy principal value integrals as follows:

$$H_{Re}(\omega) = (-1/\pi)pv\int_{-\infty}^\infty H_{Im}(s)/(\omega-s)ds$$

$$H_{Im}(\omega) = (1/\pi)pv\int_{-\infty}^\infty H_{Re}(s)/(\omega-s)ds$$

In the digital domain, $h(t)$ becomes $h(n)$ and is a causal sequence where n is in the range 0 to N and with a Fourier transform $$H(\omega) = \sum_{0 \leq n \leq N} h(n)e^{-j\omega n + \varphi(n)} = H_{Re}(\omega) + jH_{Im}(\omega)$$

where $\Phi(n)$ is a phase shift associated with $h(n)$. Therefore, the real and imaginary parts yields.

$$H_{Re}(\omega) = h(0) + \sum_{0 \leq n \leq N} h(n)\cos[n\omega + \varphi(n)]$$

$$H_{Im}(\omega) = -\sum_{0 \leq n \leq N} h(n)\sin[n\omega + \varphi(n)]$$

Therefore, both $H_{Re}(\omega)$ and $H_{Im}(\omega)$ are related by $h(n)$ and $\Phi(n)$. Now if we are given the magnitude or amplitude function we can use the intensity relationship below to reconstruct the phase and ultimately the dispersion compensation required.

$$|H(\omega)|^2 = |H_{Re}(\omega)|^2 + |H_{Im}(\omega)|^2$$
$$= \left|h(0) + \sum_{0 \leq n \leq N} h(n)\cos[n\omega + \varphi(n)]\right|^2 +$$
$$\left|\sum_{0 \leq n \leq N} h(n)\sin[n\omega + \varphi(n)]\right|^2$$

Hence, if the intensity $|H(\omega)|^2$ function is given, we can solve for $h(n)$ and $\Phi(n)$ by way of an optimization procedure. In particular, define an error function $e(\omega)$ by:

$$e(\omega) = |H(\omega)|^2 - \left|h(0) + \sum_{0 \leq n \leq N} h(n)\cos[n\omega + \varphi(n)]\right|^2 -$$
$$\left|\sum_{0 \leq n \leq N} h(n)\sin[n\omega + \varphi(n)]\right|^2$$

Now we can optimize on a mean-square basis of minimizing the error $|e(\omega)|^2$. Once the unknown coefficients $h(n)$ and $\Phi(n)$ are found and optimized such that the value of the error function $e(\omega)$ is within a specified bound, the non-minimum-phase can be calculated as $$\varphi(\omega) = \arctan[H_{Im}(\omega)/H_{Re}(\omega)]$$
$$= \arctan\left[-\sum_{0 \leq n \leq N} h(n)\sin[n\omega + \varphi(n)] \bigg/ \left(h(0) + \sum_{0 \leq n \leq N} h(n)\cos[n\omega + \varphi(n)]\right)\right]$$

In practice, optimization for the above 2N+1 unknown parameters can be time consuming. An initial guess is normally used to accelerate the optimization procedure. In order to arrive at a reasonable initial guess, one can start with the power spectrum for $H(\omega)$, i.e., the intensity $|H(\omega)|^2$, and generate from it the minimum phase realization of $H(\omega)$ as discussed previously in the implementation for a minimum phase dispersion compensation. From this the minimum phase $\Phi_{min}(\omega)$ can be obtained. From $\Phi_{min}(\omega)$, one can get an estimate of the real part of the spectrum as:

$$H_{Re\ min}(\omega) = |H(\omega)|\cos[\Phi_{min}(\omega)]$$

By taking the Cosine transform of $H_{Re\ min}(\omega)$, we can obtain the coefficients $h(n)$. The initial guess for $\Phi(n)$ is set to 0. In addition, the discrete Cosine and Sine transforms are used for the computation of $h(n)$ while the arbitrary phase shift $\Phi(n)$ can be ignored to speed up optimization. Finally, this generalized procedure is both applicable to minimum phase and non-minimum phase systems.

14. Dynamic Optical Filters

FIG. 5 heuristically shows a generic dynamic optical filter (DOF) acting on a WDM signal. Such a DOF could be used in the previously-described dispersion compensation by channel attenuation. Fundamentally, a DOF attenuates light from different channels to attain a desired gain profile for a WDM signal. This approach facilitates highly integrated re-configurable multi-channel input signal or output power equalization. Apart from providing control function, the DSP subsystem hosts a lookup table-based calibration that uses test data generated for a DOF to achieve highly accurate attenuation settings for individual wavelengths constituting the required gain spectrum. Therefore, the calibrated DOF attenuation characteristic (e.g., tuning voltage/attenuation curve) is pre-determined and stored in the form of a lookup table on an electronic subsystem, e.g., a DSP, which calibrates the DOF against the ideal attenuation gain profile or spectral transfer function.

While the lookup table offers calibrated attenuation setpoints, it cannot calibrate against dynamic events and effects, which may cause the attenuation set-point to drift. The lookup table also puts greater demands on the DOF and control system performance. For example, temperature effects on optical performance have to be well understood and accounted for in the component design. Changes in polarization causing additional optical loss through the DOF have to be minimized, or the device has to be very polarization-dependent-loss insensitive. All of these are characteristics of an analog optical filter whose behavior is highly influenced by the environmental factors in an analog manner.

Figure 2A:
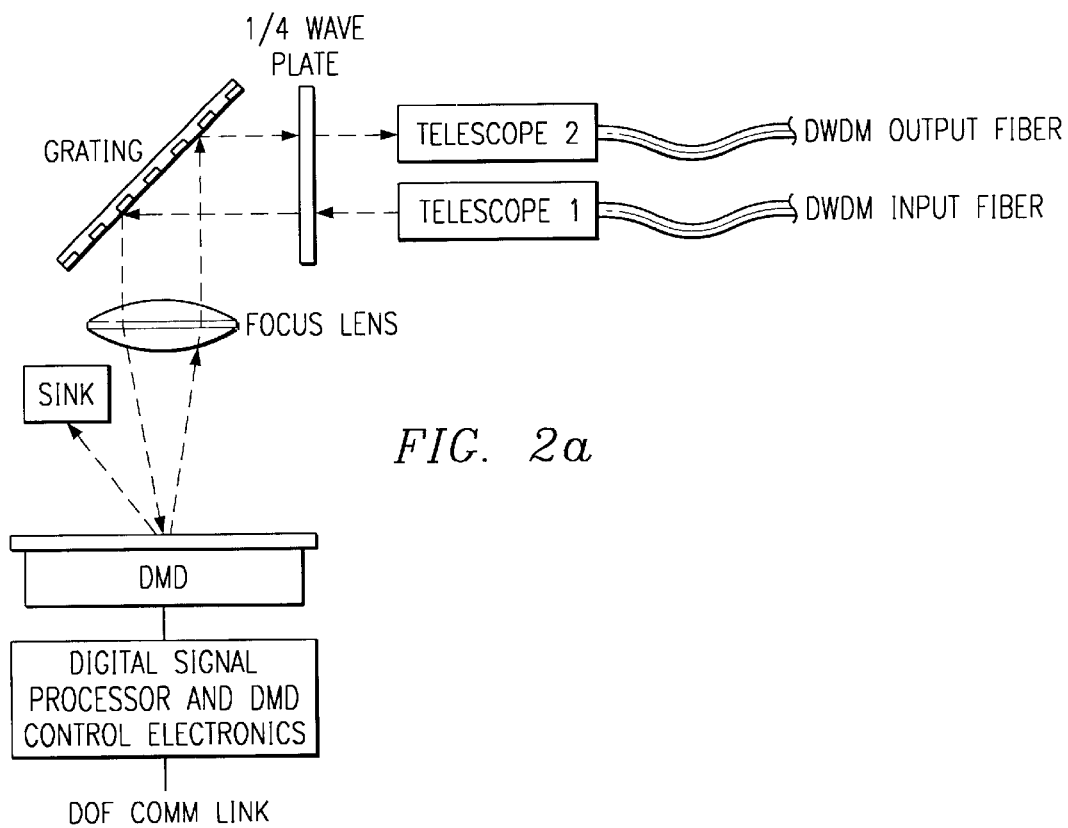
Figure 2B:
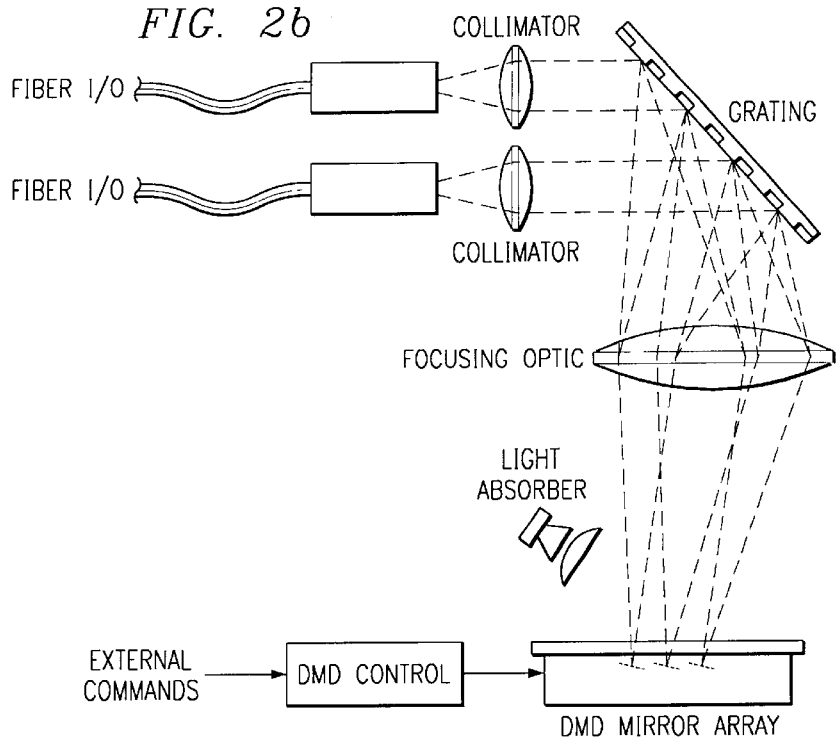
Figure 2C:
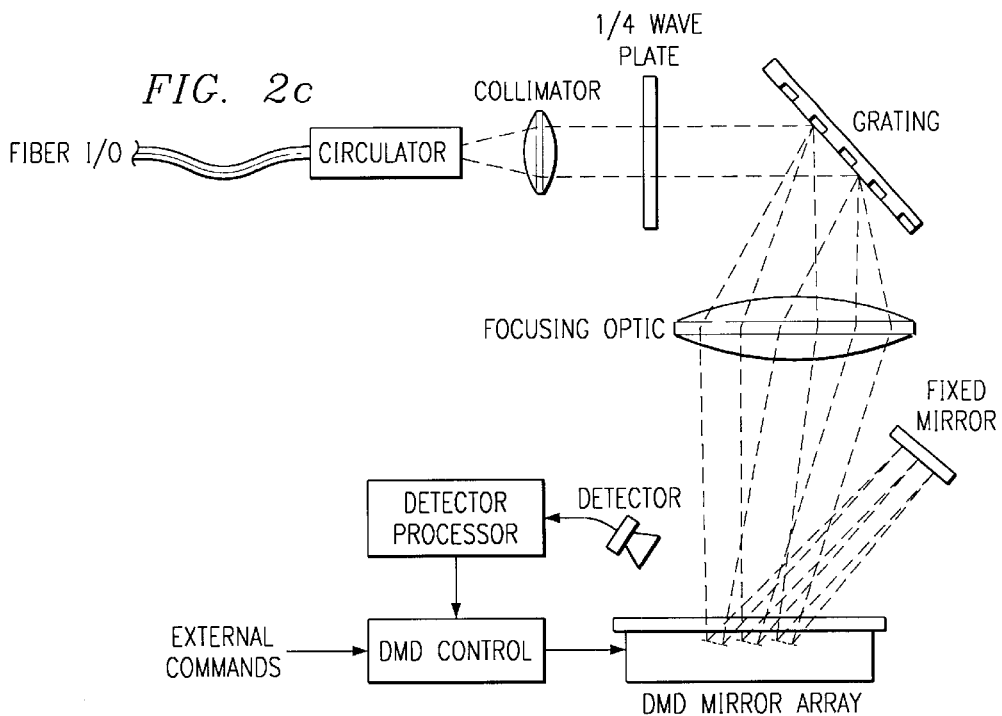
Figure 10A:
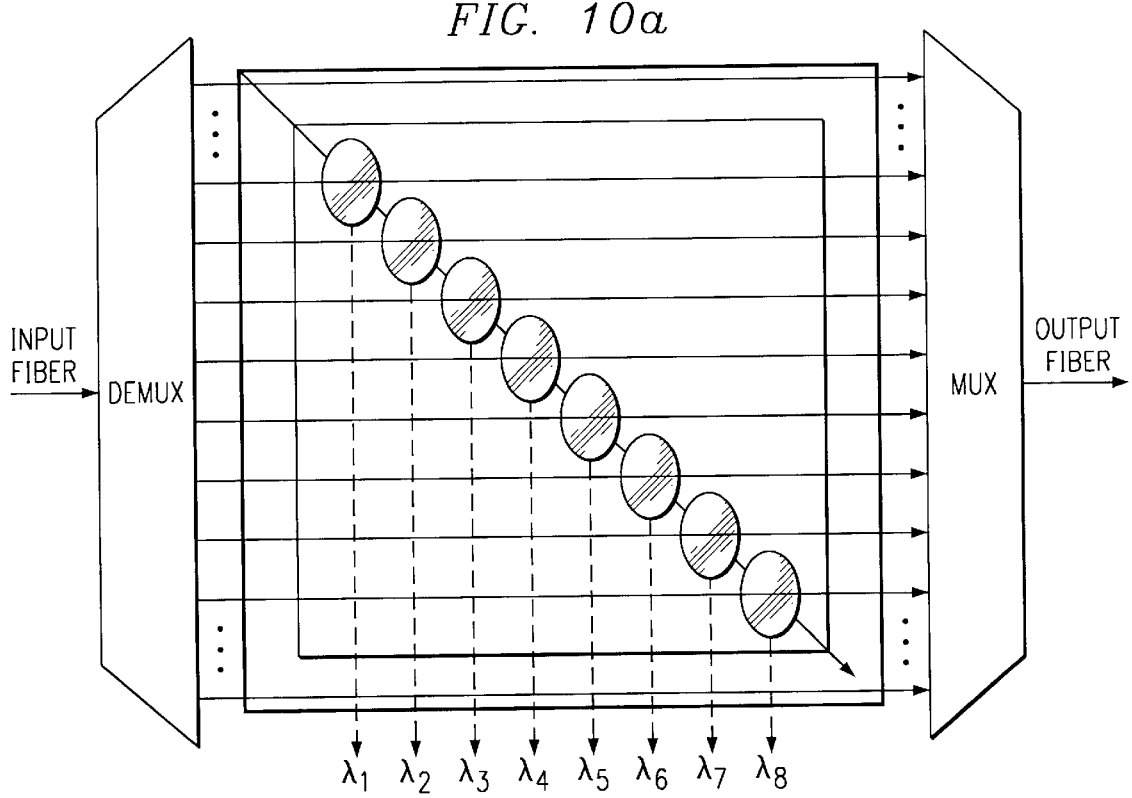
FIGS. 10a–10b, 11, 12a–12c, 13, 14 show operation of a optical filter.
Figure 10B:
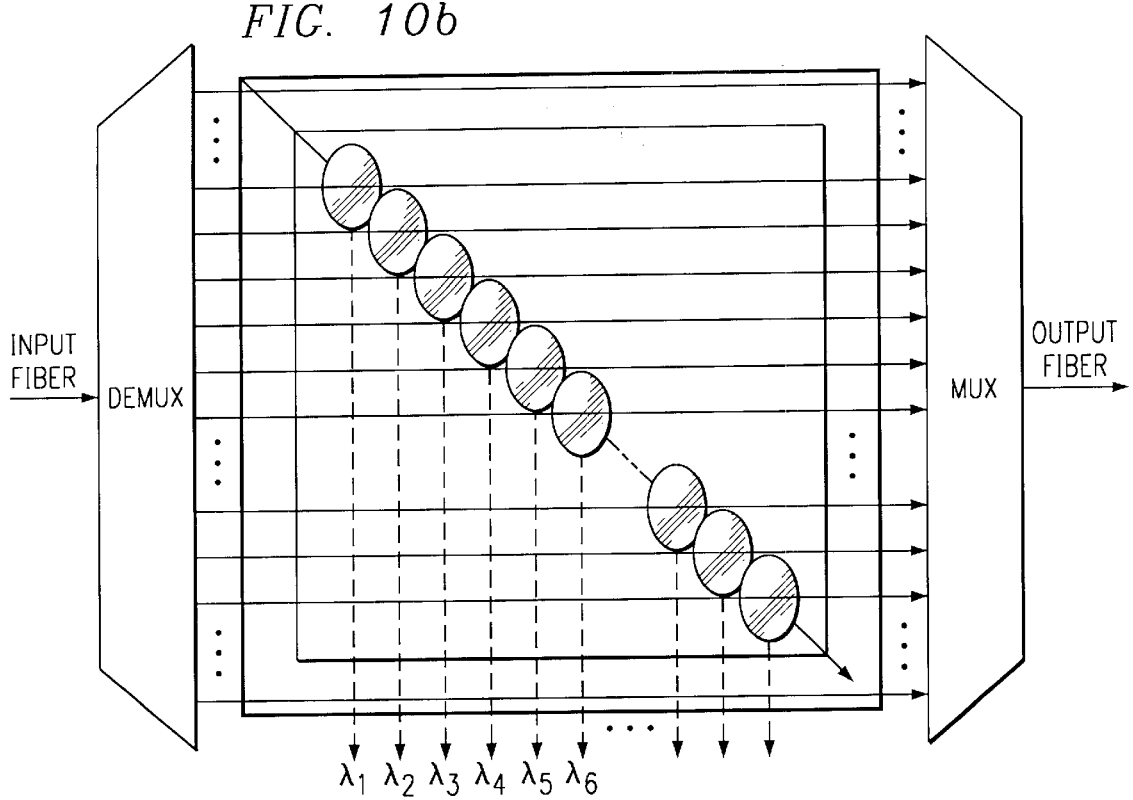

FIGS. 2a–2c heuristically illustrate in cross-sectional views preferred embodiment DOF's based on a digital mirror device (DMD) which is both digital and re-configurable in nature. Indeed, a DMD provides a planar array of micromirrors (also known as pixels) with each micromirror individually switchable between an ON-state and an OFF-state in which input light reflected from a micromirror in the ON-state is directed to the DOF output and the light reflected from an OFF-state micromirror is lost; see cross-sectional view FIG. 2d. The preferred embodiments use a grating to de-multiplex the channels of a DWDM signal into spots on a DMD micromirror array, separately attenuate each channel by the fraction of micromirrors turned to the OFF-state in a spot, and again use the grating to re-multiplex the reflected channels to output a DWDM signal. FIGS. 10a–10b show the micromirror array in plan view together with spots indicating reflecting light beams. While the previously-described preferred embodiment methods and systems are useful with any DOF, the preferred embodiment DOFs are particularly suited to a multi-band and multi-channel implementation. Indeed, in a preferred embodiment DOF each wavelength (channel) or spectral band can be spatially sampled with a number of micromirrors in a DMD. Because the DMD is fundamentally digital and fully programmable pixilated spatial light modulator, it can easily host any adaptive algorithm, realizing an adaptive dynamic optical filter (see the following section).

FIGS. 10a–10b show in plan view multiple light beams impinging on the array of micromirrors of a DMD and illustrate two preferred embodiment DOF designs. The DWDM input signal from the input fiber is first de-multiplexed by a dispersive element such as a grating and projected onto the array of micromirrors of a DMD. In FIG. 10a the spatially de-multiplexed (dispersed) wavelengths have non-overlapping beams falling on the DMD micromirrors; whereas FIG. 10b has the beams overlapping such that the grating used is not fully resolving all of the wavelengths or the collimated beam size is tool small before it hits the grating. Note that only some of the micromirrors are shown along with a few wavelengths labeled as such. The solid lines are the de-multiplexed wavelengths hitting groups of micromirrors. Portions of each wavelength is reflected by the ON-state micromirrors and re-multiplexed back out to the output fiber via the same grating. The dotted line shows the portions of each wavelength deflected by the OFF-state micromirrors according to the attenuation level desired. The reflected energy from the ON-state micromirrors is further coupled to the output fiber as transmitted energy in the passband of the DOF while the deflected energy represents attenuation in the stopband(s) or notches of the DOF.

Figure 11:
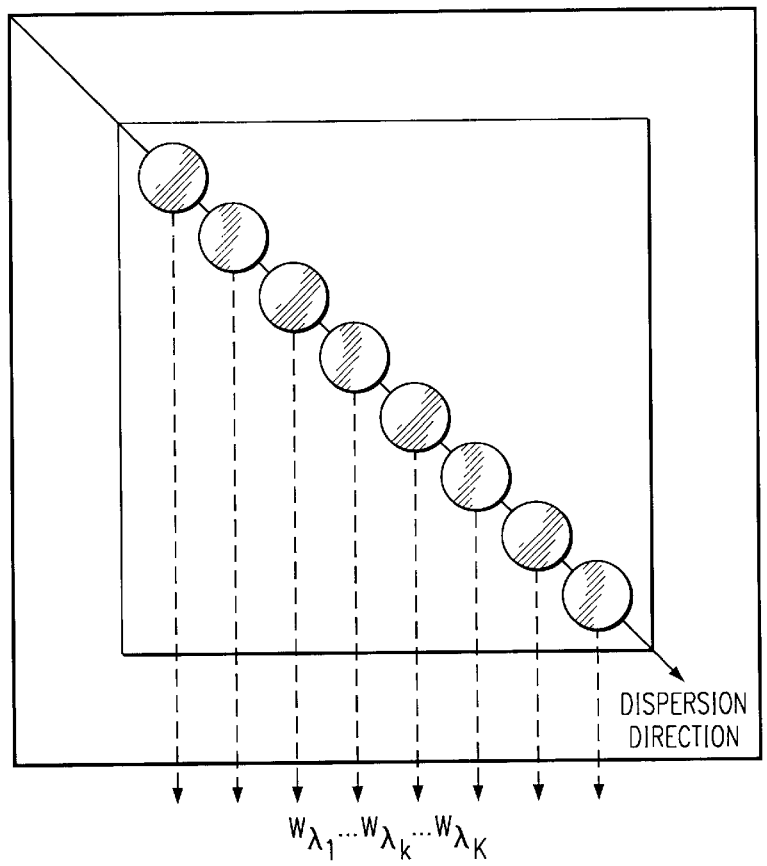
Figure 12A:
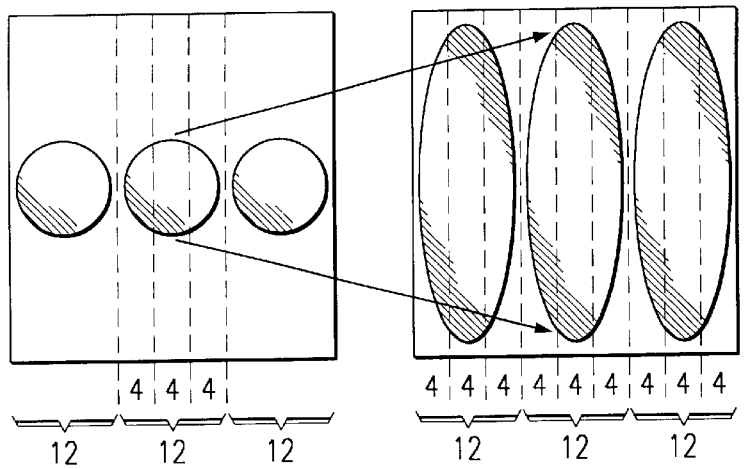

In more detail, presume a DMD of size R rows by C columns and the dispersion direction (e.g., by a grating) of the DWDM spectrum is along the diagonal. FIG. 11 shows K spatially dispersed wavelength ($\lambda_1, \lambda_2, \ldots, \lambda_K$) beam spots on the micromirror array; each beam fully resolved (no spot overlap with adjacent beam) and covering a area of $r_k$ by $c_c$ micromirrors (pixels). A DMD is fully digital and programmable and has a software programmable resolution that is re-configurable on-the-fly to increase or decrease the spatial sampling of the channels. For example, the left hand side of FIG. 12a shows three dispersed wavelength spots of size ($r_k$=12, $c_k$=12) each. Instead of a single group of $r_k$ by $c_k$ micromirrors for each wavelength, higher resolution can be achieved by sub-dividing the spot size into strips of finer resolution (e.g., $r_k$=12, $c_k$=4); i.e., smaller subgroups of 4 columns each. Correspondingly, the spatial sampling resolution has increased by a factor of 3 in this example and the individual wavelengths can now be manipulated with higher precision for adaptive filtering. In the extreme case, each of the C columns of the DMD can be regarded as a spectral line for the DOF transfer function thereby yielding the highest spectral sampling resolution in implementing an optica filter. In this case, the row count will be increased to as many times as is needed for the attenuation resolution required (e.g., 512).

Further manipulations of the micromirrors are possible. For example, instead of aligning the wavelength dispersion direction along the diagonal of the DMD (due to micromirror hinge orientation at 45 degrees relative to the array), the dispersed wavelength in a horizontal orientation in FIG. 12a. And with a slightly different optical design (e.g., use an elliptical fold mirror cylindrical lens) the beam size can be made more spread out in the direction orthogonal to that of dispersion while the same intensity can be afforded to each subgroup by increasing $r_k$ by a factor of 3; e.g., $r_k$=36 as shown in the right hand side of FIG. 12a.

The spatial sampling resolution can be increased by simply re-cofiguring the DMD on the fly. The programming of the DMD and the computation of any adaptive control routine for implementing an adaptive DOF are performed by the DSP. The combination of the high-speed, high-precision of both the DSP controller and the DMD device underlies the adaptive DOF of the following section.

Figure 12B:
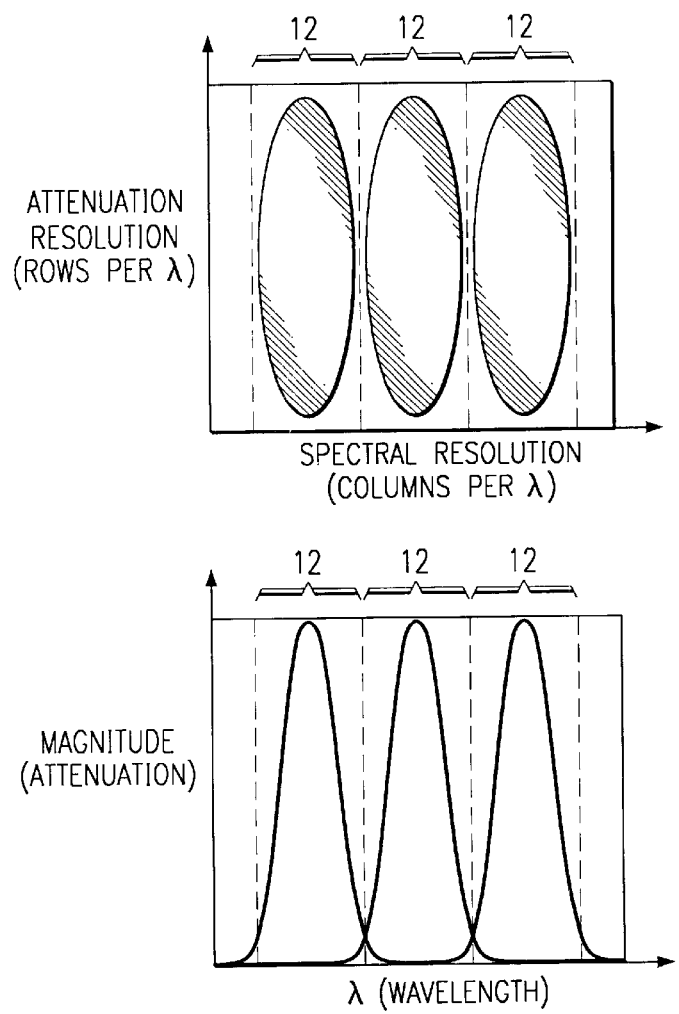
Figure 12C:
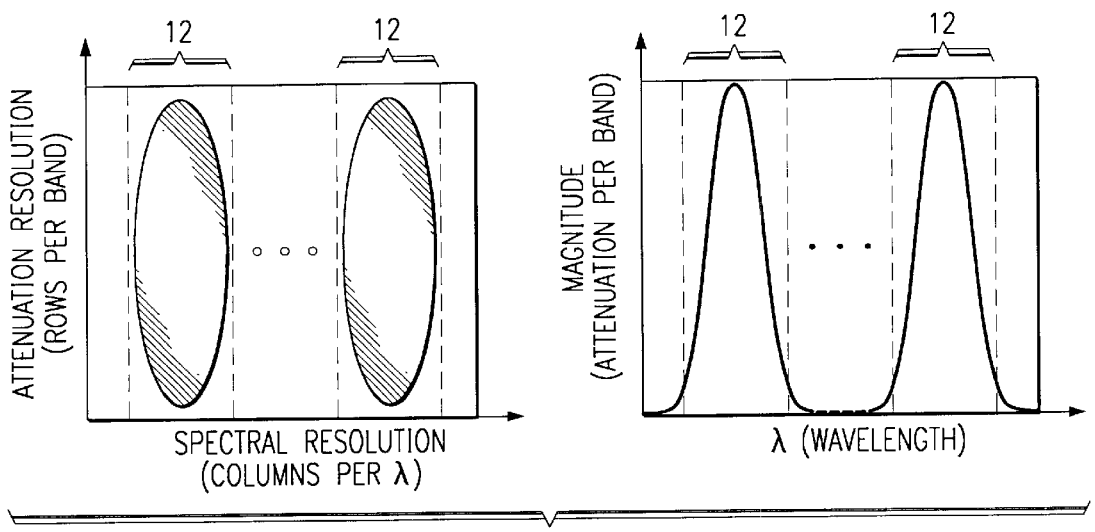
Figure 13:
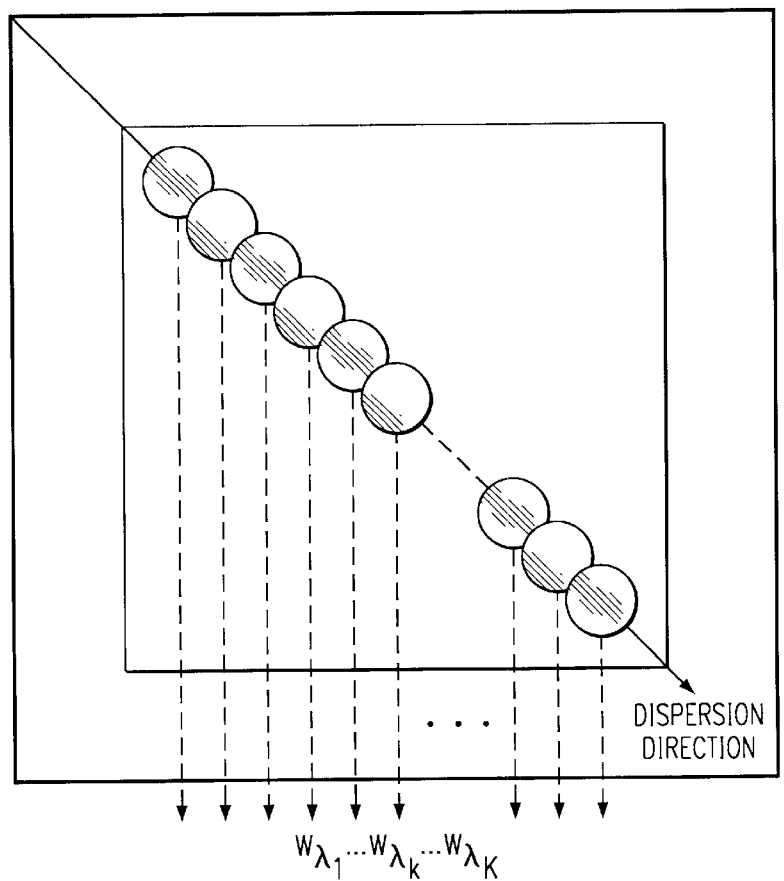
Figure 14:
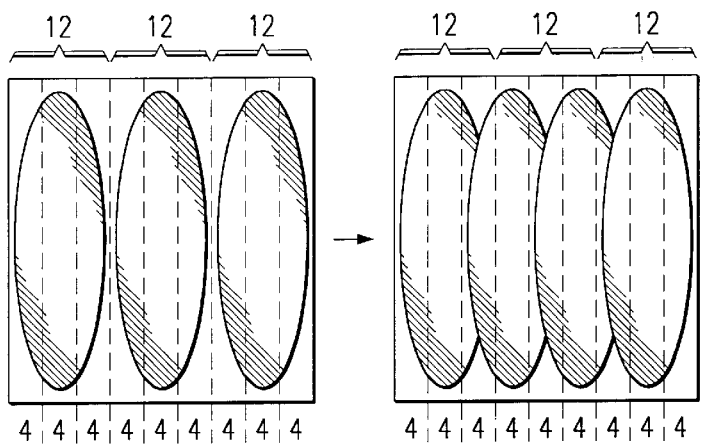

FIG. 12b shows the spatial beam mapping of the de-multiplexed wavelengths/channels to the spectral mapping on the R×C array DMD. The example depicts an arbitrary spatial sample of the de-multiplexed beams by 12 individual columns, each one acts as a resultant spectral line with magnitude and phase characteristics. Spectrally, the optical spectrum is sampled with the highest possible resolution on the DMD, i.e., one column's worth of spectral resolution in nanometers of wavelength. Further manipulations of the DWDM wavelengths are possible. For example, in the metro DWDM market, instead of manipulating wavelengths or channels one at a time, very often, wavelengths or channels are grouped together as bands of wavelengths or channels that are manipulated as a group as shown in FIG. 12c. Depending on the actual application, higher spectral resolution can be achieved with some overlapping of the dispersed wavelengths as shown in FIGS. 13–14. For example, an 80-channel DWDM DOF can be achieved by carefully overlapping the wavelengths along the dispersion direction as they are dispersed by a dispersive element (e.g., grating). At the same time, this has the effect of lowering the cost and precision of the grating used in each implementation. The higher spatial sampoing scheme for the dispersed wavelengths can be similarly applied here, bearing in mind some micromirrors now have adjacent wavelength's overlapped. Hence, manipulation of such overlapped micromirrors will have simultaneous action on both the current wavelength and its adjacent wavelength.

Figure 15:
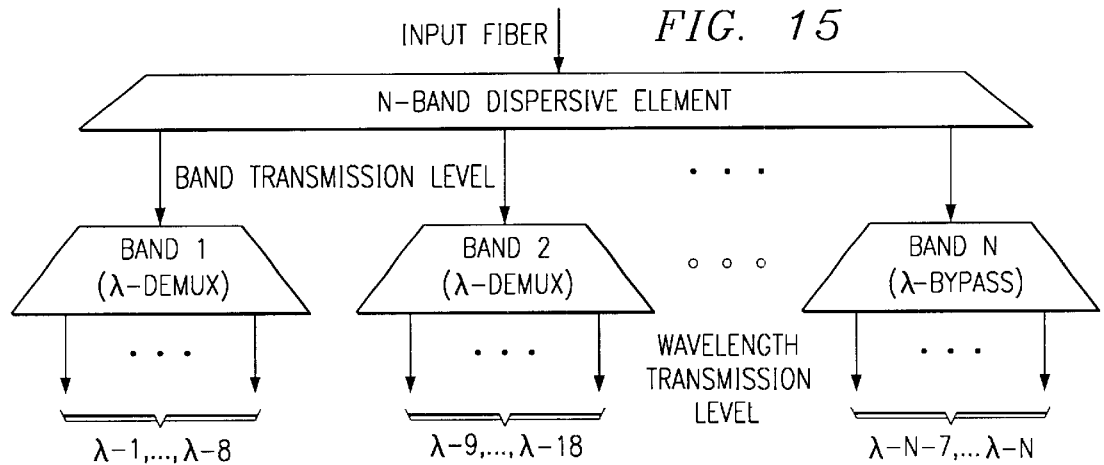
FIGS. 15–16 illustrate multiplex-demultiplex.
Figure 16:
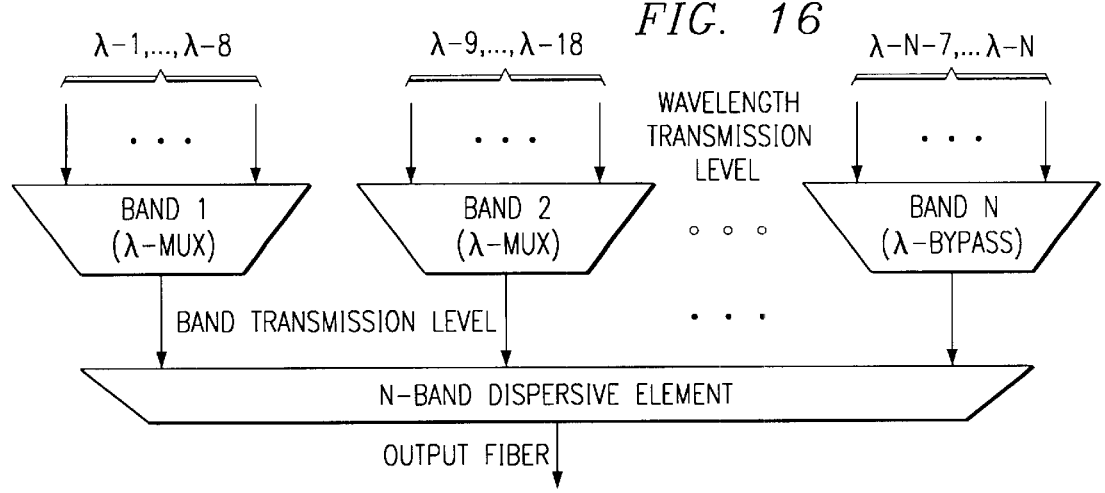

It is generally more economical to utilize wavelengths (channels) in bundles in a network where (a) data transmitted has a common destination or (b) some of the bundles have to be dropped while new ones have to be added. From a design standpoint, the DOF can be easily designed for better transition bands with wavelength bands than for a single wavelength and the technique for grouping wavelengths together in a network architecture is known as wavelength banding. For example, in an optical add/drop multiplexing application, the optical add/drop multiplexer (OADM) can be implemented economically with less stringent dispersive element as in FIG. 15 which shows an N-band fiber system with 8 wavelengths per band as an example (the number of wavelengths per band can be programmed by the network operator). Therefore, a total of 8N possible channels (some may not be carrying data) are grouped in to N bands and transmitted as such. If a band has to be routed and dropped, then the 8 wavelengths (channels) will further be de-multiplexed after the optical "band-drop" operation. The efficienty of this technique comes from the easy implementation of optical bypass operations from wavelength bands that are not dropped at a node. These wavelengths will simply continue on in the fiber transmission. In this way, the cost and design of the N-band dispersive element as well as the λ-demux are much less demanding. Similarly, if a band has to be routed and added to the network node, then the 8 wavelengths (channels) will first be multiplexed together with a λ-mux to form a band signal as shown in FIG. 16. After the optical banding operation, the whole band is "band-added" to the DWDM signal. In this way, the cost and design of the λ-mux as well as the N-band dispersive element are much less demanding. Also, apart from cost, this wavelength banding technique has architectural ramifications for a feeder ring with a number of OADM's deployed. Clearly, the saving comes from the fact that the multiplexing operation is done at two levels (a) the band level for transmission and (b) the wavelength level for actual wavelength and data manipulation. This reduces the data operation cost as well.

Figure 17A:
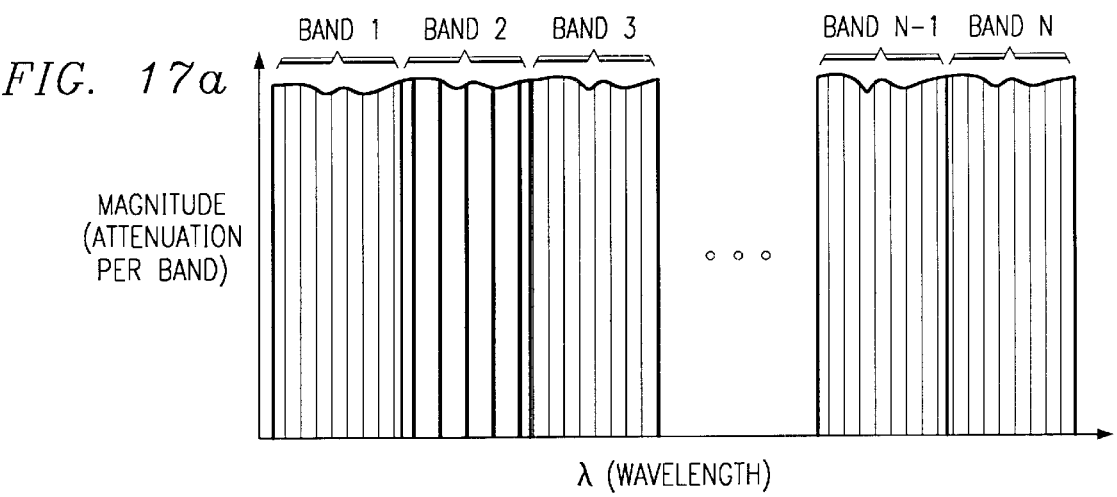
FIGS. 17a–17c show spectra.
Figure 17B:
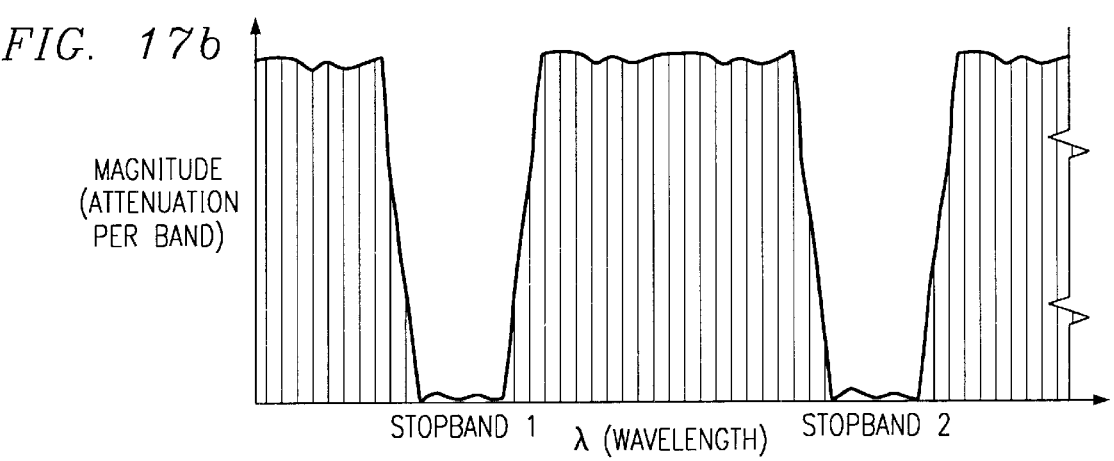
Figure 17C:
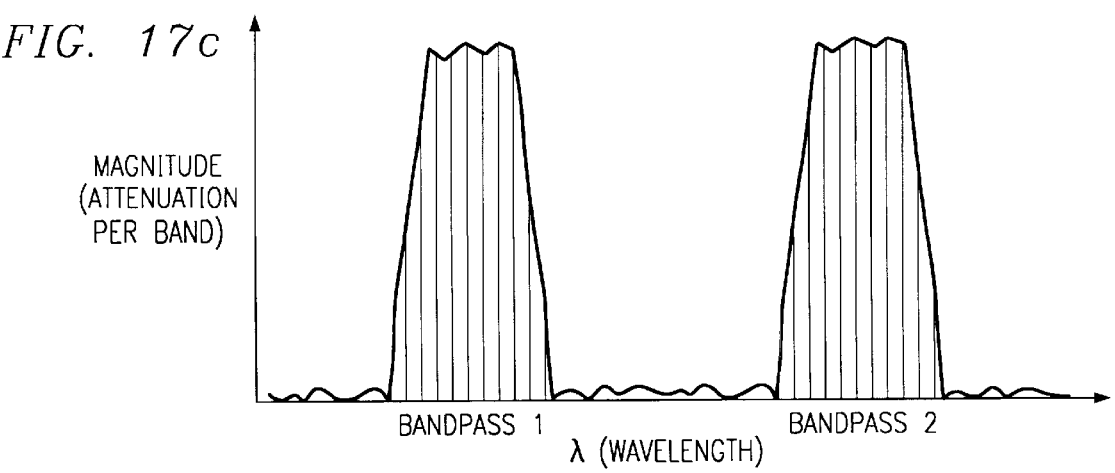
Figure 18:
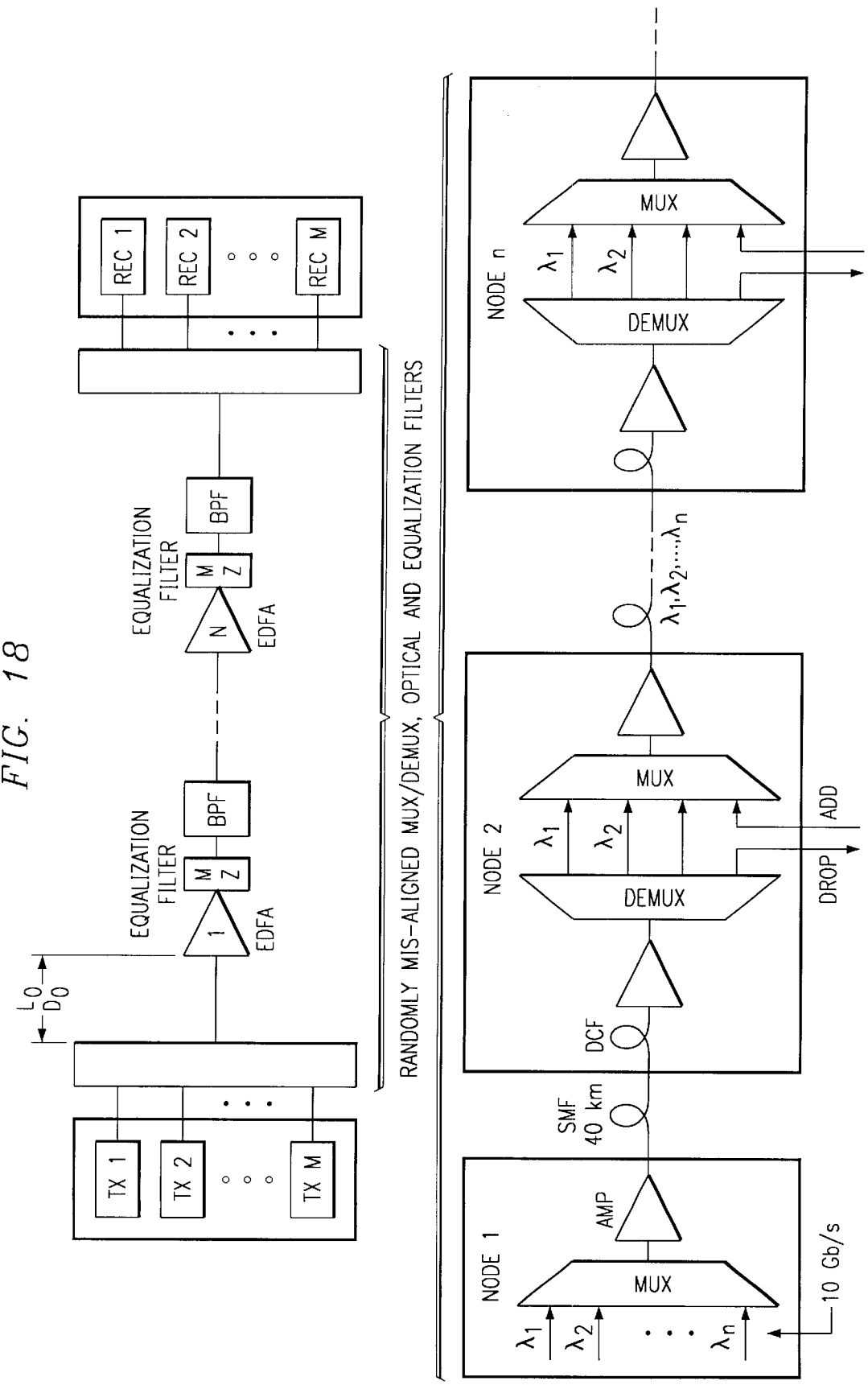
FIG. 18 illustrates an optical system.

The DMD-based preferred embodiment DOF is highly re-configurable and provides implementation of the wavelength banding technique for operations such as optical channel/band dropping, adding, and bypassing. FIGS. 17a–17c further demonstrate the wavelength banding technique. First the DWDM spectrum is sub-divided into wavelength bands each consisting of a number of channels. Note that the attenuation function is now on a per band basis such that individual bands can be attenuated to any desired level. The preferred embodiment DOF is then designed as discrete spectral bands covering the entire DWDM spectrum. Because the bandwidth of each band is may times that of an individual wavelength, the design specification of its transition bands can be much relaxed compared to that for an individual wavelength. FIGS. 17b–17c show (a) the multi-bandpass composite filter for various band-select operations and (b) multi-bandstop composite filter for various band-drop operations. Note that individual channel-drop operations can still be implemented at the output of a λ-demultiplexer. Likewise, individual channel-add operations can be implemented at the input of a λ-multiplexer; see FIG. 18.

A preferred embodiment DOF can be used for chromatic dispersion compensation or multichannel phase compensation by attenuation settings which correspond to the desired phase compensation. Conversely, the preferred embodiment DOF method computes the required attenuation settings from the desired phase compensation.

15. Adaptive Dynamic Optical Filter (ADOF) and Adaptive Dispersion Compensation

Figure 19A:
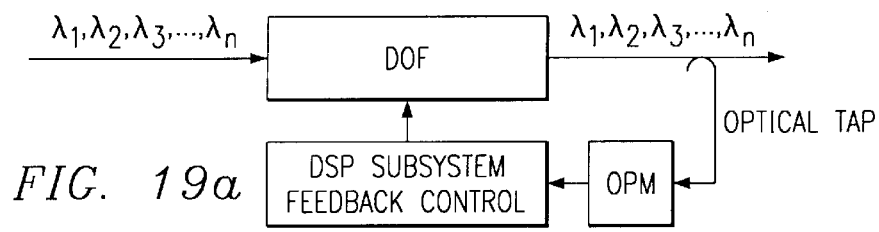
FIGS. 19a–19b are functional blocks of adaptive optical filters.
Figure 19B:
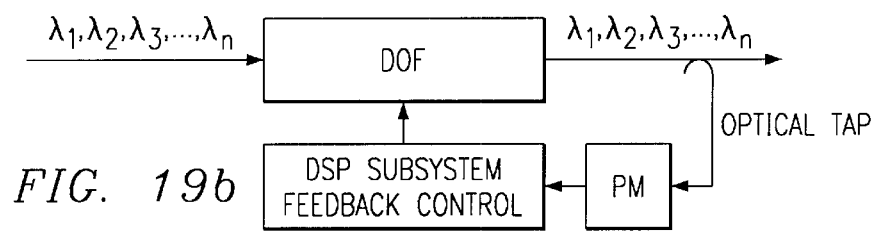

One important difference between a static optical filter and a dynamic optical filter (DOF) is that a static filter cannot be reconfigured into a different transfer function or filter characteristic. In general, a DOF ranges from simply tunable (via voltage change) to fully digital and re-configurable like the foregoing preferred embodiment DOFs based on DMDs. Preferred embodiment systems exploit this dynamic feature in a feedback configuration as illustrated in FIGS. 19a–19b in which the output of the DOF is fed to an optical channel monitor (OCM) or optical performance monitor (OPM) or phase monitor (PM) in a closed loop. The measurement of output of the OPM (intensity) will be fed to a simple feedback decision-making algorithm that drives the DOF in response to its output. If the output reaches a predetermined level then the control mechanism stops driving the DOF at the specified set point. Analogously for the phase monitoring feedback. And the DOF may be a preferred embodiment DMD-based DOF as described in the foregoing.

Specifically, optical power monitoring is done by optically tapping off a small percentage (typically 1–5%) of the DOF output optical signal which is then fed to the OPM. The output of the OPM is electronic and can be a control signal for the DSP subsystem running an adaptation algorithm or simple feedback control. The OPM, besides monitoring the output power levels of the individual wavelengths, will also perform optical to electrical (O-E) conversion of these levels for input to the DSP electronic subsystem. The DSP subsystem interfaced to the OPM and provides the multi-channel DOF power level setting information to the DOF in accordance to a suitable feedback control algorithm. Because the DOF is essentially an optical component, the system resolution is a function of the accuracy and resolution of the number of micromirrors employed for the given DMD. An attenuation resolution of 0.1 dB can be achieved by using a group of mirrors (pixel) forming a diamond-shaped 12×12 pixel area. The intrinsic switching time of the DMD is 5–20 microseconds so that a fast loop response time is available.

Since the switching time of a DMD is fast enough to respond to temperature effects, pressure and strain, fully automated and dynamic chromatic dispersion compensation is possible with a DOF. Clearly, with an adaptive algorithm, e.g., with respect to temperature, an adaptive DOF (ADOF) can be implemented for adaptive chromatic dispersion compensation. With this implementation, the multi-channel OPM is replaced with a multi-channel phase monitor (PM); see FIG. 19b. Furthermore, with an adaptive algorithm, not only can dynamic provisioning and network re-configuration can be fully automated, but this also provides preferred embodiment methods of multi-channel chromatic dispersion measurement and compensation on-the-fly during data transmission.

Figure 20:
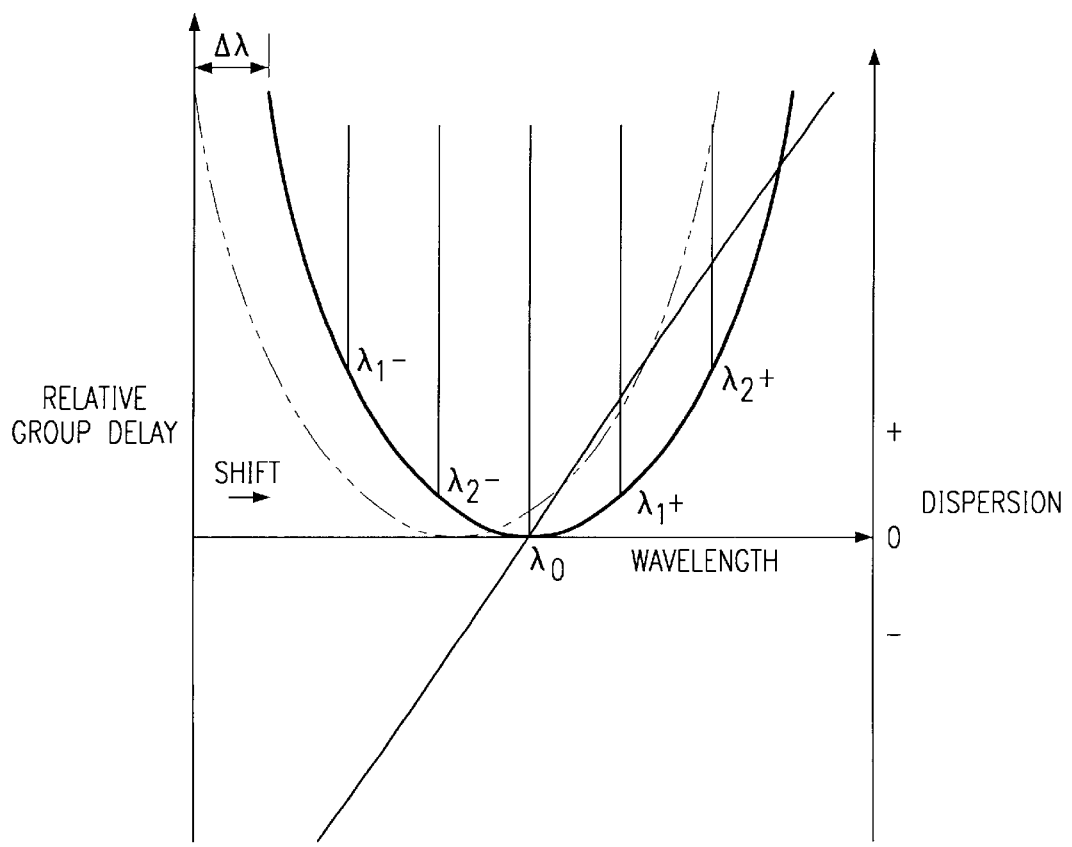
FIGS. 20–22 show group delay.

It is well known that the zero-dispersion wavelength $\lambda_0$ of a fiber depends on several environmental factors such as temperature, pressure, and strain on the fiber. Among these factors, temperature change is the most critical in the case of optical networks. Although the temperature coefficient of a fiber is not huge (around 0.026 nm/° C.), the resultant dispersion fluctuation caused by this temperature dependence accumulates as the signal propagates through the transmission fiber. For ultra long-haul optical networks, this factor becomes a major barrier as the total accumulated chromatic dispersion fluctuation becomes a serious issue. FIG. 20 shows the temperature shifts on the group delay and dispersion of a fiber (the dotted line indicates the original group delay characteristic with respect to $\lambda$).

In provisioning an optical network, the total chromatic dispersion is assumed to be constant and accordingly compensated to within a working margin (acceptable tolerance band). If the accumulated fluctuation of chromatic dispersion (due to environmental factors) exceeds this tolerance, high bit error rates will result. Therefore, the bit error rate parameter of ultra-high-speed and ultra-long-haul networks will also fluctuate when their allowable dispersion margins have been exceeded. In general, there is a strong need for automatic chromatic dispersion compensation during network provisioning and re-configuration. In addition, in order to suppress the bit error rate fluctuation or degradation induced by dispersion fluctuation, an adaptive chromatic dispersion compensation solution that can detect and compensate for any dispersion fluctuations during data transmission is required. In this respect, a DOF can be a good candidate both for automatic and adaptive chromatic dispersion compensation.

Two function blocks are needed to realize automatic and adaptive chromatic dispersion compensation. First, the amount of dispersion fluctuation $\Delta D$ for every wavelength in a DWDM signal has to be detected. Second, the DOF which now acts as an ADOF has to be re-programmed with a new phase spectrum, i.e., a new group delay profile that can compensate for the $\Delta D$ at every wavelength of interest in the transmission window, e.g., the C-band. FIG. 19b shows the set up for an automatic or adaptive chromatic dispersion compensator. The phase monitor (PM) is a multi-channel relative phase monitor that monitors the differential phases of the DWDM channels. The multi-channel PM is used in one of two ways. First, for measuring the relative phase between a reference wavelength (chosen in the DWDM wavelength bands) and that of another wavelength in the DWDM transmission window. This is useful in the automatic installation phase of dynamic network provisioning and re-configuration. Second, for measuring the relative phase changes of any DWDM wavelength due to a wavelength shift induced by environmental changes such as temperature fluctuations. This indicates the fluctuation in chromatic dispersion characteristics of the fiber link after installation and can be used for high-speed adaptive chromatic dispersion compensation during data transmission.

The DSP subsystem interfaced to the multi-channel PM will react to the relative phase changes from the measurement results and provides the multi-channel DOF power level setting information to the DOF in accordance to an adaptive algorithm for chromatic dispersion compensation. Alternatively, the DOF and the DSP subsystem can be integrated as one subsystem. Further integration with the PM is possible if the PM is implemented with the same DOF.

During automatic network installation, a chromatic dispersion profile of the DWDM system can be made at the receiving node or any other network elements (e.g., EDFAs) at intermediate fiber spans. An additional benefit at the receiving node is that the actual transmission bit error rate can be obtained to gauge the effectiveness of the chromatic dispersion compensation.

Figure 21:
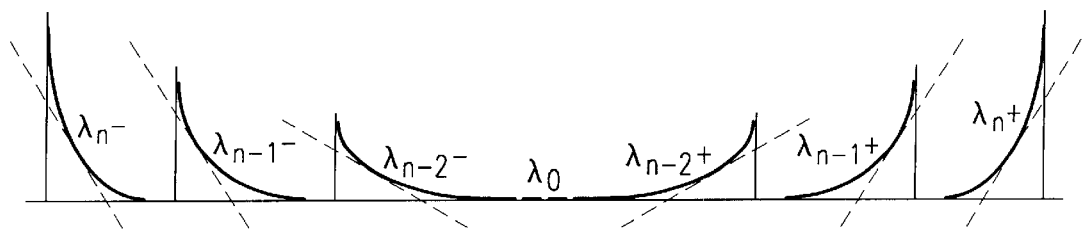

At the DWDM transmit terminal, all DWDM will have their clock signals synchronized to that of the reference channel of choice. At any network element along the optical link or preferably from the receive terminal all clock phases of the individual DWDM channels are extracted and compared to that of the reference by a relative PM. In this fashion, a chromatic dispersion profile across the entire DWDM hand(s) can be measured and stored as reference. In addition, the dispersion slopes of the individual DWDM channels are obtained and stored in reference. One way to have more resolution in the measurement during automatic network installation is to use a tunable laser and a fixed laser which remains fixed at a reference wavelength (e.g., the lowest channel) while the tunable laser is tuned across the DWDM transmission window. Multiple measurements can then be taken for each wavelength to obtain the detail dispersion profile and dispersion slope map of each channel as shown in FIG. 21. The reference wavelength can be chosen from anyone of the DWDM channels, but once chosen it remains fixed for the duration of the measurement. For example, if $\lambda_0$ is chosen as the reference wavelength for relative or differential phase measurement between $\lambda_0$ and any other wavelength $\lambda_n$ it will remain as the reference for the duration of relative phase measurement or monitoring. Another choice can be the lowest wavelength of the transmission window such that all longer wavelengths can be compared to.

Figure 22:
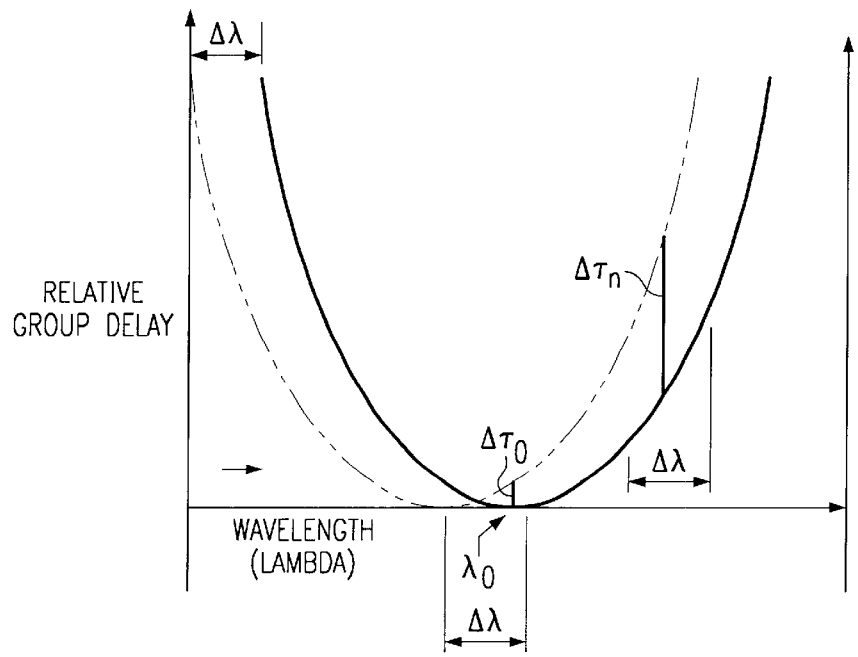

Since only relative phases are measured, this methodology does not need synchronization between the transmitters and the receivers and all measurements can be done locally at the receiving end. Note that instead of using the individual channel clock signals for phase measurements, data patterns or modulations can be used instead. The use of data patterns further enables signal processing techniques such as auto-correlation or cross-correlation where the correlation peaks are proportional to the amount of chromatic dispersion. The use of modulation further permits the use of phase locking techniques, e.g., a phase lock loop to be used for phase comparison and error signal generation for the adaptive DOF. However, during data transmission, instead of measuring all the relative phases of the individual channels, it may be more useful to detect the wavelength shift due to a temperature fluctuation in the fiber. This wavelength shift then indicates the entire fiber group delay profile shift as shown in FIG. 22. Clearly, a temperature induced wavelength shift $\Delta\lambda$ will cause a difference of $\Delta\tau_n$ in the group delay of the wavelength (channel) $\lambda_n$. Likewise, the zero dispersion wavelength has been shifted as shown in FIG. 22 such that the group delay difference due to the temperature shift is $\Delta\tau_0$. Therefore, to measure the wavelength shift $\Delta\lambda$ induced by an environmental temperature change, measure $\Delta\tau_n$ instead. This is done by choosing a reference wavelength, e.g., the zero dispersion wavelength $\lambda_0$ because it has the lowest dispersion. However, other wavelengths can be chosen as well, e.g., to increase measurement accuracy, a wavelength as far away as possible from the wavelength (channel) $\lambda_n$ can be chosen on the dispersion slope map. This then gives the maximum phase change or relative group delay change $\Delta\tau_n$ for monitoring purposes.

Corresponding to any $\Delta\tau$, there will be a change in chromatic dispersion $\Delta D$. For a uniform temperature change ΔT over the fiber cable, the total dispersion fluctuation ΔD. For a uniform temperature change ΔT over the fiber cable, the total dispersion fluctuation ΔD is given by:

$$\Delta D = (\Delta T \partial \lambda_0 / \partial T) L \, dD/d\lambda$$

where L is the transmission distance and $dD/d\lambda$ is the average dispersion slope of the fiber. Ignoring the temperature effect of the above dispersion fluctuation equation yields $$\Delta D(\lambda_0) = D_0 + dD/d\lambda L(\lambda_n - \lambda_0)$$

Integrating this gives the group delay of the fiber at wavelength $\lambda_0$ before a temperature shift:

$$\tau(\lambda_n) = \tau_0 + [dD/d\lambda L(\lambda_n - \lambda_0)^2]/2$$

where $\tau_0$ is the group delay at the zero dispersion wavelength. The group delay of the wavelength $\lambda_n$ after a temperature shift can be calculated as:

$$\tau(\lambda_n + \Delta\lambda) = \tau_0 + [dD/d\lambda L(\lambda_n + \Delta\lambda - \lambda_0)^2]/2$$

Therefore the relative group delay change due to temperature shift is given by $$\tau(\lambda_n + \Delta\lambda) - \tau(\lambda_n) = dD/d\lambda L[(\lambda_n - \lambda_0)\Delta\lambda + (\Delta\lambda)^2/2]$$

Clearly, this gives the relative group delay change for any wavelength $\lambda_n$ after a temperature shift and therefore the wavelength shift $\Delta\lambda$ can be solved for after taking the measurement of the relative group delay change and knowing the dispersion slope at the wavelength $\lambda_n$.

Therefore, by monitoring the wavelength shift at a selected $\lambda_n$, an adaptive chromatic dispersion compensator can be implemented with an ADOF which changes its dispersion characteristics accordingly to compensate for the temperature shift. Note that the change in the dispersion characteristics can be easily achieved and implemented on the DMD-based preferred embodiment DOF because it is the dispersion profile before a temperature change shifted by $\Delta\lambda$. This wavelength shift is accommodated on the DMD as a number of columns of micromirrors; each column can be pre-calibrated to represent a fixed measure of wavelength in the DWDM spectrum. Moreover, multiple channels can be monitored simultaneously to get the sign of the dispersion compensation and more accuracy in the wavelength shifts.

Figure 23:
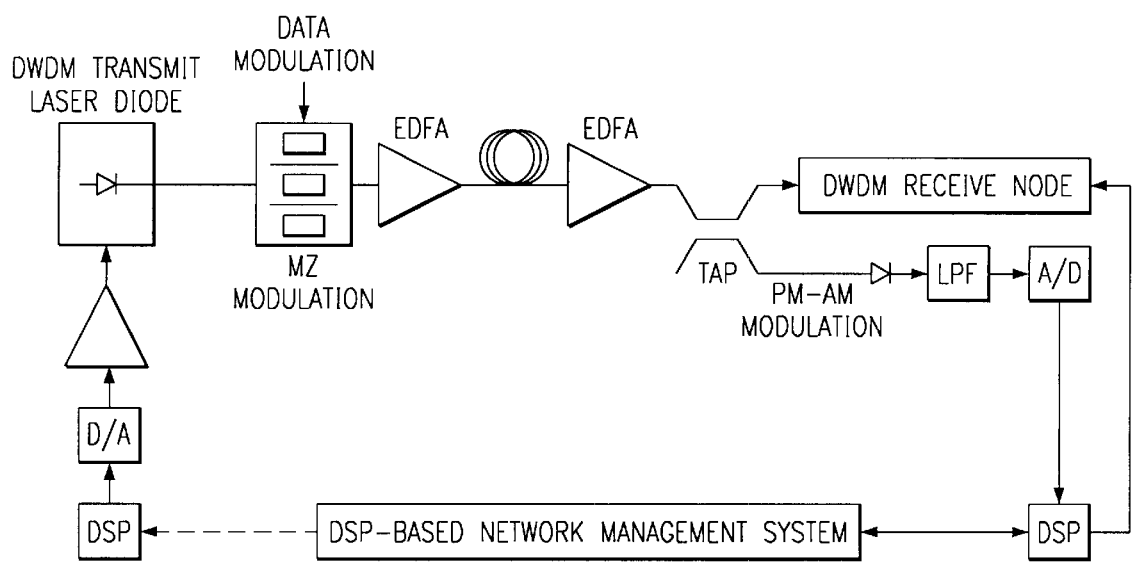
FIG. 23 illustrates an optical system.

Finally, the measurement clock signal for $\lambda_n$ can be modulated as a co-channel modulation on top of the existing data signal in the same channel. This is done by dithering the control or input current source of the laser diode at the transmitter of the wavelength channel $\lambda_n$. Likewise, the same can be done ot the zero dispersion wavelength $\lambda_0$ as a reference clock signal. The amount of dithering can be predetermined as a small amount of the extinction ratio of the transmitter laser diode (typically, 1–5%) without affecting the bit error rate of the receiver for $\lambda_n$. FIG. 23 is a block diagram for co-channel modulation. As shown, the laser diode current source is provided from the DSP through a digital-to-analog converter. The channel data is provided to the Mach-Zehnder (MZ) optical modulator at the output of the transmitter laser diode to prevent chirping that is detrimental to ultra long-haul transmission. The co-channel modulated clock signals used for relative phase measurement (or any other modulation) will be "stripped" off at the receiving terminal or any intermediate network element (e.g., an EDFA) at each fiber span where chromatic dispersion has to be monitored. This is done by tapping off a small amount of the incoming light signal (typically 1–5%) and converting it to electrical signal via a PIN or photodiode. The signal is then electrically low-passed or band-passed to be A/D converted for further processing by the DSP. The DSP at the receiving end, besides computing the wavelength shifts, can act as a controller for the DOF such that the new dispersion characteristics can be calculated for the adaptation process at each adaptation cycle.

16. Adaptive Optical Amplifiers

Optical amplifiers are very sensitive to the optical input power of the signals being amplified, which varies as the number of DWDM channels increases or decreases. The most commonly used optical amplifier, the erbium-doped fiber amplifier (EDFA) has a gain of around 20 to 35 dBm beyond which the amplifier saturates. If many wavelength channels with different power levels are fed into the EDFA, the wavelength with the largest input power level will saturate the EDFA first, thereby limiting the gain of the other wavelengths as shown in FIG. 24a. Other types of amplifiers, such as semiconductor optical amplifier (SOA), Raman amplifier (RA), and erbium-doped waveguide amplifier,(EDWA), have analogous behavior. Rather than input wavelengths with different power levels, it makes sense to first attenuate all the signals to the same level before amplifying all to the same level. The Figure presumes that the amplifier gain spectrum is somehow flat, but the gain spectrum of a typical optical amplifier (e.g., EDFA) is not flat; as a result, signals at different wavelengths get unequal amounts of amplification. This effect is commonly termed spectral-gain tilt and is more prevalent in wideband amplifiers. Currently, two methods can be used to reduce spectral-gain tilt. One is through the use of expensive gain-flattened amplifier designs, which offer a flatter gain response over a larger wavelength range. The second method is through the use, of Pain flattening static optical filters that flatten the gain spectrum of an EDFA under prescribed operating conditions. A static optical filter performs inverse filtering on the EDFA gain spectrum for fixed or static scenarios; however, gain-tilt is a dynamic effect.

Instead of gain flattening via EDFA design and output power leveling with a static optical inverse filter, the preferred embodiment adaptive optical amplifiers use a DOF to attenuate the input signal or EDFA output signal power levels of the individual DWDM channels. A DOF can be used to ensure that the powers of the input wavelengths are not just equalized but also are the inverse to the EDFA gain profile for dynamic scenarios as illustrated in FIG. 24b. Even when a static gain-flattening filter or falt-gain amplifier is used, the additional use of such a re-configurable DOF will help to relax the amplifier's flatness design requirements during changing conditions. Also, if a static filter already equalizes some of the EDFA non-uniform gain, the DOF has less inter-channel gain ripples or power variation to compensate for during dynamic line conditions. The following paragraphs describe preferred embodiment adaptive optical amplifiers including EDFA and DOF.

FIGS. 25a–25c and 26a–26e illustrate preferred embodiment adaptive optical amplifiers composed of erbium doped fiber amplifiers (EDFAs) plus DOFs with tapped input and/or output for controller input. In general, an EDFA has gain proportional to its pump power, the input signal power (small signal regime) and output signal compression due to gain saturation (large signal regime). Because the input signals of the various channels of a DWDM network change dynamically depending upon network traffic pattern and switching (e.g., OADM, OXC), gain equalization for an EDFA has to be performed dynamically. Broadly speaking, the control functions for an EDFA (or optical amplifier generally) can be categorized as: (1) input signal control, (2) transient control, (3) gain equalization, (4) polarization dependent loss equalization, and (5) pump control and ASE suppression.

Figure 25A:
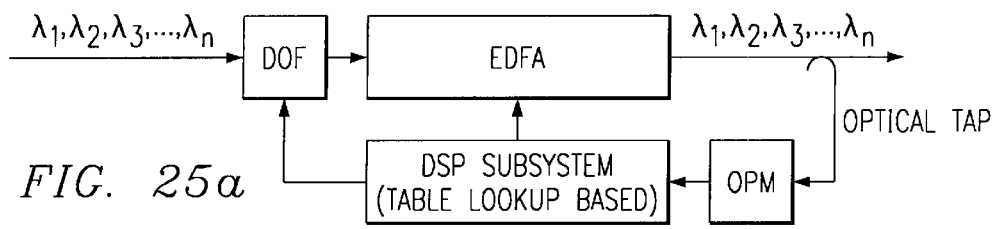
FIGS. 25a–26e are functional blocks of adaptive optical amplifiers.
Figure 25B:
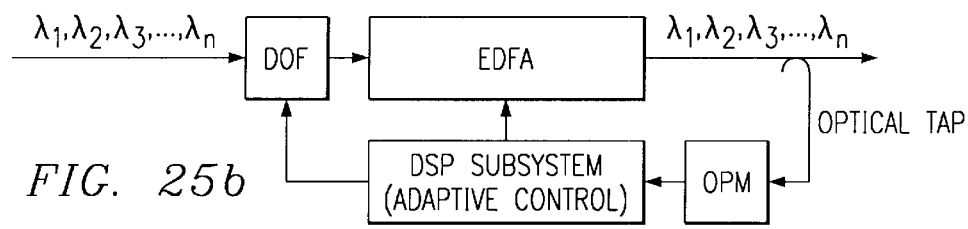
Figure 25C:
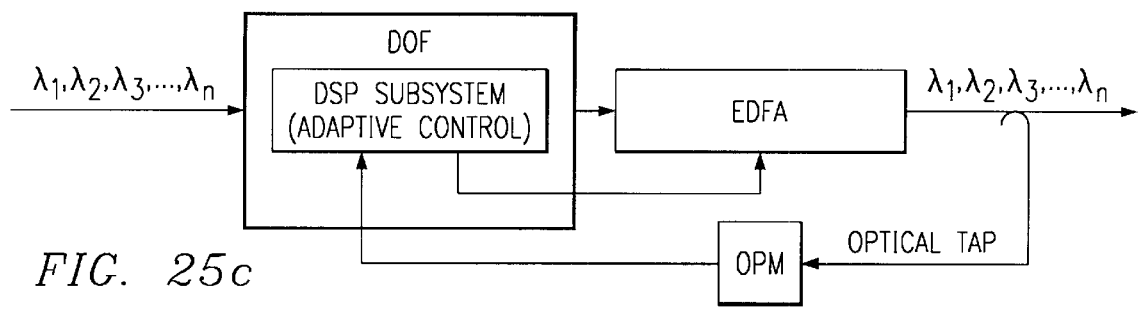

FIGS. 25a–25c show preferred embodiment adaptive optical amplifiers composed of an EDFA with a preferred embodiment DOF at the input to the EDFA and an output tap and optical performance monitor (OPM) for closed loop controller input. The optical power monitoring is done by optically tapping off a small percentage (1–5%) of the EDFA output optical signal which is then fed to the OPM. The output of the OPM is electronic and can be a control signal for the DSP subsystem running an adaptation algorithm or simple feedback control. The OPM, besides monitoring the output power levels of the individual wavelengths, will also perform optical-to-electrical conversion of these levels for input to the DSP subsystem implementing a suitable algorithm for adaptive control of filtering operations. The DSP subsystem interfaced to the OPM provides the multi-channel DOF power level setting information to the DOF in accordance to an adaptive algorithm such as an adaptive Wiener filter.

A DOF fundamentally attenuates light from different channels to attain a desired gain profile for a DWDM signal. Lookup table-based calibration uses test data generated for a DOF to calibrate and achieve highly accurate attenuation settings for individual wavelengths constituting the gain spectrum. The DOF attenuation characteristic is stored in the form of a lookup table on an electronic subsystem, such as a DSP, which calibrates the DOF against the ideal attenuation gain profile or spectra transfer function. This approach facilitates highly integrated re-configurable multi-channel input signal or output power equalization as shown in FIG. 25a.

While the lookup table offers calibrated attenuation set-points, it cannot calibrate against dynamic events and effects, which may cause the attenuation set-point to drift. The lookup table also puts greater demands on the DOF and control-system performance. For example, temperature effects on optical performance have to be well understood and accounted for in the component design. Changes in polarization causing additional optical loss through the DOF have to be minimized, or the device has to be very polarization-dependent-loss insensitive.

A small percentage of he output optical signal is tapped off and fed to a control system as feedback to automatically adjust the attenuation setting of the DOF. The switching time of the preferred embodiment DOF is fast enough to respond to long-term drifts such as temperature effects and mechanical mis-alignment, and more critically, to dynamically compensate for faster polarization changes due to mechanical shocks on the fiber. And since the DOF is essentially an optical component, the system resolution is a function of the accuracy and resolution of the number of micromirrors employed for a given DMD used in the DOF. An attenuation resolution of 0.1 dB can be achieved by using a group of mirrors (pixel) forming a diamond shaped 12×12 pixel area. The intrinsic switching time of the DMD is 5–20 microseconds so that a fast loop response time is easily achieved.

Alternatively, the DOF and the DSP subsystem can be integrated as one subsystem as illustrated in FIG. 25c. Further integration with the OPM is possible with optical-to-electrical conversion facility so that he optical feedback control algorithm can be implemented to automatically adjust the individual wavelength attenuation settings.

Figure 26A:
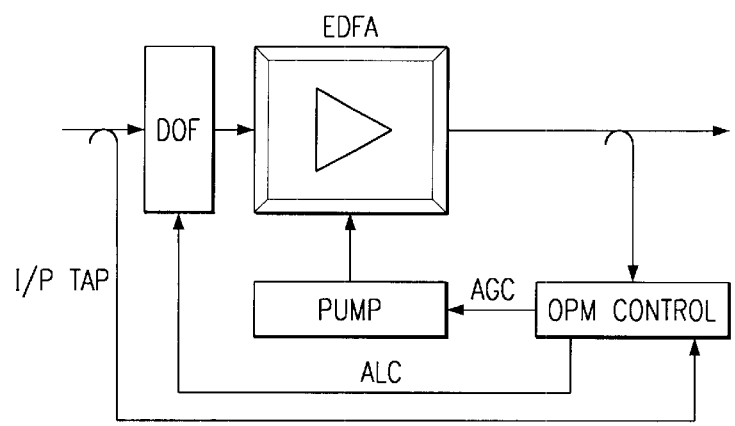

FIG. 26a shows a preferred embodiment adaptive optical amplifier including an EDFA with a preferred embodiment DOF at the input to the EDFA, an optical phase monitor (OPM) controller with input taps from the overall output and overall input and with the OPM controlling the (via automatic gain control or AGC) pump power for the EDFA and (via automatic level control or ALC) the settings of the DOF. The DOF provides gain equalization to increase the noise figure of the EDFA by an amount equal to the inverse of the DOF transmission loss. The DOF can directly equalize input signal power among the channels of a WDM into the EDFA and does not affect the EDFA gain control using the pump power. Any power surges (see next section on transient control) from preceding EDFA stages can be detected by the input tap and attenuated by the DOF in order to protect the EDFA. Any output power surges of the EDFA can be detected by the output tap but the input DOF cannot compensate.

Figure 26B:
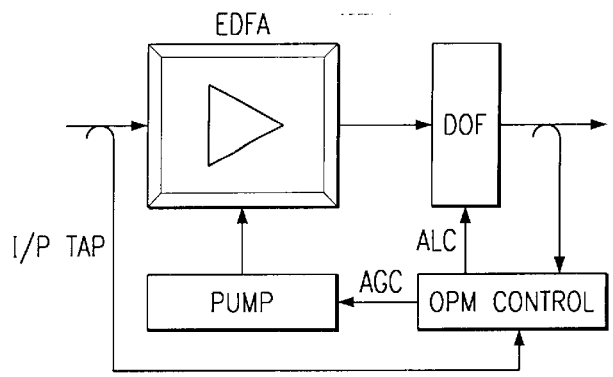

FIG. 26b shows another preferred embodiment adaptive optical amplifier including an EDFA with a DOF at the output from the EDFA, an OPM controller with input taps from both the overall input and output and with the OPM controlling the (via AGC) pump power for the EDFA and (via ALC) the settings of the DOF. The DOF provides gain equalization for the output but noes not affect the noise figure of the EDFA and the EDFA must compensate for the insertion loss of the DOF. The DOF cannot affect input signal power balance among the channels of a WDM into the EDFA and does not affect the EDFA gain by control of the pump power. Contrary to the preceding preferred embodiment, any power surges from preceding EDFA stages cannot be attenuated by the output DOF in order to protect the EDFA. Any output power surges of the EDFA can be detected by the output tap and the output DOF can attenuate the surge.

Figure 26C:
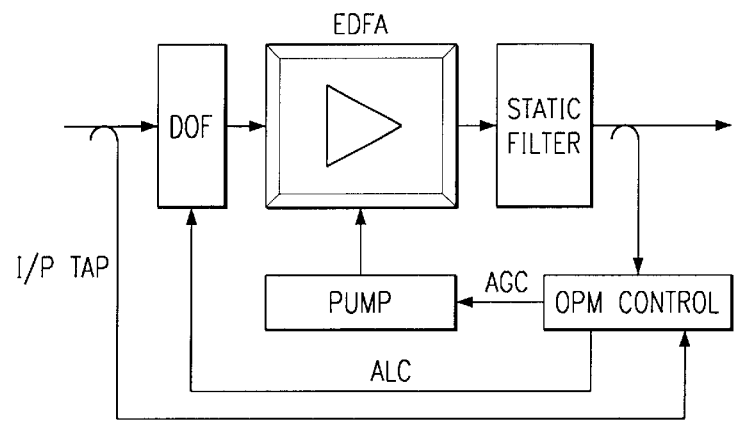

FIG. 26c shows another preferred embodiment adaptive optical amplifier including an EDFA with a DOF at the input to and a static optical filter at the output from the EDFA, an OPM controller with input taps from both the overall input and output and with the OPM controlling the (via AGC) pump power for the EDFA and (via ALC) the settings of the input DOF. The static filter will equalize a fixed gain scenario (e.g., fixed pump power and input signal level) with very little deviations; this partially equalizes the EDFA spectral response. The input DOF provides gain equalization for the input. The DOF affects input-signal power balance among the channels of a WDM into the EDFA and does not affect the EDFA gain by control of the pump power.

Figure 26D:
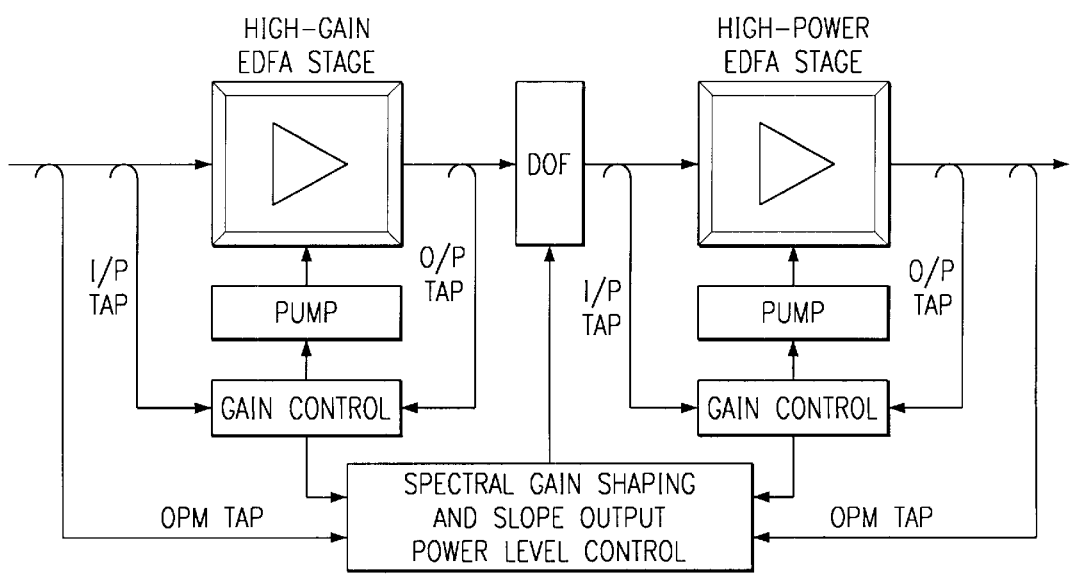
Figure 26E:
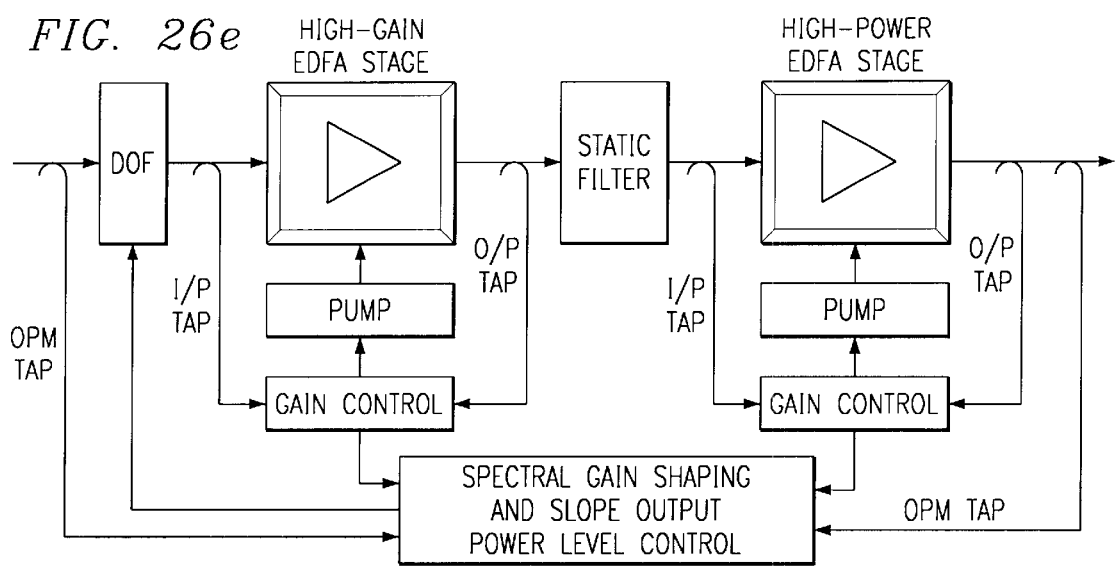

FIGS. 26d–26e show two stage amplifiers with the first stage EDFA providing high gain and the second stage EDFA providing high power. In particular, in the amplifier of FIG. 26d each stage has input and output taps on the EDFA for gain control by pump power control; plus OPM taps at the overall amplifier input and output together with the gain controls provide spectral gain shaping and slope output power level control for a DOF between the first and second stages. Analogously, in the amplifier of FIG. 26e each stage has input and output taps on the EDFA for gain control by pump power control; plus OPM taps at the overall amplifier input and output together with the gain controls provide spectral gain shaping and slope output power level control for a DOF preceding the first EDFA plus a static filter between the first and second stages.

Figure 27:
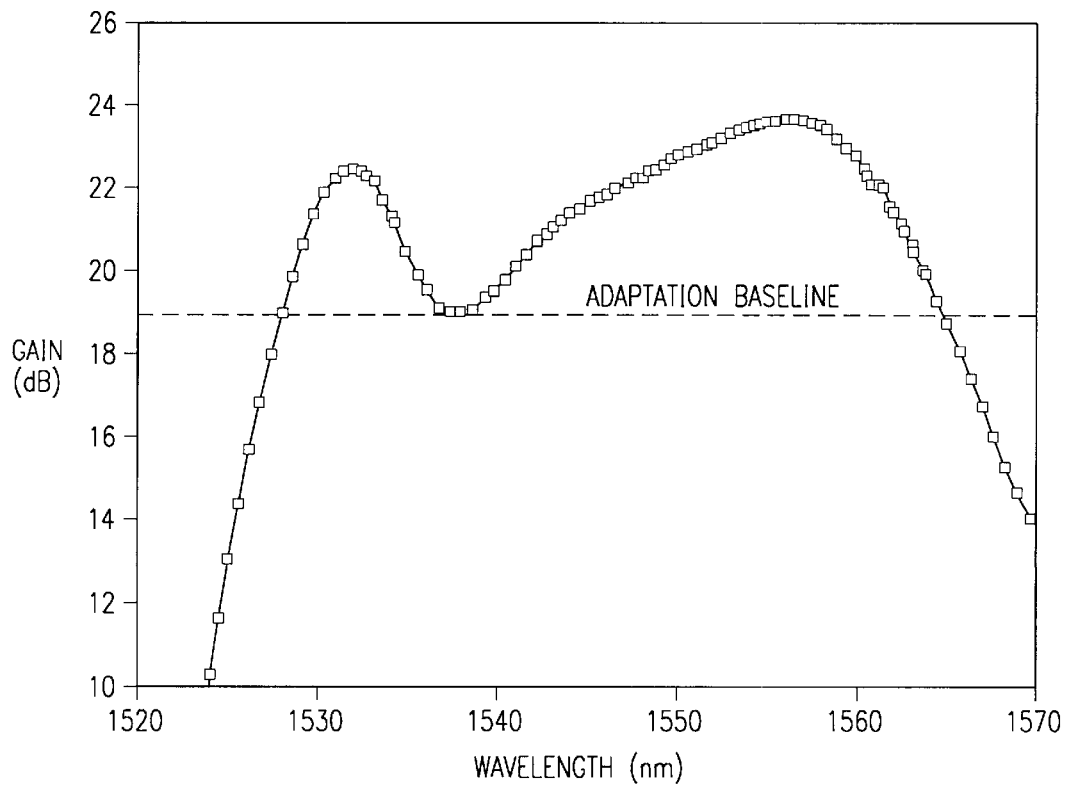
FIGS. 27–34 show gain spectra.
Figure 28:
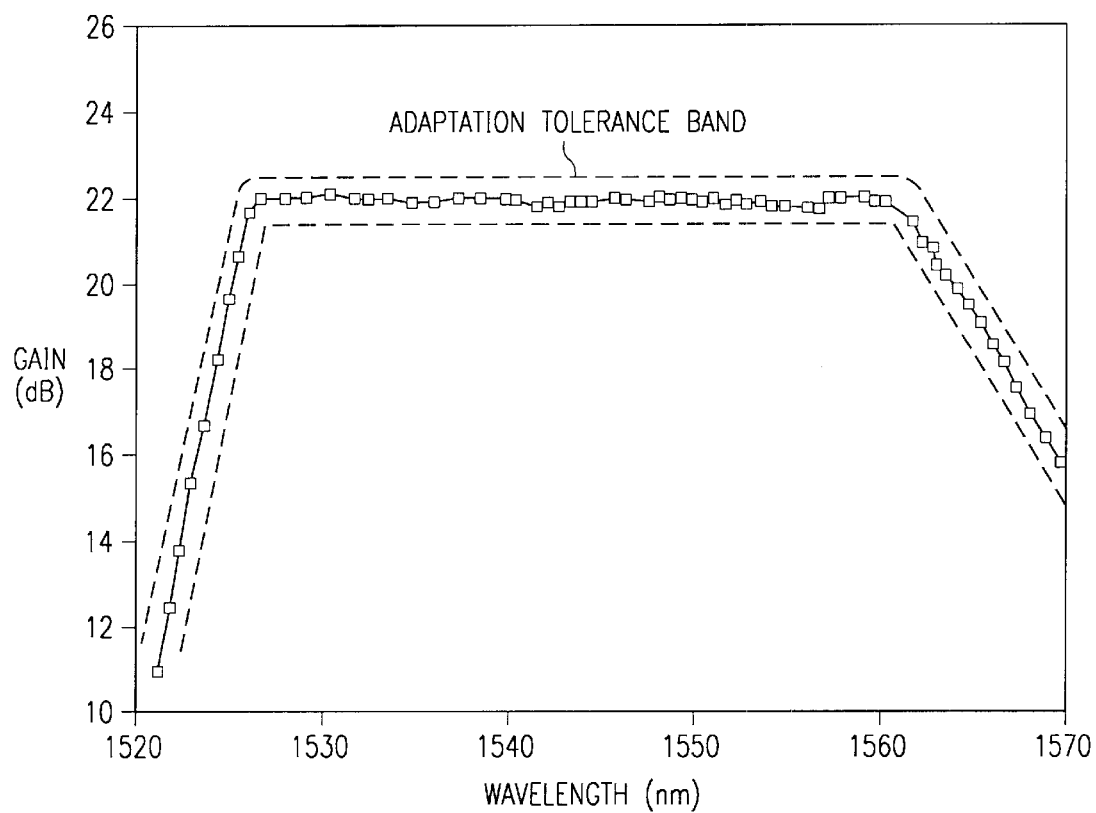

An example of a preferred embodiment adaptive optical amplifier application for the foregoing preferred embodiment adaptive optical amplifier structures with the DOF at the EDFA input provides EDFA gain profile equalization and channel equalization, by equalizing the individual channel's power at the output suig adaptive optical inverse filtering. In this way, channels that do not require gain equalization are left alone, eliminating unnecessary attenuation. Consider the inverse filtering requirement of equalizing an EDFA gain spectrum; the idea is to design an inverse filter with an adaptive algorithm which will flatten the gain spectrum of the EDFA. FIG. 27 shows a typical non-uniform EDFA gain spectrum in the wavelength range 1525–1570 nm. FIG. 28 shows the desired uniform EDFA gain-flattened spectrum with the preferred embodiment adaptive DOF converging as an inverse filter whose spectral shape is the inverse of the EDFA non-uniform gain spectrum. The adaptation is $$[\bar{w}^{n+1}_{\lambda_k}] = [\bar{w}^{n}_{\lambda_k}] + \mu * e_{rms} * [\bar{y}^{n}_{e_k}]$$

where each column vector has K terms $\{\omega_1, \ldots \omega_k, \ldots \omega_K\}$, corresponding to K lambda's or wavelengths, and:

$$[\bar{w}^{n+1}_{\lambda_k}] = \text{column vector at time } n+1$$

$$[\bar{w}^{n}_{\lambda_k}] = \text{column vector at time } n$$

$$[\bar{w}^{n+1}_{\lambda_k}] = [\bar{w}^{n}_{\lambda_k}] + \mu * e_{rms} * [\bar{y}^{n}_{e_k}]$$

$$[\bar{y}^{n}_{e_k}] = \text{error vector at time } n$$

Figure 29:
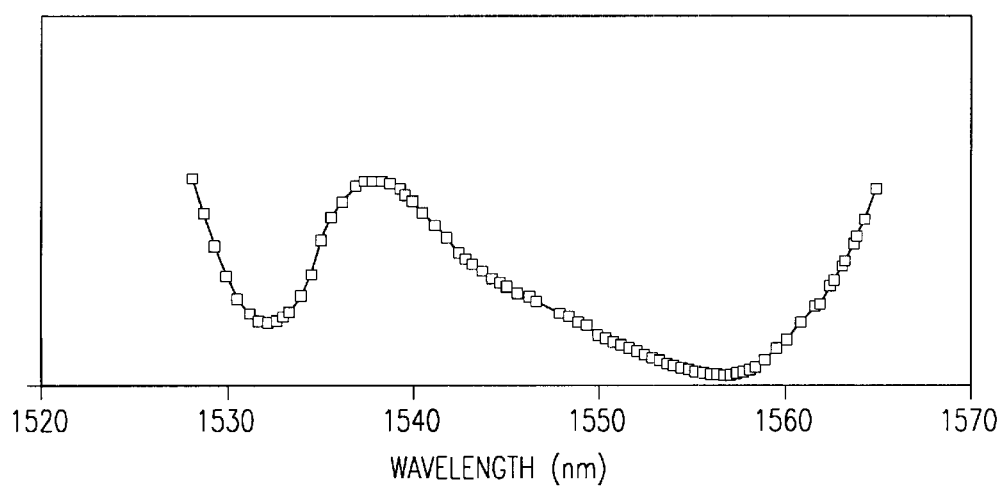
Figure 30:
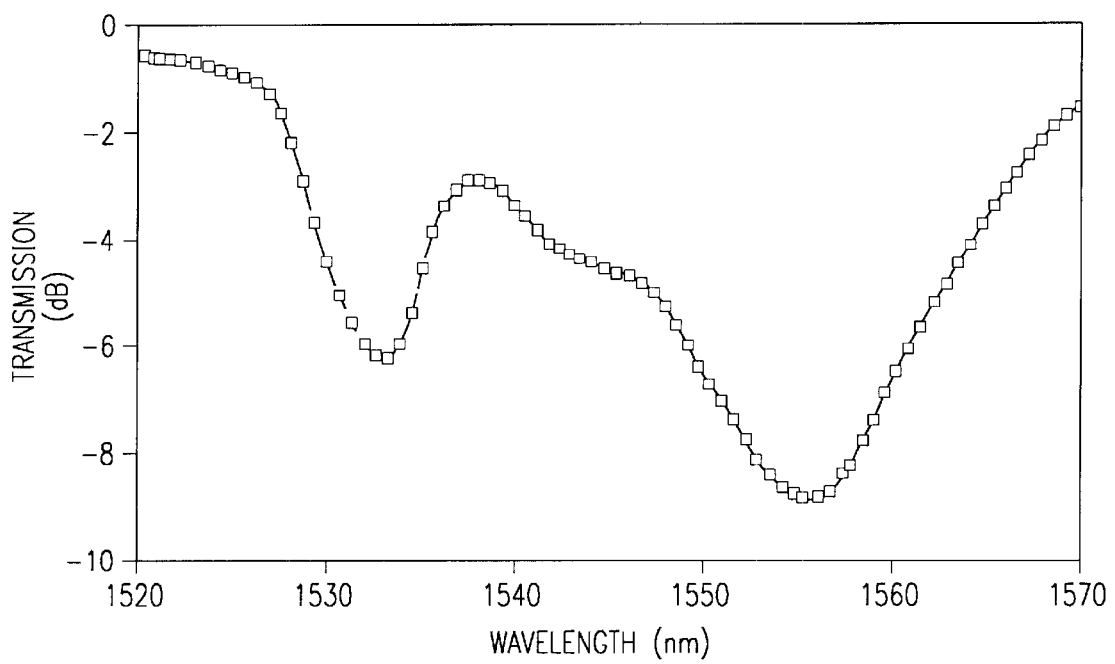

Also, $\mu$ is the adaptation step size which can be fixed or variable and is the controlling factor for convergence of the Adaptive Dynamic Optical Filter (ADOF). The error vector and root mean squared error for each iteration of adaptation are $\bar{y}^{n}_{e_k}$ and $e_{rms}$ respectively. At each iteration the error is checked against the allowable error size within a specified tolerance band (shown in FIG. 28). For example, FIG. 29 shows the error spectrum for the first iteration. The resultant inverse filter is achieved when the adaptive DOF converges. The spectral shape of the inverse filter is shown in FIG. 30. Care must be taken in the choice of the step size for convergence such that $\mu$ has to be small enough in order to guarantee convergence. At the same time it cannot be too big as to cause transient conditions for other network elements such as an EDFA. Finally, a tradeoff has to be made because $\mu$ also controls the adaptation speed; i.e., the smaller $\mu$ is the slower is the convergence.

The error signal is obtained by drawing a baseline at the bottom of the lowest valley of the original non-uniform gain spectrum as shown in FIG. 27. The difference between the desired output signal spectrum and this baseline constitutes the error signal.

Further, the adaptation algorithm can be applied simultaneously to a group of EDFA equalization functions such as:
1. input signal control: when the signals in a fiber have different power levels at the EDFA input.
2. Gain equalization: for EDFA non-uniform gain profile at various pump power levels, gain tilt/slope equalization, gain peaking reduction.
3. Polarization dispersion loss equalization: inter-channel power variations due to the PDL experienced by different channels can be adjusted much like any other gain variations.

Figure 31:
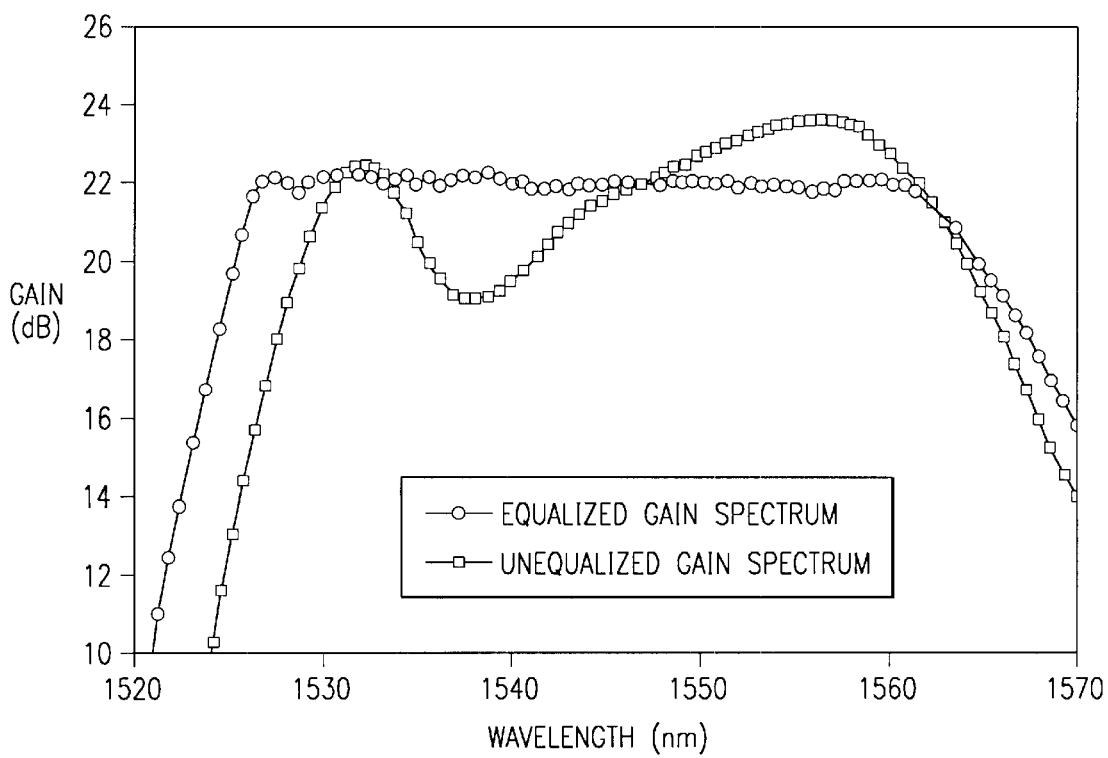
Figure 32:
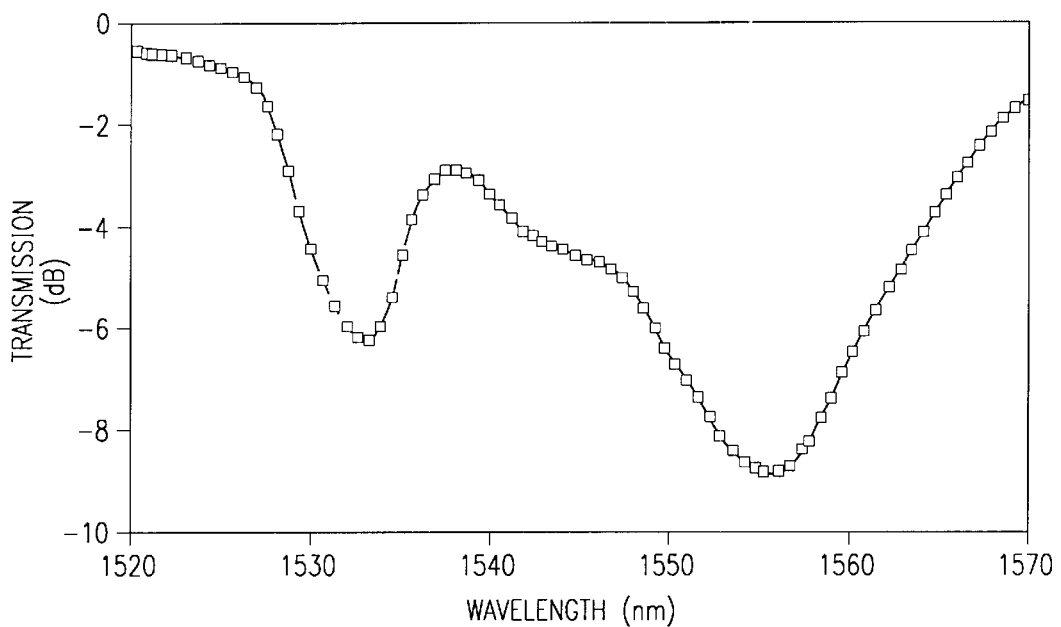

In addition, pump control (i.e., average inversion level) and ASE suppression (e.g., via saturation) for OSNR enhancement can also be handled in conjunction with a DOF used in EDFA control. With the adaptive DOF converging as an inverse filter to the EDFA gain spectrum, gain flattening or equalization is achieved as shown in FIGS. 31–32.

Figure 33:
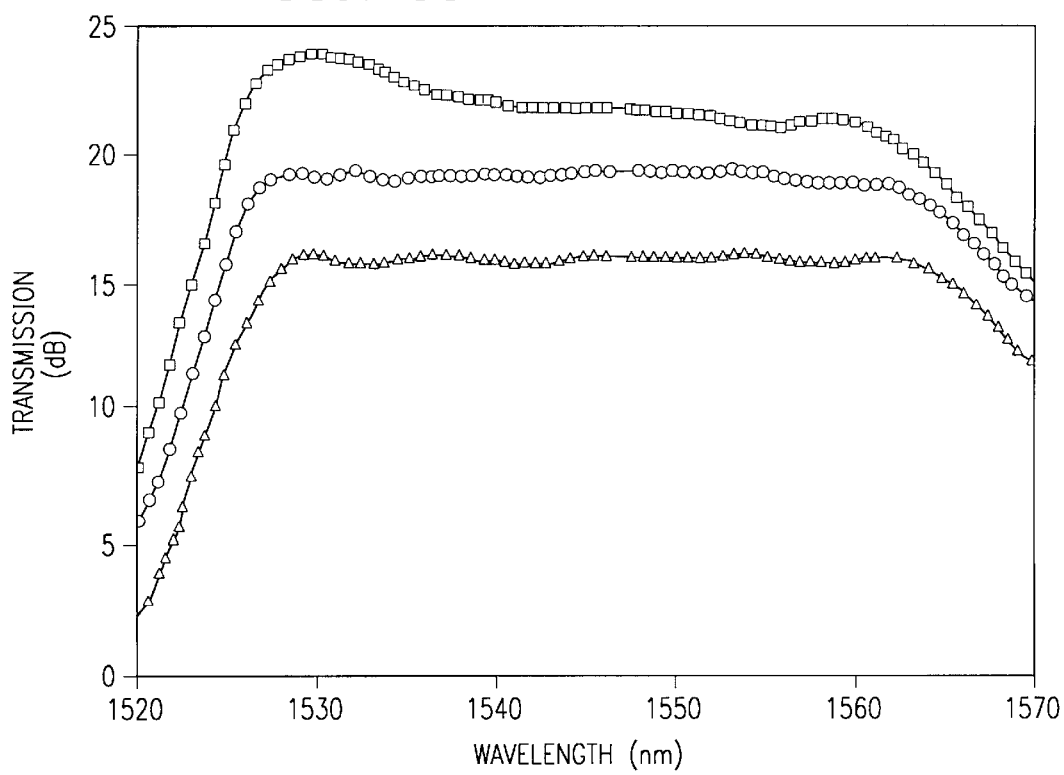
Figure 34:
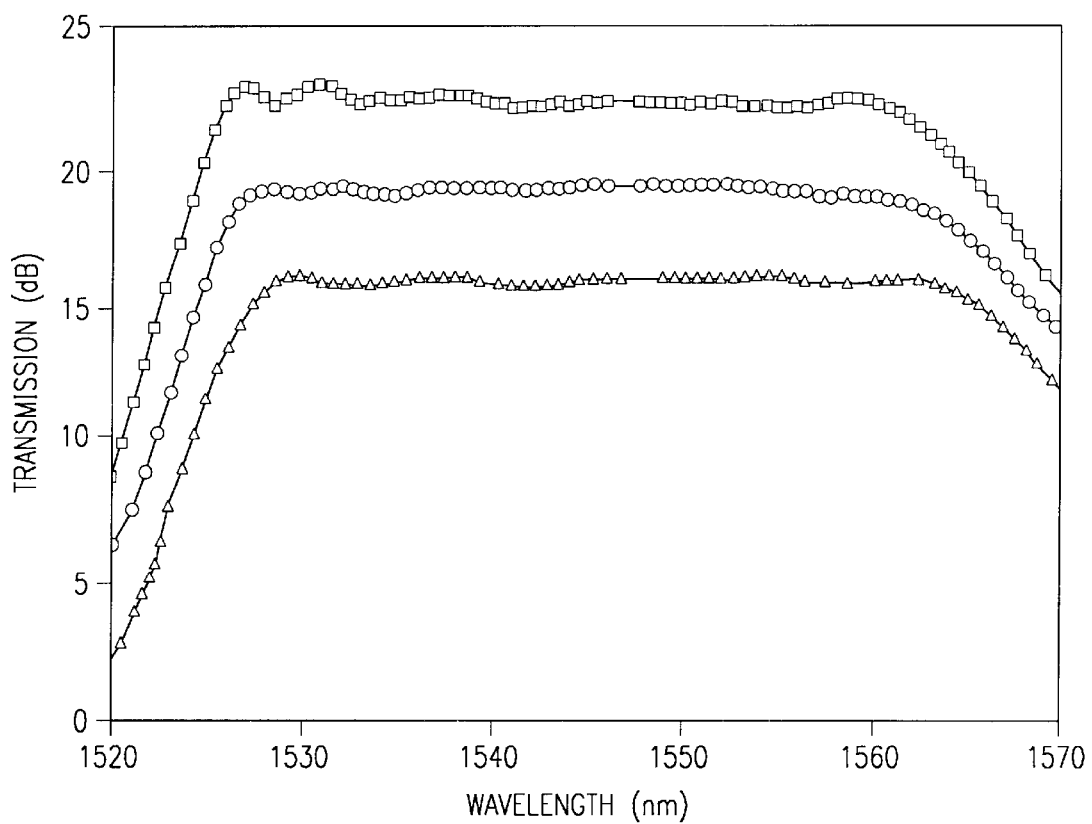

While the gain of an EDFA is dependent upon both its pump power and the input signal power, there will be dynamic inter-channel gain variations that the adaptation algorithm will adapt to over time, keeping the gain continuously equalized. This is particularly true because the input signals of the channels of a DWDM network change dynamically depending on traffic patterns and switching (e.g., OADM, OXC) and gain equalization for an EDFA has to be performed dynamically and adaptively to changing inputs. Since the input signal control is practically isolated from pump control, another EDFA control function, dynamic gain tilt/slope compensation, can be achieved along with gain flattening and input signal spectrum equalization. FIGS. 33–34 show a number of unequalized dynamic gain-tilt scenarios depending upon pump power. Negative tilt (too much pump power), flat gain tilt (desired pump power) and positive tilt (too little pump power) can all be equalized by adjusting the pump power to the EDFA as long as the pump is not used to compensate for input signal fluctuations due to switching and/or highly varying traffic patterns. In addition, the pump power can be boosted to saturate the EDFA according to the input signal power for best ASE suppression. All of these effects are dynamic in nature and the adaptation algorithm of the adaptive DOF will work in conjunction with the feedback pump control algorithm. Ideally both the adaptive DOF and the pump will be controlled by the same DSP or microcontroller.

Figure 35:
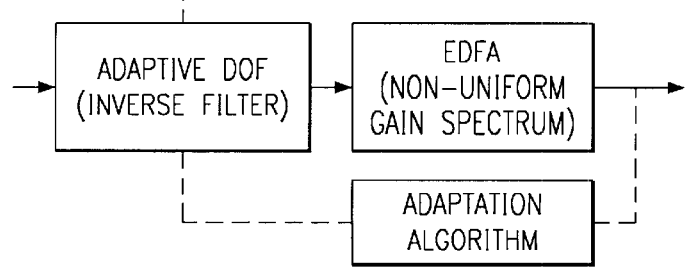
FIG. 35 is functional blocks of an adaptive optical amplifier.

FIG. 35 illustrates the preferred embodiment adaptive amplifier functional blocks.

17. Adaptive Transient Control with DOF

An abrupt change in optical system load can be caused by the sudden loss of channels (e.g., laser diode outage, optical switching, fiber cut, or system upgrade) or highly variable traffic patterns in a DWDM stream; and these can create rapid (and sometimes large) power swings. During large power transient conditions an EDFA input has to be protected unless the output power surges of a preceding EDFA in a cascade are suppressed. From a methodology standpoint, protection from transients or power surges can be categorized as pre-emptive or reactive. Pre-emptive protection can be achieved by communicating the change in channel count to the local controller, such as the controller of a DOF or ADOF.

For a channel-drop scenario, the operation is initiated with the following in mind:
(a) In the case of a number of channels being dropped, the resultant drop in input power to an EDFA becomes a negative step function to the EDFA transfer function causing a corresponding output power surge.
(b) It is the drop in the number of wavelengths that causes the surviving wavelengths to have more gain shared among them. In a sense, the output transient is inevitable but he magnitude of this power surge can be reduced if the EDFA is strongly inverted. Transient suppression can be achieved by pump power (gain control) or by offsetting the power surges with a corresponding attenuation level of the DOF.
(c) The gain of the EDFA can be reduced by reducing its pump power, however, care must be taken not to take the EDFA out of saturation. Since the pump power reduction is independent of the attenuation by the DOF or ADOF, a compromise would be to partially reduce the gain of the EDFA by pump power reduction with the balance of the gain reduction achieved via attenuation by the DOF or ADOF.
(d) Furthermore, in the absence of a DOF, the gain of the EDFA will have to be adjusted so that a constant per channel power is maintained for the surviving channels. However, with a DOF, the pump power can remain the same and the attenuation setting of the DOF can be changed to maintain a constant per channel power.

(e) If the Optical Add/Drop Multiplexer (OADM) is implemented with a DOF, then rather than instantaneously drop the channel(s), one strategy would be to gradually "throttle" the attenuation of the drop channel(s) to extinction in a few iterations to avoid major power transients due to a large negative step input function.

(f) Alternatively, an adaptive method as described in the foregoing can be used. In this case, the DOF acts as an ADOF with an appropriate adaptation method.

For a channel-add scenario, the operation is initiated with the following in mind:

(a) In the case of a number of channels being added, it is the net increase in the number of wavelengths that causes the surviving wavelengths to have less gain shared among them.

(b) The gain of the EDFA has to be increased to match the number of surviving channels or the attenuation setting of the DOF or ADOF has to be reduced (if possible) to increase the output power. One way to ensure that the DOF and ADOF has enough dynamic range both ways is to "bias" its attenuation level with a negative offset (slightly below zero attenuation) when no attenuation is required.

(c) If the OADM is implemented with a DOF, then rather than instantaneously adding the channel(s), one strategy would be to gradually "ramp" the power of the add channel(s) in a few iterations to avoid major power transients.

(d) Alternatively an adaptive method as described in the foregoing can be used. In this case, the DOF acts as an ADOF with appropriate adaptation method.

For the case of reactive protection (no prior knowledge of the impending change in channel count) there are three possible arrangements:

(a) A DOF or ADOF is at the output of the EDFA under protection. Upon detection of a step change, the DOF or ADOF attenuation has to be stepped up (channel-drop) or down (channel-add) in the opposite direction to the change in order to offset it. One way to ensure that the DOF and ADOF has enough dynamic range both ways is to "bias" its attenuation level with a negative offset (slightly below zero attenuation) when no attenuation is required.

(b) The changing attenuation level can be "throttled" (performed gradually) in a few iteration s much like the transients that would take a few cycles to die down.

(c) The gain of the EDFA has to be reduced (channel-drop) or increased (channel-add) to match the number of surviving channels or the DOF or ADOF has to reduce the output signal strength via attenuation of the individual channels. The gain of the EDFA can be reduced by reducing its pump power, however, care must be taken not to take the EFA out of saturation. Since the pump power reduction is independent of the attenuation by the DOF or ADOF, a compromise would be to partially reduce the gain of the EDFA by pump power reduction with the balance of the gain reduction achieved via attenuation by the DOF or ADOF.

And the preferred embodiment transient control methods provide reactive control with computationally-simple control as described in the following.

Generally, large power transients can be produced at the output of EDFAs in a cascade from input power transients. At first glance this is counterintuitive as the long upper-state lifetime (e.g., 10 milliseconds) of erbium suggests that any power effects will be slow and should stabilize quickly. While this may be the case for a standalone EDFA (not connected to a network), the case for a cascade of EDFAs in a typical long haul optical link is very different. The amplifiers are usually operated well into saturation. This means that there is only sufficient energy storage in the upper state erbium for a short duration of operation. Should the EDFA pump stop, there is sufficient input signal power to deplete the population inversion quite quickly (roughly 100 microseconds). Thus the amount of energy storage (reservoir of excited ions) or the inversion level of an EDFA is quite small in comparison to the rate at which energy is passing through it. EDFA gain dynamics are related to the depletion and the refilling of this reservoir of excited ions. While the refill process is mainly contributed to by the pump (one pump photon can excite at most one ion), the depletion process is mainly caused by the signal (an avalanche process connected to the stimulated emission where one input photon can "burn" up a very large number of excited ions in the reservoir); that is, the depletion process can be fast versus the slow refill process. Thus the rapid build-up of the power surges which can cause problems when they travel down the fiber, which has non-linearity effects. Whereas there is no model to accurately predict the exact magnitude/timing of these add/drop transients due to a chain of EDFAs and the interconnecting fiber in an optical link, it is necessary for network operators to take precautions, including dynamic control of these transients with switching devices of comparable speed, such as DOFs.

Figure 36:
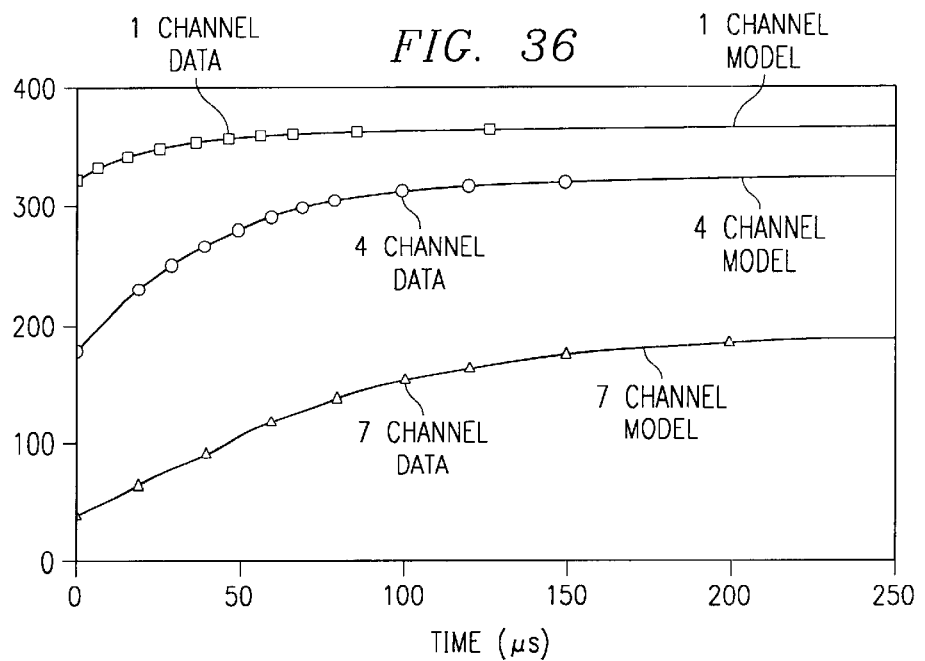
FIGS. 36–38 show power transients.
Figure 37:
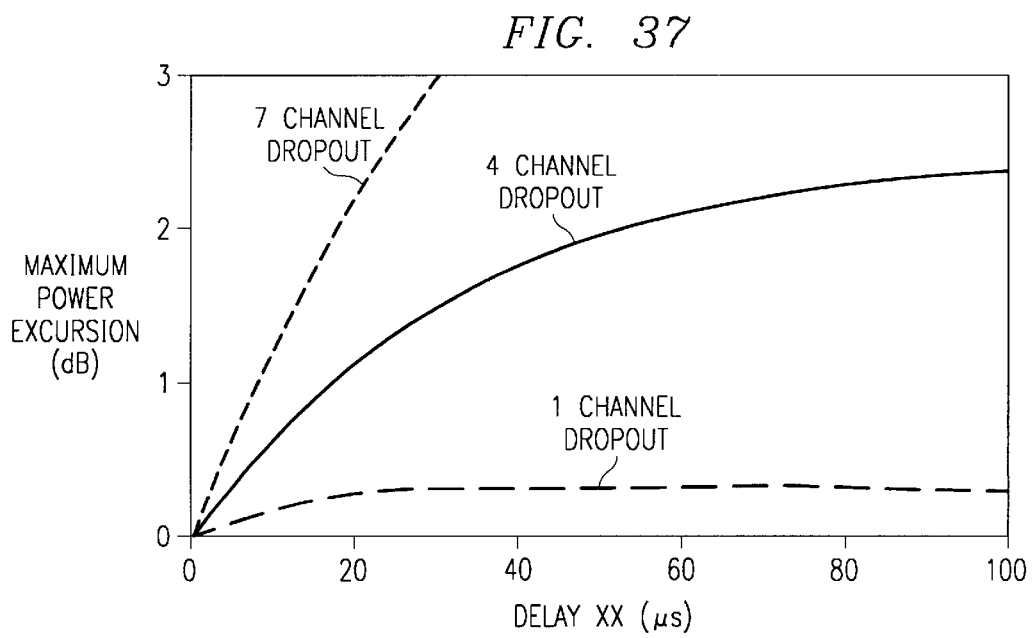

The transient response time of an EDFA can be of the order of 100 microseconds. The transient build-up is even faster with a corresponding increase in its power excursion and duration as the number of dropped/lost channels increases. Indeed, for a single EDFA, the transient time is proportional to the saturation level of the EDFA and can be modeled as $$\log P(t) = \log P(\infty) + e^{-t/\tau} \log[P(0)/P(\infty)]$$

where P(t) is the power output at time t and τ is the time constant (characteristic time) equal to the effective decay time of the upper energy level ions averaged over the EDFA fiber length. This model fits the data quite well; see FIG. 36 illustrating the fit for 1, 4, and 7 channel situations. And FIG. 37 shows the transient rise time for 1, 4 and 7 channels dropped.

Figure 38:
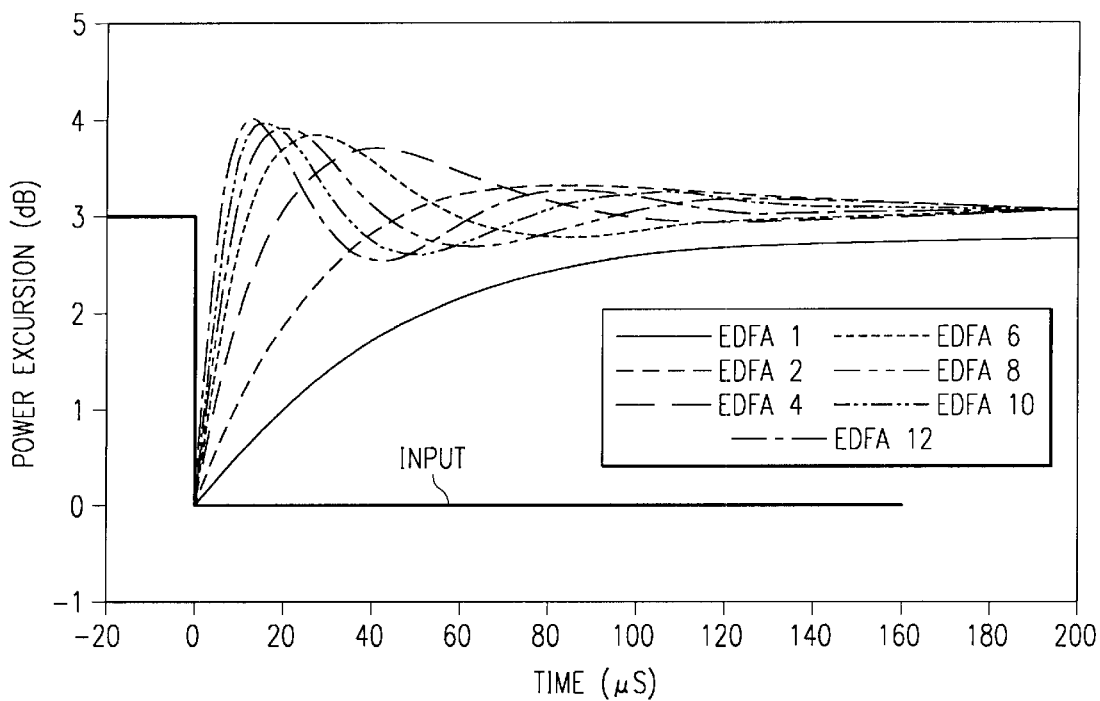

A sudden drop of channels at the input to a first EDFA in a cascade of EDFAs causes the gain of the first EDFA to rise rapidly to a new value with a first time constant. The output power of the first EDFA recovers exponentially after a sudden drop. When this optical power change reaches the second EDFA, its gain in turn starts to rise rapidly. This rising gain and the increasing optical input power can cause the output power of the second EDFA to overshoot its new steady-state value. This overshoot in the output response of the second EDFA is due to the new frequency response of a chain of EDFAs. Indeed, the overshoot will be more pronounced with a large number of cascaded EDFAs with high gain. The transient time is inversely proportional to the number of EDFAs in cascade. In particular, FIG. 38 illustrates the generation of rapid power fluctuations (transient power surges) in a chain of twelve EDFAs when four out of eight DWDM channels are dropped. Initially, the EDFAs experience the same rate of increase in gain. The initial build-up of the transient increases rapidly down the cascade with the number of EDFAs. The rise-time T to reach 1 dB is the fastest for the twelfth EDFA, and the slope 1/T increases linearly with the number of EDFAs. The peak transient power increases with the number of EDFAs. The transient overshoots with increasing magnitude after two EDFAs. Power overshoots are due to non-uniform EDFA gain or input signal power profile (dropped channels have increasingly higher gain profiles than surviving channels after two EDFAs).

Figure 39:
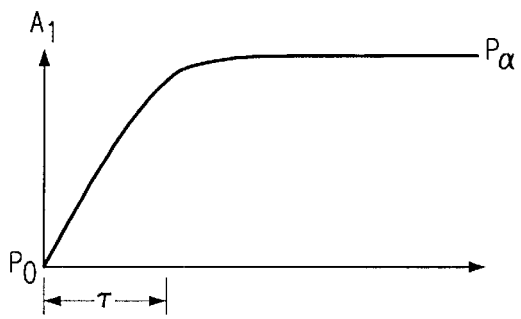
FIGS. 39–44 illustrate transient control curves.

The preferred embodiment methods of adaptive control of optical transients of a cascade of EDFAs uses a model based on a second-order transfer function as follows. First consider the transient profile at the output of the first EDFA in a cascade of twelve EDFAs as in FIG. 38 and isolated in FIG. 39. The preferred embodiment methods replace the foregoing output power model:

$$\log P(t) = \log P(\infty) + e^{-t/\tau} \log[P(0)/P(\infty)]$$

with a simpler model:

$$P(t) = (1 - e^{-t/\tau})[P(\infty) - P(0)] + P(0)$$

Figure 40:
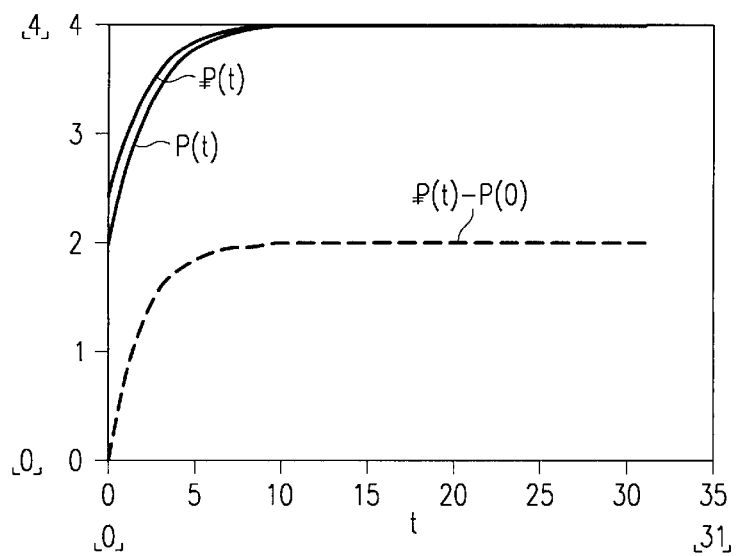
Figure 41:
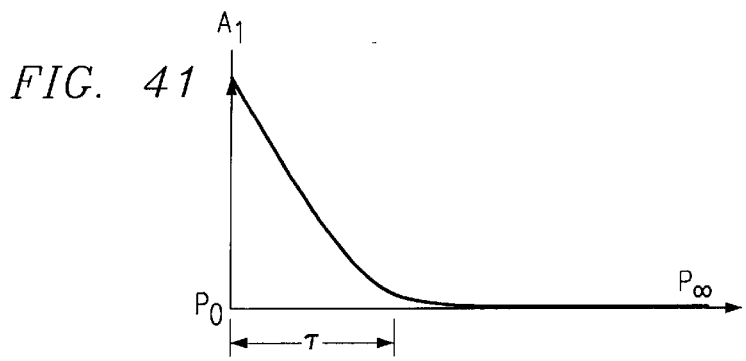

FIG. 40 illustrates transients predicted by the two models for the case of $P(\infty)=4$, $P(0)=2$, and $\tau=2$ time increments. The preferred embodiment adaptive control methods use the simpler model for real-time adaptive transient closed-loop control by predicting (calculating using the model) the next transient output value. That is, each EDFA in a cascade of EDFAs has a DOF with closed-loop control to form an adaptive optical amplifier as described in the preceding section. Then the preferred embodiment methods for transient control in the cascade use $P(0)$ and $\tau$ values of the first EDFA together with a measurement of the power $P(t)$ indicating the start of a power transient to compute the $P(\infty)$ value. The methods then calculate the next time slot estimate of $P(t)$ to set the attenuation of the DOF to effect such a change. The attenuation setting will be the inverse of the transient profile as shown in FIG. 41 for the output of the first EDFA in the cascade. In this predictive fashion, the attenuation level of the DOF is stepped or "throttled" until the steady-state is reached. In this way a constant output power can be maintained. In addition, if a constant output power on a per channel basis is to be maintained, then the number of surviving channels for the channel ADD/DROP scenario would have to be known. This is a given in the network provisioning or re-configuring case and the information can be transmitted to the network element (EDFA controller or DOF controller) in a number of ways. For example, this can be done via a control channel (optical or electrical overlay circuit) or by modulating the pump power of an EDFA at the transmit end of the optical link.

Figure 42:
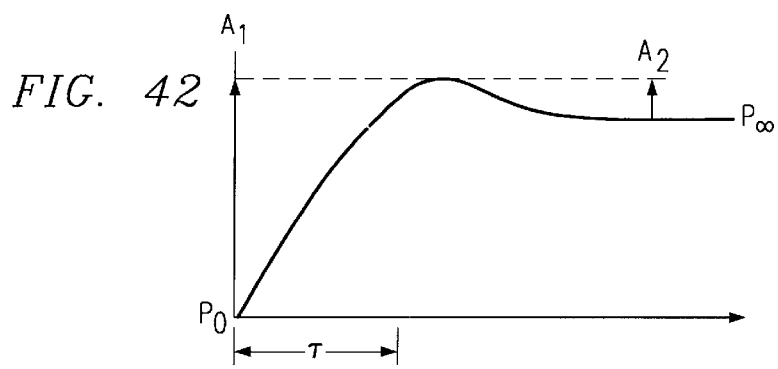

The foregoing analysis assumes that the transient control is done at every EDFA in an optical link by attaching a DOF to every EDFA where possible and thereby forming a cascade of adaptive optical amplifiers. In the event that this is not possible and a DOF is only attached after N EDFAs in a cascade, then the output transient profile will be updated by cascading the above transient profile model N times. For example, after a cascade of two EDFAs, the profile as in FIG. 42 will be used instead of that of FIG. 41.

Figure 43:
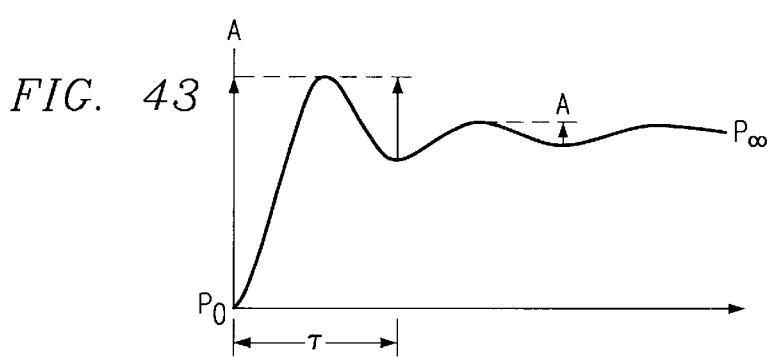
Figure 44:
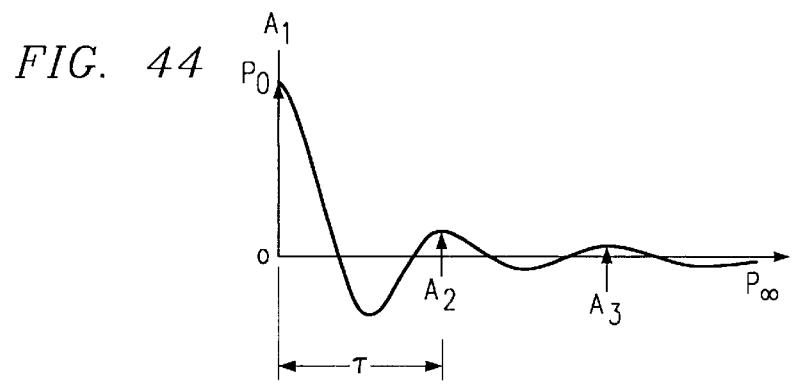

The preferred embodiment model can be cascaded to as many EDFAs in a cascade as is reasonable for transient control. However, the EDFAs in between these DOFs will be vulnerable to transient effects. It is therefore necessary to maintain sufficient pump power per EDFA for the surviving channels to operate with a saturated EDFA because a strongly inverted EDFA has reduced transient magnitude. From the previous Figure, for the output transient of the twelfth EDFA, the profile of FIG. 43 can be used for the channel-drop scenario and FIG. 44 can be used for the channel-add scenario.

18. Modifications

The preferred embodiments may be modified in various ways while retaining one or more of the features of optical filters based on linear filter model of both phase and amplitude, adaptive control of optical filters and optical amplifiers, and transient control with a simple predictive model.

What is claimed is:

1. A method of optical link dispersion compensation, comprising:

(a) providing a relative phase measurement for an optical link, said phase measurement determined for each wavelength of a set of wavelengths;

(b) using the results of step (a) in computing a first transfer function phase for each of said wavelengths, said first transfer function corresponding to said optical link;

(c) using the results of step (b) in computing an amplitude for said first transfer function; and (d) applying an optical filter to said optical link, said optical filter with a second transfer function, said second transfer function corresponding to said first transfer function.

2. The method of claim 1, wherein:

(a) said optical filter includes a dispersive element, a plurality of attenuation elements, and a recombining element;

(b) whereby an input signal including said set of wavelengths may be split by said dispersive element into separate signals, and each of said separate signals may be attenuated by a corresponding one of said plurality of attenuation elements, and these attenuated separate signals may be recombined into an output signal by said recombining element.

3. The method of claim 1, wherein:

(a) said providing a phase measurement of step (a) of claim 1 includes detecting a relative group delay for each of said wavelengths.

4. The method of claim 1, wherein:

(a) said set of wavelengths are cover wavelengths in a multichannel optical network.

5. A method of adaptive optical network dispersion compensation, comprising:

(a) providing a relative phase measurement for each wavelength of a set of wavelengths used in an optical network;

(b) using the results of step (a) in computing a first transfer function phase for each of said wavelengths;

(c) using the results of step (b) in computing an amplitude for said first transfer function;

(d) applying an optical filter in said optical network, said optical filter with a second transfer function, said second transfer function corresponding to said first transfer function; and (e) repeating steps (a)–(d) to adapt to optical network conditions.

6. The method of claim 5, wherein:

(a) said optical filter includes a dispersive element, a plurality of attenuation elements, and a recombining element;

(b) whereby an input signal including said set of wavelengths may be split by said dispersive element into separate signals, and each of said separate signals may be attenuated by a corresponding one of said plurality of attenuation elements, and these attenuated separate signals may be recombined into an output signal by said recombining element.

7. The method of claim 5, wherein:
   (a) said providing a phase measurement of step (a) of claim 1 includes detecting a relative group delay for each of said wavelengths.

8. A method of optical filter synthesis, comprising:
   (a) providing an amplitude for each of a plurality of wavelengths;
   (b) using the results of step (a) in computing a transfer function with magnitude corresponding to said amplitude for said plurality of wavelengths, said computing including complex cepstrum analysis of said magnitude.

9. The method of claim 8, further comprising:
   (a) zero-padding said magnitude prior to said complex cepstrum analysis.

10. The method of claim 9, further comprising:
    (a) windowing said complex cepstrum prior to discrete Fourier transforming.

11. A procedure for measuring the chromatic dispersion parameter of a multi-wavelength system transfer function with at least one wavelength from the group delay parameter that is extracted from the phase parameter recovered from measured Intensity data, comprising the following steps:
    (a) measure intensity data to generate magnitude data, said intensity data can be spectral reflectance or transmittance data;
    (b) compute logarithmic magnitude data;
    (c) perform Inverse Fourier Transform on logarithmic magnitude data;
    (d) generate complex cepstrum signal using even function signal property;
    (e) optionally perform windowing on the complex cepstrum signal;
    (f) reconstruct logarithmic system transfer function by performing a Fourier Transform on (optionally windowed) complex cepstrum signal;
    (g) recover magnitude of system transfer function from the Real Part of the Fourier Transform results using the anti-log or exponent function;
    (h) recover phase of system transfer function from the Imaginary Part of the Fourier Transform results;
    (i) compute the group delay parameter from the recover phase parameter; and
    (j) compute the chromatic dispersion parameter from the group delay parameter.

12. The procedure of claim 11, further comprising:
    (a) doubling the size of the transform;
    (b) inserting zero frequencies in the middle of the transform spectrum to expand the size of the transform; and
    (c) repeating procedure of claim 1 for recovering phase, group delay and chromatic dispersion parameters of a system transfer function.

13. The procedure of claim 12, further comprising a methodology of designing the magnitude function of a system transfer function to meet a given specification of a multi-wavelength system transfer function with at least one wavelength such that the design error falls within a given tolerance band, e(w)=|H(w)|−|H'(w)|, where H(w) is the ideal system transfer function and H'(w) is the designed or approximation of the ideal transfer function, by iterating the said steps in claims 11 and 12, the magnitude function of a desired system transfer function can be approximated as closely as possible in order to meet a given tolerance band.

14. A procedure for specifying the magnitude function of a system transfer function of an optical component for a multi-wavelength system with at least one wavelength given the Chromatic Dispersion parameter of a system transfer function or the Group Delay parameter or the Phase parameter, said procedure for a given or desired Group Delay comprising the following steps to determine both $\log|H(k)|$ and $\phi(k)$ given $\tau(k)$:
    (a) compute $\tau(k)$ given the desired group delay $\tau_d(k)$;
    (b) compute pseudo-Cepstral coefficients p(n) via an N-point IDFT of $\tau(k)$;
    (c) compute $\hat{h}_p(n)$ from p(n) as follows:

$$\tilde{h}_p(n) = \begin{cases} \dfrac{p(n)}{n}, & 1 \le n < \dfrac{N}{2} \\ 0, & n = 0, \dfrac{N}{2} \\ -\tilde{h}_p(N-n), & \dfrac{N}{2} < n \le N-1; \end{cases}$$

(d) compute $\hat{H}(k)$ via DFT of $\hat{h}_p(n)$, the imaginary part of $\hat{H}(k)$ is the unwrapped phase spectrum $\phi(k)$ of the recovered transfer function;
   (e) compute $\log|H(k)|$ by forming a sequence g(n)=sgn(n) .$\hat{h}$(n) for $0 \le n < N$ and taking the DFT of g(n);
   (f) compute the recovered magnitude function $|H(k)|$ by taking exp[log|H(k)|] where log is the natural logarithm function;
   (g) finding the recovered transfer function of the optical filter as:

$H(k)=\{|H(k)|\exp [j\phi(k)]\}$;

(h) optionally apply an error optimization loop or procedure to iteratively or adaptively implement the group delay equalization that represents the required chromatic dispersion or dispersion slope compensation, such a loop can be set up in conjunction with a given tolerance band of a desired magnitude spectrum.

* * * * *